United States Patent
Nishikawa

(10) Patent No.: US 8,292,438 B2
(45) Date of Patent: Oct. 23, 2012

(54) PROJECTION IMAGE DISPLAY DEVICE AND PROJECTION OPTICAL SYSTEM FOR PERFORMING EXTENDED PROJECTION

(75) Inventor: Jun Nishikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 438 days.

(21) Appl. No.: 12/622,471

(22) Filed: Nov. 20, 2009

(65) Prior Publication Data

US 2010/0128234 A1    May 27, 2010

(30) Foreign Application Priority Data

Nov. 21, 2008   (JP) ................ P2008-297721

(51) Int. Cl.
*G03B 21/28*   (2006.01)
*G03B 21/14*   (2006.01)
(52) U.S. Cl. .......................... 353/98; 353/101
(58) Field of Classification Search .............. 353/98, 353/101; 359/822
See application file for complete search history.

(56) References Cited

U.S. PATENT DOCUMENTS 6,310,726 B1 * 10/2001 Iizuka ................ 359/618
2006/0193036 A1 * 8/2006 Suzuki ................ 359/364

FOREIGN PATENT DOCUMENTS

| CN | 1295538 | 1/2007 |
|---|---|---|
| JP | 2007 111248 | 5/2007 |
| JP | 4086686 | 2/2008 |
| JP | 2008 185709 | 8/2008 |
| WO | WO 03/071332 | 8/2003 |

* cited by examiner

*Primary Examiner* — Thanh Luu
(74) *Attorney, Agent, or Firm* — Frommer Lawrence & Haug LLP; William S. Frommer; Thomas F. Presson

(57) ABSTRACT

A projection image display device includes a light source; an illumination optical system that uniformly irradiates a surface of an image modulating element (primary image surface) with a light beam emitted from the light source; and a projection optical system that performs with respect to a screen (a secondary image surface) extended projection on image information provided at the primary image surface and modulated by the image modulating element. The projection optical system includes a first optical system having a positive refractive power, and a second optical system having a concave reflecting surface. The first optical system has a common optical axis at which all optical components of the first optical system have rotationally symmetric surfaces, and a screen shift function that causes the secondary image surface to be moved by moving at least one of the optical components of the first optical system substantially perpendicularly to the optical axis.

8 Claims, 50 Drawing Sheets

FIG. 4A
MEETING SPACE
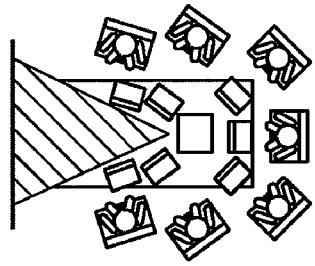
FIG. 4B
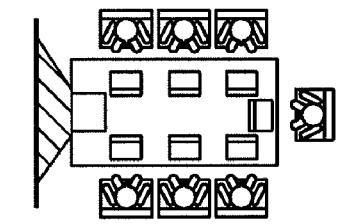
CLASSROOM, SEMINAR ROOM
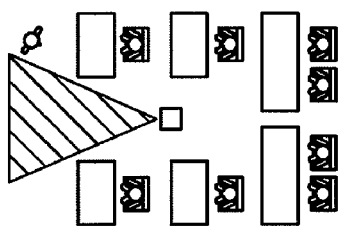
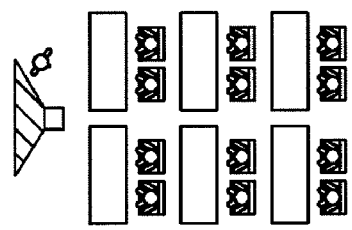
FIG. 5A
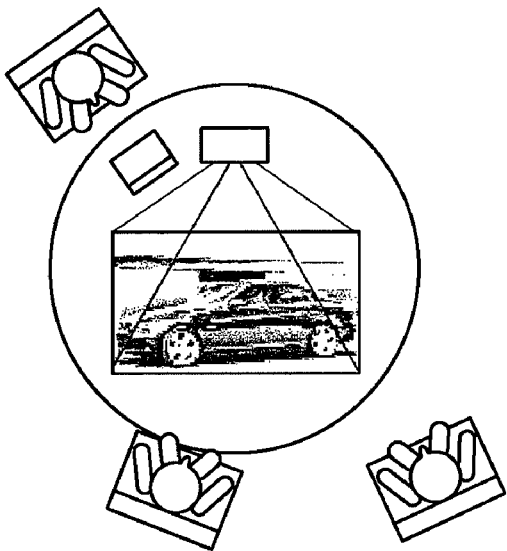
FIG. 5B
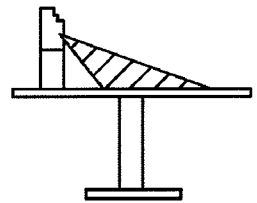

FIG. 11

| | FF MF SF | r | d | nd | νd | REMARKS |
|---|---|---|---|---|---|---|
| PRIMARY IMAGE SURFACE | | inf | 8.000 | | | |
| 1 | | inf | 24.000 | 1.51680 | 64.2 | COLOR COMBINING PRISM, ETC. |
| 2 | | inf | 7.354 | | | |
| 3 | | 55.6170 | 7.800 | 1.48749 | 70.4 | |
| 4 | | −84.9529 | 0.300 | | | |
| 5 | | 61.5580 | 8.000 | 1.48749 | 70.4 | |
| 6 | | −49.9038 | 1.800 | 1.80610 | 40.7 | |
| 7 | | −186.3434 | (d7) | | | |
| 8 | | −291.5453 | 1.500 | 1.80610 | 33.3 | |
| 9 | | 33.4043 | 14.300 | 1.48749 | 70.4 | |
| 10 | | −22.3881 | 1.500 | 1.74330 | 49.2 | |
| 11 | | −49.2831 | 2.200 | | | |
| 12 | | 135.9615 | 6.200 | | | |
| 13 | | −51.3700 | 1.000 | 1.59551 | 39.2 | |
| 14 | | inf | (d14) | | | STOP |
| 15 | ○ | inf | (d15) | | | FIRST PLANE REFLECTING SURFACE IS DISPOSED |
| 16 | | 34.1091 | 5.700 | 1.48749 | 70.4 | |
| 17 | | 64.4228 | 0.300 | | | |
| 18 | | 29.9189 | 6.500 | 1.48749 | 70.4 | |
| 19 | | 73.7777 | 8.000 | | | |
| 20 | | 145.6365 | 1.700 | 1.74330 | 49.2 | |
| 21 | | 23.5652 | 9.100 | | | |
| 22 | | −53.3723 | 1.700 | 1.74330 | 49.2 | |
| 23 | | 212.9002 | (d23) | | | |
| 24 | | −172.8078 | 7.200 | 1.72342 | 38.0 | |
| 25 | | −50.5397 | (d25) | | | |
| 26 | * | −63.9973 | 5.000 | 1.53113 | 55.7 | |
| 27 | * | −73.7521 | 70.000 | | | |
| 28 | ○ | inf | 137.000 | | | SECOND PLANE REFLECTING SURFACE IS DISPOSED |
| 29 | * | −67.6568 | (d29) | (REFLECTING SURFACE) | | |
| SECONDARY IMAGE SURFACE | | inf | | | | |

* · · · ASPHERICAL SURFACE
○ · · · DUMMY SURFACE

FIG. 12

| PRIMARY IMAGE SURFACE SIDE NUMERICAL APERTURE NA | 0.28500 |
|---|---|
| MAXIMUM HALF ANGLE OF VIEW ω | 70.5 deg. |
| MAXIMUM OBJECT HEIGHT y | −13.0 mm |

FIG. 13A

· SF (SCREEN SHIFT FUNCTION)

| DECENTERING RANGE | SURFACE 13 TO 14 |
|---|---|
| DECENTERING AMOUNT | +/−0.4 mm |

FIG. 13B

· FF (FLOATING FUNCTION)

|  | SHORT DISTANCE | STANDARD | LONG DISTANCE |
|---|---|---|---|
| fl | 4.863 | 4.688 | 4.548 |
| β | 76.994 | 127.000 | 214.313 |
| d7 | 23.179 | 23.179 | 23.179 |
| d14 | 25.000 | 25.000 | 25.000 |
| d15 | 25.374 | 23.048 | 21.500 |
| d23 | 10.950 | 6.909 | 3.722 |
| d25 | 2.200 | 8.567 | 13.301 |
| d29 | −445.738 | −677.122 | −1077.184 |

FIG. 13C

· MF (MAGNIFICATION CHANGEOVER FUNCTION)

|  | WIDE | TELE |
|---|---|---|
| fl | 4.673 | 4.704 |
| β | 127.476 | 126.524 |
| d7 | 22.882 | 23.499 |
| d14 | 25.297 | 24.680 |
| d15 | 23.048 | 23.048 |
| d23 | 6.909 | 6.909 |
| d25 | 8.567 | 8.567 |
| d29 | −677.122 | −677.122 |

FIG. 14

ASPHERICAL COEFFICIENT

| | K | A1 | A2 | A4 | A6 | A8 | A10 | A12 | A14 |
|---|---|---|---|---|---|---|---|---|---|
| 26 | 3.500 | 0.000 | 0.000 | 4.53300E-06 | -2.16516E-08 | 9.19828E-11 | -1.91750E-13 | 2.03040E-16 | -8.78013E-20 |
| 27 | -23.700 | 0.000 | 0.000 | -5.22365E-06 | -4.39236E-09 | 3.77574E-11 | -8.29723E-14 | 8.17902E-17 | -3.26970E-20 |
| 29 | -1.900 | -2.51413E-04 | 4.18040E-04 | -8.87253E-08 | -5.26131E-12 | 1.30796E-15 | -1.31540E-19 | 6.54527E-24 | -1.31203E-28 |

FIG. 15

| | |
|---|---|
| DOT SIZE (μm) | 12.5000 |
| HORIZONTAL-DIRECTION LENGTH | 12.8000 |
| VERTICAL-DIRECTION LENGTH | 9.6000 |
| OPTICAL AXIS – ELEMENT CENTER DISTANCE | -6.5155 |

FIG. 16

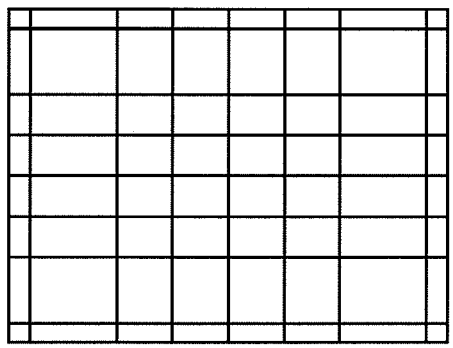

FIG. 17A

·TRAPEZOID DISTORTION V/SCREEN SIZE/SCREEN POSITION

|  | SHORT DISTANCE | STANDARD | LONG DISTANCE |
|---|---|---|---|
| DIAGONAL SIZE | 48.5" | 80" | 135" |
| TRAPEZOID V (%) | −0.297% | 0.027% | 0.185% |

FIG. 17B

·AMOUNT OF CHANGE FROM WHEN DISTANCE IS STANDARD PROJECTION DISTANCE

|  | MF (MAGNIFICATION CHANGEOVER FUNCTION) | | SF (SCREEN SHIFT FUNCTION) | |
|---|---|---|---|---|
|  | WIDE | TELE | +0.4mm | −0.4mm |
| TRAPEZOID V (%) | 0.01% | −0.01% | −0.02% | 0.00% |
| HORIZONTAL SIZE (%) | 0.34% | −0.36% | 0.02% | −0.02% |
| VERTICAL SIZE (%) | 0.35% | −0.37% | 0.19% | −0.17% |
| VERTICAL POSITION (%) | −0.22% | 0.24% | −5.27% | 5.25% |

FIG. 18

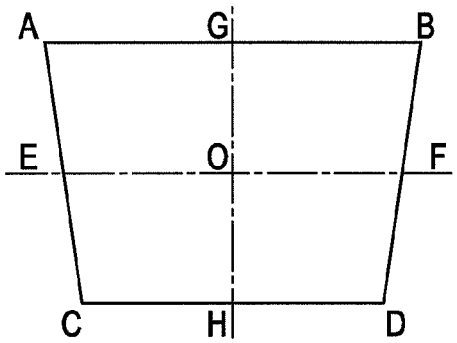

- DIAGONAL SIZE LENGTH OF EITHER AB OR BC
- TRAPEZOID V (%) = (AB − CD) / (AB + CD) × 100

AMOUNT OF CHANGE WHEN FUNCTIONS ARE MAGNIFICATION FUNCTION AND SCREEN SHIFT FUNCTION

- TRAPEZOID V (%) = (TRAPEZOID V WHEN AFOREMENTIONED FUNCTIONS ARE USED) − (TRAPEZOID V WHEN DISTANCE IS STANDARD PROJECTION DISTANCE)

- HORIZONTAL SIZE (%) = {(LINE SEGMENT EF WHEN AFOREMENTIONED FUNCTIONS ARE USED) − (LINE SEGMENT EF WHEN DISTANCE IS STANDARD PROJECTION DISTANCE)} / (LINE SEGMENT EF WHEN DISTANCE IS STANDARD PROJECTION DISTANCE) × 100

- VERTICAL SIZE (%) = {(LINE SEGMENT GH WHEN AFOREMENTIONED FUNCTIONS ARE USED) − (LINE SEGMENT GH WHEN DISTANCE IS STANDARD PROJECTION DISTANCE)} / (LINE SEGMENT GH WHEN DISTANCE IS STANDARD PROJECTION DISTANCE) × 100

- VERTICAL POSITION (%) = (AMOUNT OF DISPLACEMENT OF POINT O WHEN AFOREMENTIONED FUNCTIONS ARE USED FROM WHEN DISTANCE IS STANDARD PROJECTION DISTANCE) / (LINE SEGMENT GH WHEN DISTANCE IS STANDARD PROJECTION DISTANCE) × 100

FIG. 19

| | |
|---|---|
| (1) $0.2 < |\phi s / \phi 1| < 1.2$ | 0.60 |
| (2) $0.2 < |\phi m / \phi 1| < 0.9$ | 0.36 |
| (3) $0.2 < |\phi 12b / \phi 12| < 3.0$ | 2.08 |
| (4) $0.2 < |\phi 12b / \phi 12a| < 1.0$ | 0.77 |
| (5) $1.5 < M12b / M12a < 7.0$ | 2.87 |
| (6) $3 < DM < Dy$ | 7.82 |

FIG. 23

| | FF MF SF | r | d | nd | νd | REMARKS |
|---|---|---|---|---|---|---|
| PRIMARY IMAGE SURFACE | | inf | 8.000 | | | |
| 1 | | inf | 24.000 | 1.51680 | 64.2 | COLOR COMBINING PRISM, ETC. |
| 2 | | inf | 7.354 | | | |
| 3 | | 43.3728 | 8.300 | 1.48749 | 70.4 | |
| 4 | | −125.4849 | 0.300 | | | |
| 5 | | 74.5578 | 8.100 | 1.48749 | 70.4 | |
| 6 | | −46.3685 | 2.000 | 1.80610 | 40.7 | |
| 7 | | −185.4219 | 19.800 | | | |
| 8 | | 133.8500 | 2.000 | 1.80610 | 33.3 | |
| 9 | | 35.2986 | 12.500 | 1.48749 | 70.4 | |
| 10 | | −22.3869 | 1.500 | 1.74330 | 49.2 | |
| 11 | | −49.2879 | (d11) | | | |
| 12 | | 89.1242 | 4.500 | 1.53172 | 48.8 | |
| 13 | | −96.5953 | (d13) | | | |
| 14 | | inf | 2.700 | | | STOP |
| 15 | | inf | 25.000 | 1.51680 | 64.2 | |
| 16 | ○ | inf | 24.000 | 1.51680 | 64.2 | FIRST PLANE REFLECTING SURFACE IS DISPOSED |
| 17 | | inf | 3.100 | | | |
| 18 | | 27.1590 | 7.500 | 1.51680 | 64.2 | |
| 19 | | 211.0871 | 9.650 | | | |
| 20 | | −156.0770 | 1.700 | 1.71300 | 53.9 | |
| 21 | | 25.0763 | 9.200 | | | |
| 22 | | −36.9484 | 1.600 | 1.69680 | 55.5 | |
| 23 | | −151.5465 | (d23) | | | |
| 24 | | −191.8999 | 7.400 | 1.67003 | 47.2 | |
| 25 | | −47.3124 | (d25) | | | |
| 26 | * | −53.0010 | 5.800 | 1.53113 | 55.7 | |
| 27 | * | −49.6531 | 66.000 | | | |
| 28 | ○ | inf | 130.000 | | | SECOND PLANE REFLECTING SURFACE IS DISPOSED |
| 29 | * | −74.4943 | (d29) | (REFLECTING SURFACE) | | |
| SECONDARY IMAGE SURFACE | | inf | | | | |

\* · · · ASPHERICAL SURFACE
○ · · · DUMMY SURFACE

FIG. 24

| PRIMARY IMAGE SURFACE SIDE NUMERICAL APERTURE NA | 0.28100 |
|---|---|
| MAXIMUM HALF ANGLE OF VIEW ω | 69.0 deg. |
| MAXIMUM OBJECT HEIGHT y | −13.0 mm |

FIG. 25A

·SF (IMAGE SHIFT FUNCTION)

| DECENTERING RANGE | SURFACE 12 TO 13 |
|---|---|
| DECENTERING AMOUNT | +/−0.1 mm |

FIG. 25B

·FF (FLOATING FUNCTION)

|  | SHORT DISTANCE | STANDARD | LONG DISTANCE |
|---|---|---|---|
| fl | 5.526 | 5.438 | 5.339 |
| β | 87.313 | 111.125 | 158.750 |
| d11 | 3.789 | 3.789 | 3.789 |
| d13 | 2.500 | 2.500 | 2.500 |
| d23 | 5.120 | 3.650 | 1.985 |
| d25 | 2.150 | 3.620 | 5.286 |
| d29 | −527.868 | −648.194 | −888.427 |

FIG. 25C

·MF (MAGNIFICATION CHANGEOVER FUNCTION)

|  | WIDE | TELE |
|---|---|---|
| fl | 5.416 | 5.460 |
| β | 111.601 | 110.649 |
| d11 | 3.456 | 4.123 |
| d13 | 2.833 | 2.167 |
| d23 | 3.650 | 3.650 |
| d25 | 3.620 | 3.620 |
| d29 | −648.194 | −648.194 |

FIG. 26

ASPHERICAL COEFFICIENT

| | K | A4 | A6 | A8 | A10 | A12 | A14 |
|---|---|---|---|---|---|---|---|
| 26 | −0.750 | 8.37414E−06 | −3.04593E−08 | 1.52520E−10 | −3.64217E−13 | 4.25080E−16 | −2.01825E−19 |
| 27 | −9.600 | −2.73534E−06 | −8.33595E−09 | 7.48002E−11 | −1.73348E−13 | 1.84220E−16 | −7.97470E−20 |
| 29 | −2.300 | −1.57032E−07 | 7.47211E−12 | −2.22292E−16 | −1.84975E−20 | 1.86668E−24 | −4.89658E−29 |

FIG. 27

| | |
|---|---|
| DOT SIZE (μm) | 12.5000 |
| HORIZONTAL-DIRECTION LENGTH | 12.8000 |
| VERTICAL-DIRECTION LENGTH | 9.6000 |
| OPTICAL AXIS – ELEMENT CENTER DISTANCE | −6.5155 |

FIG. 28

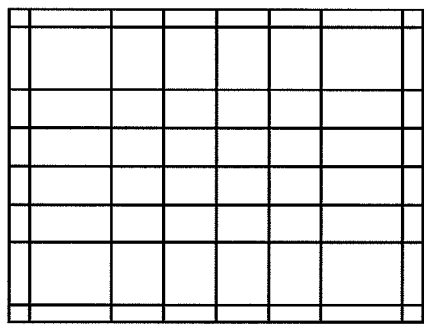

FIG. 29A

· TRAPEZOID DISTORTION V/SCREEN SIZE/SCREEN POSITION

|  | SHORT DISTANCE | STANDARD | LONG DISTANCE |
|---|---|---|---|
| DIAGONAL SIZE | 55" | 70" | 100" |
| TRAPEZOID V (%) | -0.023% | 0.007% | 0.103% |

FIG. 29B

· AMOUNT OF CHANGE FROM WHEN DISTANCE IS STANDARD PROJECTION DISTANCE

|  | MF (MAGNIFICATION CHANGEOVER FUNCTION) | | SF (SCREEN SHIFT FUNCTION) | |
|---|---|---|---|---|
|  | WIDE | TELE | +0.1 mm | -0.1 mm |
| TRAPEZOID V (%) | 0.01% | -0.01% | 0.00% | 0.00% |
| HORIZONTAL SIZE (%) | 0.42% | -0.42% | 0.00% | 0.00% |
| VERTICAL SIZE (%) | 0.43% | -0.43% | 0.02% | -0.02% |
| VERTICAL POSITION (%) | -0.28% | 0.28% | -0.66% | 0.66% |

FIG. 30

| | |
|---|---|
| (1) $0.2 < |\phi s / \phi 1| < 1.2$ | 0.40 |
| (2) $0.2 < |\phi m / \phi 1| < 0.9$ | 0.40 |
| (3) $0.2 < |\phi 12b / \phi 12| < 3.0$ | 1.71 |
| (4) $0.2 < |\phi 12b / \phi 12a| < 1.0$ | 0.59 |
| (5) $1.5 < M12b / M12a < 7.0$ | (−) |
| (6) $3 < DM < Dy$ | 7.92 |

FIG. 34

| | FF MF SF | r | d | nd | νd | REMARKS |
|---|---|---|---|---|---|---|
| PRIMARY IMAGE SURFACE | | inf | 6.000 | | | |
| 1 | | inf | 24.200 | 1.51680 | 64.2 | COLOR COMBINING PRISM, ETC. |
| 2 | | inf | 5.900 | | | |
| 3 | ⎧ | 48.8696 | 8.400 | 1.48749 | 70.4 | |
| 4 | | −75.4963 | 0.300 | | | |
| 5 | | 49.4055 | 8.900 | 1.48749 | 70.4 | |
| 6 | ⎨ | −43.8545 | 2.000 | 1.80610 | 40.7 | |
| 7 | | −141.3626 | (d7) | | | |
| 8 | ⎧ | 187.6241 | 1.400 | 1.80610 | 33.3 | |
| 9 | | 27.7428 | 11.400 | 1.48749 | 70.4 | |
| 10 | | −20.4141 | 1.300 | 1.74330 | 49.2 | |
| 11 | ⎩ | −46.1292 | 3.000 | | | |
| 12 | | inf | (d12) | | | STOP |
| 13 | ⎰ | 90.1990 | 6.000 | 1.53172 | 48.8 | |
| 14 | ⎱ | −59.0059 | (d14) | | | |
| 15 | ⎧ | 29.2652 | 6.900 | 1.58913 | 61.3 | |
| 16 | | 197.6258 | 10.500 | | | |
| 17 | ⎨ | −286.4692 | 1.400 | 1.71300 | 53.9 | |
| 18 | | 29.7956 | 5.650 | | | |
| 19 | | −47.6174 | 1.400 | 1.69680 | 55.5 | |
| 20 | ⎩ | 117.1184 | (d20) | | | |
| 21 | ⎰ | −80.4038 | 5.500 | 1.70154 | 41.2 | |
| 22 | ⎱ | −36.3618 | (d22) | | | |
| 23 | * | 70.7994 | 4.600 | 1.53113 | 55.7 | |
| 24 | * | 49.3006 | 176.800 | | | |
| 25 | * | −69.7195 | (d25) | | | (REFLECTING SURFACE) |
| SECONDARY IMAGE SURFACE | | inf | | | | |

* · · · ASPHERICAL SURFACE

FIG. 35

| PRIMARY IMAGE SURFACE SIDE NUMERICAL APERTURE NA | 0.32100 |
|---|---|
| MAXIMUM HALF ANGLE OF VIEW ω | 70.0 deg. |
| MAXIMUM OBJECT HEIGHT y | −13.0 mm |

FIG. 36A

· SF (SCREEN SHIFT FUNCTION)

| DECENTERING RANGE | SURFACE 3 TO 14 |
|---|---|
| DECENTERING AMOUNT | +/−0.15 mm |

FIG. 36B

· FF (FLOATING FUNCTION)

|  | SHORT DISTANCE | STANDARD | LONG DISTANCE |
|---|---|---|---|
| fl | 5.256 | 5.160 | 5.052 |
| β | 79.375 | 111.125 | 158.750 |
| d7 | 18.353 | 18.353 | 18.353 |
| d12 | 6.434 | 6.434 | 6.434 |
| d14 | 16.544 | 14.919 | 13.507 |
| d20 | 9.078 | 6.804 | 4.364 |
| d22 | 2.300 | 6.199 | 10.052 |
| d25 | −465.856 | −617.634 | −842.128 |

FIG. 36C

· MF (MAGNIFICATION CHANGEOVER FUNCTION)

|  | WIDE | TELE |
|---|---|---|
| fl | 5.125 | 5.195 |
| β | 111.919 | 110.331 |
| d7 | 18.181 | 18.518 |
| d12 | 6.129 | 6.754 |
| d14 | 15.397 | 14.434 |
| d20 | 6.804 | 6.804 |
| d22 | 6.199 | 6.199 |
| d25 | −617.634 | −617.634 |

FIG. 37

ASPHERICAL COEFFICIENT

| | K | A4 | A6 | A8 | A10 | A12 | A14 |
|---|---|---|---|---|---|---|---|
| 23 | −0.730 | −1.59453E−05 | 3.11069E−08 | −1.07350E−10 | 1.98334E−13 | −1.38815E−16 | −4.80572E−20 |
| 24 | −5.300 | −1.21434E−05 | 3.13656E−08 | −1.12055E−10 | 2.47557E−13 | −2.85635E−16 | 1.23660E−19 |
| 25 | −2.700 | −3.57712E−07 | 4.22822E−11 | −4.82512E−15 | 3.65136E−19 | −1.66167E−23 | 3.37586E−28 |

FIG. 38

| | |
|---|---|
| DOT SIZE (μm) | 12.5000 |
| HORIZONTAL-DIRECTION LENGTH | 12.8000 |
| VERTICAL-DIRECTION LENGTH | 9.6000 |
| OPTICAL AXIS − ELEMENT CENTER DISTANCE | −6.5155 |

FIG. 39

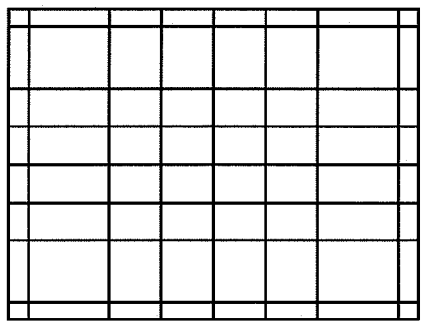

FIG. 40A

· TRAPEZOID DISTORTION V/SCREEN SIZE/SCREEN POSITION

|  | SHORT DISTANCE | STANDARD | LONG DISTANCE |
|---|---|---|---|
| DIAGONAL SIZE | 50" | 70" | 100" |
| TRAPEZOID V (%) | −0.654% | −0.006% | 0.281% |

FIG. 40B

· AMOUNT OF CHANGE FROM WHEN DISTANCE IS STANDARD PROJECTION DISTANCE

|  | MF (MAGNIFICATION CHANGEOVER FUNCTION) | | SF (SCREEN SHIFT FUNCTION) | |
|---|---|---|---|---|
|  | WIDE | TELE | +0.15mm | −0.15mm |
| TRAPEZOID V (%) | 0.03% | −0.02% | 0.03% | −0.01% |
| HORIZONTAL SIZE (%) | 0.70% | −0.70% | 0.01% | −0.01% |
| VERTICAL SIZE (%) | 0.71% | −0.72% | 0.08% | −0.09% |
| VERTICAL POSITION (%) | −0.46% | 0.29% | −2.12% | 2.12% |

FIG. 41

| | |
|---|---|
| (1) $0.2 < |\phi s/\phi 1| < 1.2$ | 0.55 |
| (2) $0.2 < |\phi m/\phi 1| < 0.9$ | 0.36 |
| (3) $0.2 < |\phi 12b/\phi 12| < 3.0$ | 1.21 |
| (4) $0.2 < |\phi 12b/\phi 12a| < 1.0$ | 0.67 |
| (5) $1.5 < M12b/M12a < 7.0$ | 2.55 |
| (6) $3 < DM < Dy$ | 7.62 |

FIG. 45

| | FF MF SF1 SF2 | r | d | nd | νd | REMARKS |
|---|---|---|---|---|---|---|
| PRIMARY IMAGE SURFACE | | inf | 3.000 | | | |
| 1 | | inf | 15.000 | 1.51680 | 64.2 | COLOR COMBINING PRISM, ETC. |
| 2 | | inf | 1.000 | | | |
| 3 | | 24.1925 | 4.600 | 1.48749 | 70.4 | |
| 4 | | −35.8953 | 0.150 | | | |
| 5 | | 21.9595 | 5.000 | 1.48749 | 70.4 | |
| 6 | | −22.6092 | 0.900 | 1.80610 | 40.7 | |
| 7 | | −197.1710 | (d7) | | | |
| 8 | | 67.4234 | 0.700 | 1.80610 | 33.3 | |
| 9 | | 12.8362 | 6.400 | 1.48749 | 70.4 | |
| 10 | | −10.2055 | 0.700 | 1.74330 | 49.2 | |
| 11 | | −24.9966 | 1.000 | | | |
| 12 | | inf | (d12) | | | STOP |
| 13 | | 36.3408 | 3.400 | 1.56732 | 42.8 | |
| 14 | | −25.9610 | (d14) | | | |
| 15 | | 12.8612 | 4.300 | 1.58913 | 61.3 | |
| 16 | | 39.7855 | 3.150 | | | |
| 17 | | −614.8298 | 0.700 | 1.71300 | 53.9 | |
| 18 | | 11.7040 | 3.750 | | | |
| 19 | | −22.8036 | 0.700 | 1.69680 | 55.5 | |
| 20 | | 406.9433 | (d29) | | | |
| 21 | | −46.9423 | 3.900 | 1.67003 | 47.2 | |
| 22 | | −18.5300 | (d22) | | | |
| 23 | * | −18.7122 | 1.900 | 1.53113 | 55.7 | |
| 24 | * | −27.3105 | 83.200 | | | |
| 25 | * | −32.2240 | (d25) | | | (REFLECTING SURFACE) |
| SECONDARY IMAGE SURFACE | | inf | | | | |

\* · · · ASPHERICAL SURFACE

FIG. 46

| | |
|---|---|
| PRIMARY IMAGE SURFACE SIDE NUMERICAL APERTURE NA | 0.31000 |
| MAXIMUM HALF ANGLE OF VIEW ω | 71.5 deg. |
| MAXIMUM OBJECT HEIGHT y | −7.0 mm |

FIG. 47A

- SF1 (SCREEN SHIFT FUNCTION)

| DECENTERING RANGE | SURFACE 3 TO 24 |
| --- | --- |
| DECENTERING AMOUNT | +/−0.1 mm |

- SF2 (SCREEN SHIFT FUNCTION)

| DECENTERING RANGE | SURFACE 15 TO 24 |
| --- | --- |
| DECENTERING AMOUNT | +/−0.1 mm |

FIG. 47B

- FF (FLOATING FUNCTION)

| | SHORT DISTANCE | STANDARD | LONG DISTANCE |
| --- | --- | --- | --- |
| fl | 2.604 | 2.569 | 2.521 |
| β | 72.571 | 108.857 | 181.429 |
| d7 | 9.549 | 9.549 | 9.549 |
| d12 | 1.382 | 1.382 | 1.382 |
| d14 | 9.363 | 8.812 | 8.224 |
| d20 | 4.306 | 3.179 | 1.791 |
| d22 | 1.150 | 2.828 | 4.803 |
| d25 | −211.428 | −299.314 | −473.702 |

FIG. 47C

- MF (MAGNIFICATION CHANGEOVER FUNCTION)

| | WIDE | TELE |
| --- | --- | --- |
| fl | 2.561 | 2.577 |
| β | 109.220 | 108.494 |
| d7 | 9.522 | 9.557 |
| d12 | 1.322 | 1.458 |
| d14 | 8.900 | 8.728 |
| d20 | 3.179 | 3.179 |
| d22 | 2.868 | 2.828 |
| d25 | −299.314 | −299.314 |

FIG. 48

ASPHERICAL COEFFICIENT

| | K | A4 | A6 | A8 | A10 | A12 | A14 |
|---|---|---|---|---|---|---|---|
| 23 | -5.000 | 1.17376E-05 | -7.97577E-07 | 9.29625E-09 | -2.87799E-11 | -1.34767E-13 | 4.80265E-16 |
| 24 | -20.000 | -3.05311E-05 | 1.11177E-07 | -2.32023E-10 | 1.59444E-11 | -1.55336E-13 | 3.61184E-16 |
| 25 | -2.500 | -2.80649E-06 | 1.26358E-09 | -5.77610E-13 | 1.74220E-16 | -3.17166E-20 | 2.55621E-24 |

FIG. 49

| | |
|---|---|
| DOT SIZE (μm) | 7.0000 |
| HORIZONTAL-DIRECTION LENGTH | 5.6000 |
| VERTICAL-DIRECTION LENGTH | 5.6000 |
| OPTICAL AXIS – ELEMENT CENTER DISTANCE (1) | -4.3156 |
| OPTICAL AXIS – ELEMENT CENTER DISTANCE (2) | -3.8780 |

FIG. 50

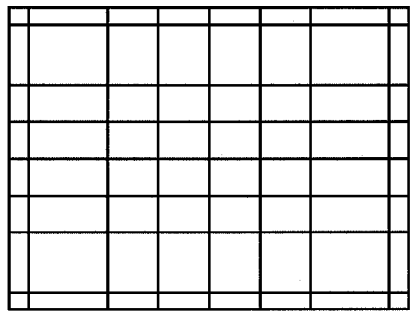

FIG. 51A

· TRAPEZOID DISTORTION V/SCREEN SIZE/SCREEN POSITION

|  | SHORT DISTANCE | STANDARD | LONG DISTANCE |
|---|---|---|---|
| DIAGONAL SIZE | 20" | 30" | 50" |
| TRAPEZOID V (%) | −0.665% | −0.012% | 0.239% |

FIG. 51B

· AMOUNT OF CHANGE FROM WHEN DISTANCE IS STANDARD PROJECTION DISTANCE

|  | MF (MAGNIFICATION CHANGEOVER FUNCTION) | | SF1 (SCREEN SHIFT FUNCTION) | | SF2 (SCREEN SHIFT FUNCTION) | |
|---|---|---|---|---|---|---|
|  | WIDE | TELE | +0.1 mm | −0.1 mm | +0.1 mm | −0.1 mm |
| TRAPEZOID V (%) | 0.01% | −0.01% | 0.06% | −0.05% | −0.03% | 0.04% |
| HORIZONTAL SIZE (%) | 0.32% | −0.32% | 0.09% | −0.09% | −0.06% | 0.05% |
| VERTICAL SIZE (%) | 0.33% | −0.33% | 0.31% | −0.30% | −0.16% | 0.15% |
| VERTICAL POSITION (%) | −0.32% | 0.32% | −2.93% | 2.91% | −0.63% | 0.63% |

FIG. 52

| | |
|---|---|
| (1) $0.2 < |\phi s/\phi 1| < 1.2$ | 1.00 (SF1) <br> 0.35 (SF2) |
| (2) $0.2 < |\phi m/\phi 1| < 0.9$ | 0.48 |
| (3) $0.2 < |\phi 12b/\phi 12| < 3.0$ | 0.97 |
| (4) $0.2 < |\phi 12b/\phi 12a| < 1.0$ | 0.57 |
| (5) $1.5 < M12b/M12a < 7.0$ | 3.21 |
| (6) $3 < DM < Dy$ | 7.03 |

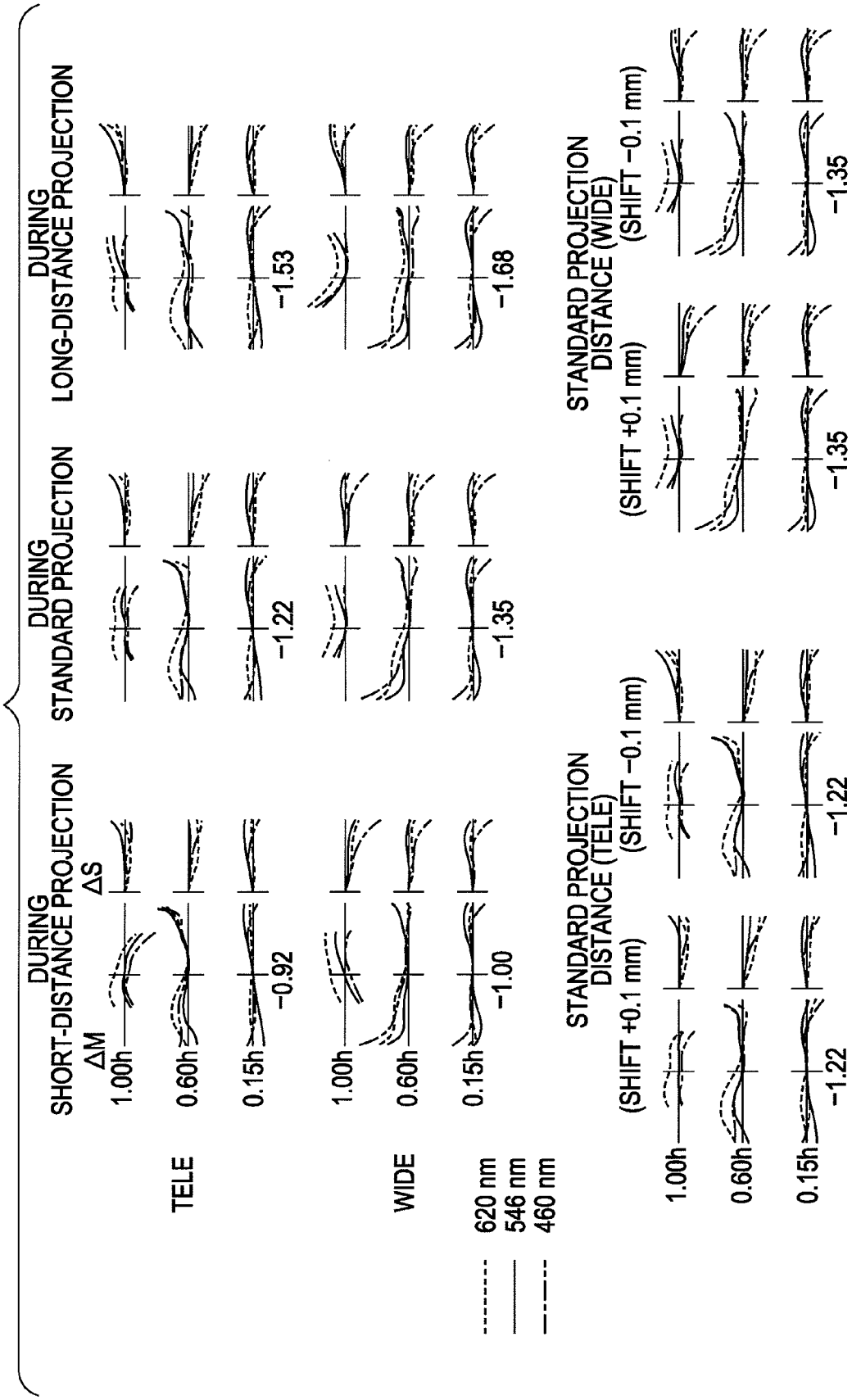

FIG. 56

| | FF | MF | SF | r | d | nd | νd | REMARKS |
|---|---|---|---|---|---|---|---|---|
| PRIMARY IMAGE SURFACE | | | | inf | 4.800 | | | |
| 1 | | | | inf | 24.000 | 1.51680 | 64.2 | COLOR COMBINING PRISM, ETC. |
| 2 | | | | inf | 4.700 | | | |
| 3 | | | | inf | 5.700 | 1.48749 | 70.4 | |
| 4 | | | | −37.3382 | 0.400 | | | |
| 5 | | | | 71.8311 | 5.000 | 1.62041 | 60.3 | |
| 6 | | | | −119.0078 | (d6) | | | |
| 7 | | | | 116.9983 | 3.100 | 1.58913 | 61.3 | |
| 8 | | | | −10677.642 | 1.500 | 1.80610 | 33.3 | |
| 9 | | | | 26.8342 | 8.500 | 1.48749 | 70.4 | |
| 10 | | | | −45.8074 | (d10) | | | |
| 11 | | | | 124.7672 | 1.300 | 1.80610 | 40.7 | |
| 12 | | | | 54.9825 | 15.500 | | | |
| 13 | | | | inf | (d13) | | | STOP |
| 14 | | | | 314.5633 | 1.500 | 1.75520 | 27.5 | |
| 15 | | | | 83.6906 | 5.700 | 1.74330 | 49.2 | |
| 16 | | | | −51.8966 | (d16) | | | |
| 17 | | | | 25.0091 | 5.000 | 1.48749 | 70.4 | |
| 18 | | | | 36.5616 | 0.300 | | | |
| 19 | | | | 25.7711 | 7.400 | 1.51742 | 52.2 | |
| 20 | | | | −88.6610 | 0.950 | | | |
| 21 | | | | −110.0613 | 1.300 | 1.74330 | 49.2 | |
| 22 | | | | 35.9734 | 4.650 | | | |
| 23 | | | | −59.5793 | 2.200 | 1.74330 | 49.2 | |
| 24 | | | | 30.9986 | (d24) | | | |
| 25 | | | | −74.9487 | 5.100 | 1.61293 | 37.0 | |
| 26 | | | | −43.4005 | (d26) | | | |
| 27 | * | | | −183.7773 | 5.500 | 1.53113 | 55.7 | |
| 28 | * | | | −411.2980 | 187.500 | | | |
| 29 | * | | | −74.2087 | (d29) | | | (REFLECTING SURFACE) |
| SECONDARY IMAGE SURFACE | | | | inf | 0.000 | | | |

*  · · · ASPHERICAL SURFACE

FIG. 57

| | | |
|---|---|---|
| PRIMARY IMAGE SURFACE SIDE NUMERICAL APERTURE NA | 0.28000 | TELE |
| PRIMARY IMAGE SURFACE SIDE NUMERICAL APERTURE NA | 0.28400 | WIDE |
| MAXIMUM HALF ANGLE OF VIEW ω | 68.4 deg. | TELE |
| MAXIMUM HALF ANGLE OF VIEW ω | 70.5 deg. | WIDE |
| MAXIMUM OBJECT HEIGHT y | −11.7 mm | |

FIG. 58

- SF (SCREEN SHIFT FUNCTION)

| DECENTERING RANGE | SURFACE 3 TO 16 |
|---|---|
| DECENTERING AMOUNT | +/−0.1 mm |

FIG. 59

- FF (FLOATING FUNCTION)
- MF (MAGNIFICATION CHANGEOVER FUNCTION)

DURING SHORT-DISTANCE PROJECTION

|  | TELE | | WIDE |
|---|---|---|---|
|  | Tele | Mid | Wide |
| fl | 5.176 | 4.941 | 4.704 |
| β | 91.786 | 96.157 | 100.9648 |
| d6 | 7.849 | 5.657 | 3.765 |
| d10 | 1.020 | 3.211 | 5.103 |
| d13 | 12.135 | 9.789 | 7.207 |
| d16 | 8.255 | 10.601 | 13.182 |
| d24 | 12.976 | 12.976 | 12.976 |
| d26 | 8.775 | 8.775 | 8.775 |
| d29 | −515.298 | −515.298 | −515.298 |

STANDARD PROJECTION DISTANCE

|  | TELE | | WIDE |
|---|---|---|---|
|  | Tele | Mid | Wide |
| fl | 5.094 | 4.863 | 4.630 |
| β | 122.382 | 128.209 | 134.620 |
| d6 | 7.849 | 5.657 | 3.765 |
| d10 | 1.020 | 3.211 | 5.103 |
| d13 | 12.135 | 9.789 | 7.207 |
| d16 | 7.260 | 9.606 | 12.188 |
| d24 | 8.989 | 8.989 | 8.989 |
| d26 | 13.756 | 13.756 | 13.756 |
| d29 | −657.984 | −657.984 | −657.984 |

DURING LONG-DISTANCE PROJECTION

|  | TELE | | WIDE |
|---|---|---|---|
|  | Tele | Mid | Wide |
| fl | 5.033 | 4.805 | 4.574 |
| β | 152.977 | 160.262 | 168.275 |
| d6 | 7.849 | 5.657 | 3.765 |
| d10 | 1.020 | 3.211 | 5.103 |
| d13 | 12.135 | 9.789 | 7.207 |
| d16 | 6.643 | 8.990 | 11.571 |
| d24 | 6.208 | 6.208 | 6.208 |
| d26 | 17.154 | 17.154 | 17.154 |
| d29 | −799.298 | −799.298 | −799.298 |

FIG. 60

ASPHERICAL COEFFICIENT

| | K | A1 | A2 | A4 | A6 | A8 | A10 | A12 | A14 |
|---|---|---|---|---|---|---|---|---|---|
| 27 | 50.000 | 0.000 | 0.000 | -3.16825E-06 | -7.80504E-09 | 2.07032E-11 | 1.27197E-14 | -5.13292E-17 | 9.87415E-21 |
| 28 | -2000.000 | 0.000 | 0.000 | -6.98112E-06 | 4.59523E-09 | -1.27594E-11 | 4.75428E-14 | -6.38610E-17 | 2.33007E-20 |
| 29 | -2.100 | -1.89305E-03 | -2.25555E-05 | -1.44852E-07 | 6.47716E-12 | -4.36689E-16 | 2.64062E-20 | -1.57921E-24 | 4.77785E-29 |

FIG. 61

| | |
|---|---|
| DOT SIZE ($\mu$m) | 10.0000 |
| HORIZONTAL-DIRECTION LENGTH | 12.8000 |
| VERTICAL-DIRECTION LENGTH | 8.0000 |
| OPTICAL AXIS – ELEMENT CENTER DISTANCE | -5.7944 |

FIG. 62

TELE

WIDE

FIG. 63A

- TRAPEZOID DISTORTION V/SCREEN SIZE/SCREEN POSITION

TELE

|  | SHORT DISTANCE | STANDARD | LONG DISTANCE |
| --- | --- | --- | --- |
| DIAGONAL SIZE | 54.55" | 72.73" | 90.91" |
| TRAPEZOID V (%) | −0.232% | 0.062% | 0.214% |

WIDE

|  | SHORT DISTANCE | STANDARD | LONG DISTANCE |
| --- | --- | --- | --- |
| DIAGONAL SIZE | 60" | 80" | 100" |
| TRAPEZOID V (%) | −0.263% | −0.002% | 0.110% |

FIG. 63B

- SF (SCREEN SHIFT FUNCTION)

|  | TELE | | WIDE | |
| --- | --- | --- | --- | --- |
|  | +0.1 mm | −0.1 mm | +0.1 mm | −0.1 mm |
| TRAPEZOID V (%) | −0.01% | 0.01% | −0.05% | −0.07% |
| HORIZONTAL SIZE (%) | −0.01% | 0.01% | 0.00% | 0.00% |
| VERTICAL SIZE (%) | 0.03% | −0.03% | 0.03% | −0.03% |
| VERTICAL POSITION (%) | −1.75% | 1.75% | −1.71% | 1.71% |

FIG. 64

| | |
| --- | --- |
| (1) $0.2 < |\phi s / \phi 1| < 1.2$ | 0.54 |
| (2) $0.2 < |\phi m / \phi 1| < 0.9$ | 0.41 |
| (3) $0.2 < |\phi 12b / \phi 12| < 3.0$ | 0.53 |
| (4) $0.2 < |\phi 12b / \phi 12a| < 1.0$ | 0.38 |
| (5) $1.5 < M12b / M12a < 7.0$ | 5.20 |
| (6) $3 < DM < Dy$ | 9.08 |

FIG. 68

| | FF | MF | SF | r | d | nd | νd | REMARKS |
|---|---|---|---|---|---|---|---|---|
| PRIMARY IMAGE SURFACE | | | | inf | 4.800 | | | |
| 1 | | | | inf | 24.000 | 1.51680 | 64.2 | COLOR COMBINING PRISM, ETC. |
| 2 | | | | inf | 4.700 | | | |
| 3 | | { | | inf | 5.700 | 1.48749 | 70.4 | |
| 4 | | | | −37.2532 | 0.300 | | | |
| 5 | | | | 69.0669 | 4.000 | 1.62041 | 60.3 | |
| 6 | | | | −239.5289 | (d6) | | | |
| 7 | | { | | 69.2213 | 4.100 | 1.58913 | 61.3 | |
| 8 | | | | −2074.327 | 1.500 | 1.80610 | 33.3 | |
| 9 | | | | 26.4845 | 8.300 | 1.48749 | 70.4 | |
| 10 | | | | −53.8532 | (d10) | | | |
| 11 | | { | | 71.1209 | 1.300 | 1.80610 | 40.7 | |
| 12 | | | | 40.8337 | 14.838 | | | |
| 13 | | { | | inf | (d13) | | | STOP |
| 14 | | | | 290.2543 | 1.500 | 1.75520 | 27.5 | |
| 15 | | | | 84.6251 | 6.000 | 1.74330 | 49.2 | |
| 16 | | | | −49.2506 | (d16) | | | |
| 17 | | | { | 24.8617 | 4.000 | 1.48749 | 70.4 | |
| 18 | | | | 36.6803 | 0.400 | | | |
| 19 | | | | 26.6817 | 7.600 | 1.51742 | 52.2 | |
| 20 | | | | −88.6408 | 0.900 | | | |
| 21 | | | | −125.8796 | 1.400 | 1.74330 | 49.2 | |
| 22 | | | | 37.4709 | 4.850 | | | |
| 23 | | | | −56.5740 | 1.300 | 1.74330 | 49.2 | |
| 24 | | | | 30.3679 | (d24) | | | |
| 25 | | | { | −60.3663 | 4.800 | 1.61293 | 37.0 | |
| 26 | | | | −37.7998 | (d26) | | | |
| 27 | * | | | −151.9007 | 5.500 | 1.53113 | 55.7 | |
| 28 | * | | | −392.0905 | 187.500 | | | |
| 29 | * | | | −74.4021 | (d29) | | | (REFLECTING SURFACE) |
| SECONDARY IMAGE SURFACE | | | | inf | 0.000 | | | |

* · · · ASPHERICAL SURFACE

FIG. 69

| | | |
|---|---|---|
| PRIMARY IMAGE SURFACE SIDE NUMERICAL APERTURE NA | 0.26930 | TELE |
| PRIMARY IMAGE SURFACE SIDE NUMERICAL APERTURE NA | 0.28300 | WIDE |
| MAXIMUM HALF ANGLE OF VIEW ω | 66.3 deg. | TELE |
| MAXIMUM HALF ANGLE OF VIEW ω | 70.5 deg. | WIDE |
| MAXIMUM OBJECT HEIGHT y | −11.7 mm | |

FIG. 70

- SF (SCREEN SHIFT FUNCTION)

| DECENTERING RANGE | SURFACE 3 TO 16 |
|---|---|
| DECENTERING AMOUNT | +/−0.1 mm |

FIG. 71

- FF (FLOATING FUNCTION)
- MF (MAGNIFICATION CHANGEOVER FUNCTION)

DURING SHORT-DISTANCE PROJECTION

|  | TELE | | WIDE |
|---|---|---|---|
|  | Tele | Mid | Wide |
| fl | 5.499 | 5.027 | 4.554 |
| β | 83.442 | 91.371 | 100.965 |
| d6 | 11.365 | 6.673 | 1.723 |
| d10 | 1.000 | 4.405 | 7.087 |
| d13 | 10.494 | 7.298 | 4.228 |
| d16 | 9.015 | 13.498 | 18.837 |
| d24 | 13.127 | 13.127 | 13.127 |
| d26 | 2.287 | 2.287 | 2.287 |
| d29 | −515.808 | −515.808 | −515.808 |

STANDARD PROJECTION DISTANCE

|  | TELE | | WIDE |
|---|---|---|---|
|  | Tele | Mid | Wide |
| fl | 5.424 | 4.959 | 4.492 |
| β | 111.256 | 121.828 | 134.620 |
| d6 | 11.365 | 6.673 | 1.723 |
| d10 | 1.000 | 4.406 | 7.087 |
| d13 | 10.494 | 7.298 | 4.228 |
| d16 | 8.129 | 12.612 | 17.951 |
| d24 | 9.579 | 9.579 | 9.579 |
| d26 | 6.721 | 6.721 | 6.721 |
| d29 | −658.655 | −658.655 | −658.655 |

DURING LONG-DISTANCE PROJECTION

|  | TELE | | WIDE |
|---|---|---|---|
|  | Tele | Mid | Wide |
| fl | 5.365 | 4.905 | 4.444 |
| β | 139.070 | 152.285 | 168.275 |
| d6 | 11.365 | 6.673 | 1.723 |
| d10 | 1.000 | 4.405 | 7.087 |
| d13 | 10.494 | 7.298 | 4.228 |
| d16 | 7.568 | 12.051 | 17.389 |
| d24 | 6.989 | 6.989 | 6.989 |
| d26 | 9.872 | 9.872 | 9.872 |
| d29 | −800.656 | −800.656 | −800.656 |

FIG. 72

ASPHERICAL COEFFICIENT

| | K | A1 | A2 | A4 | A6 | A8 | A10 | A12 | A14 |
|---|---|---|---|---|---|---|---|---|---|
| 27 | 40.000 | 0.000 | 0.000 | −2.82931E−06 | −4.79718E−09 | 2.87554E−11 | −7.11196E−15 | −7.50772E−17 | 3.67089E−20 |
| 28 | −2000.000 | 0.000 | 0.000 | −7.94770E−06 | 9.21032E−09 | −1.48596E−11 | 3.46146E−14 | −5.22081E−17 | 1.60193E−20 |
| 29 | −2.000 | −1.93151E−03 | −1.41696E−04 | −1.43982E−07 | 6.02276E−12 | −4.52409E−16 | 2.80356E−20 | −1.44855E−24 | 3.73015E−29 |

FIG. 73

| | |
|---|---|
| DOT SIZE (μm) | 10.0000 |
| HORIZONTAL-DIRECTION LENGTH | 12.8000 |
| VERTICAL-DIRECTION LENGTH | 8.0000 |
| OPTICAL AXIS − ELEMENT CENTER DISTANCE | −5.7944 |

FIG. 74

TELE

WIDE

FIG. 75A

· TRAPEZOID DISTORTION V/SCREEN SIZE/SCREEN POSITION

TELE

|  | SHORT DISTANCE | STANDARD | LONG DISTANCE |
|---|---|---|---|
| DIAGONAL SIZE | 49.59" | 66.12" | 82.65" |
| TRAPEZOID V (%) | −0.306% | 0.001% | 0.148% |

WIDE

|  | SHORT DISTANCE | STANDARD | LONG DISTANCE |
|---|---|---|---|
| DIAGONAL SIZE | 60" | 80" | 100" |
| TRAPEZOID V (%) | −0.232% | 0.043% | 0.124% |

FIG. 75B

· SF (SCREEN SHIFT FUNCTION)

|  | TELE | | WIDE | |
|---|---|---|---|---|
|  | +0.1mm | −0.1mm | +0.1mm | −0.1mm |
| TRAPEZOID V (%) | 0.00% | −0.01% | 0.02% | 0.08% |
| HORIZONTAL SIZE (%) | 0.01% | −0.01% | 0.00% | 0.00% |
| VERTICAL SIZE (%) | −0.02% | 0.02% | −0.02% | 0.02% |
| VERTICAL POSITION (%) | 1.79% | −1.79% | 1.70% | −1.70% |

FIG. 76

| | |
|---|---|
| (1) $0.2 < |\phi s/\phi 1| < 1.2$ | 0.53 |
| (2) $0.2 < |\phi m/\phi 1| < 0.9$ | 0.41 |
| (3) $0.2 < |\phi 12b/\phi 12| < 3.0$ | 0.53 |
| (4) $0.2 < |\phi 12b/\phi 12a| < 1.0$ | 0.39 |
| (5) $1.5 < M12b/M12a < 7.0$ | 5.24 |
| (6) $3 < DM < Dy$ | 9.11 |

FIG. 77A
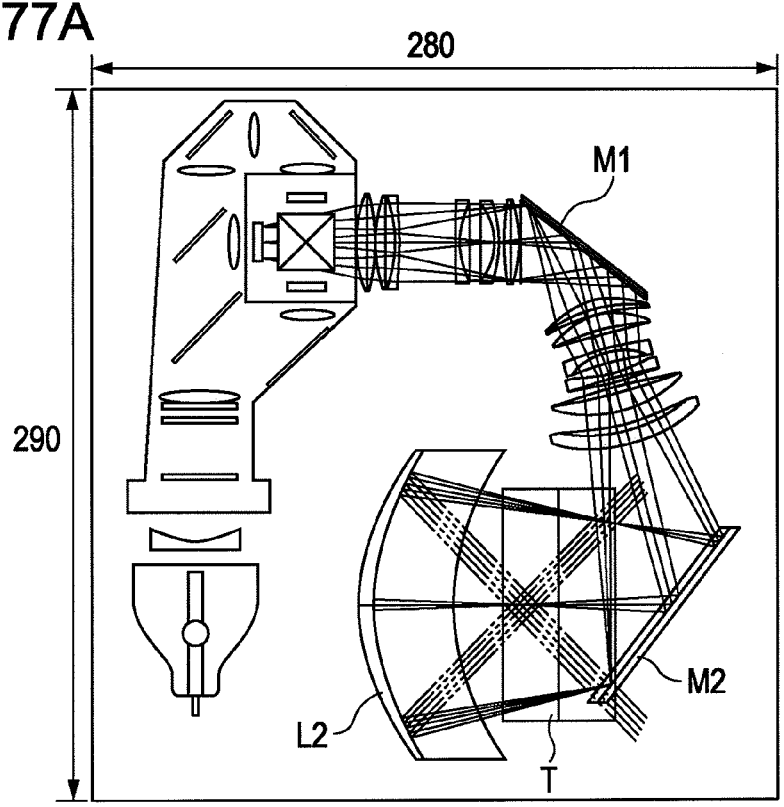
FIG. 77B
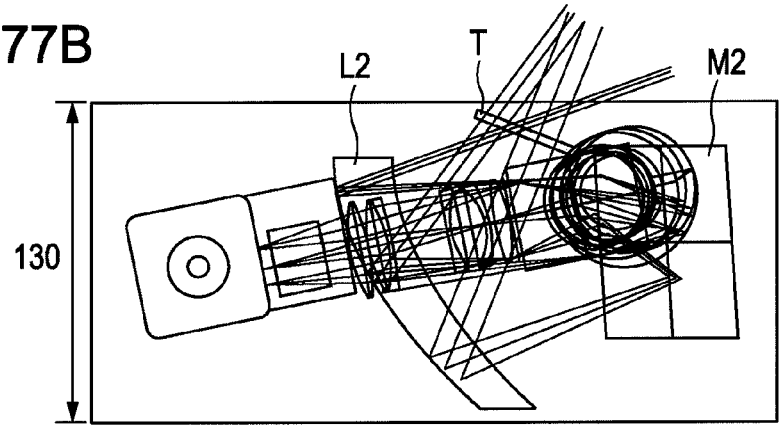
FIG. 78
| | |
|---|---|
| (8) $30 < |\beta 1| < 65$ | 53 |
| (9) $3 < \alpha 1 < 15$ | 6 |
| (10) $20 < |\beta 2| < 45$ | 37 |
| (11) $-15 < \alpha 2 < -3$ | -6 |
| (12) $-20 < \alpha 1 + \alpha 2 < 20$ | 0 |
| (13) $70 < \beta 1 + \beta 2 < 110$ | 90 |
| (14) $60 < \alpha t < 87$ | 70 |

FIG. 79A
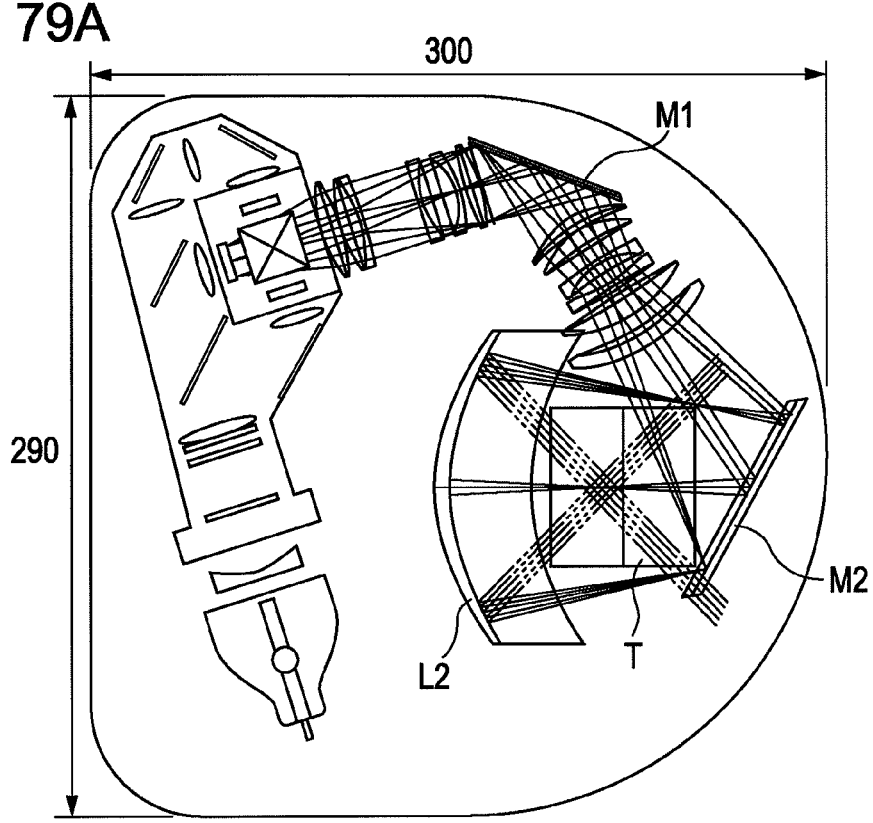
FIG. 79B
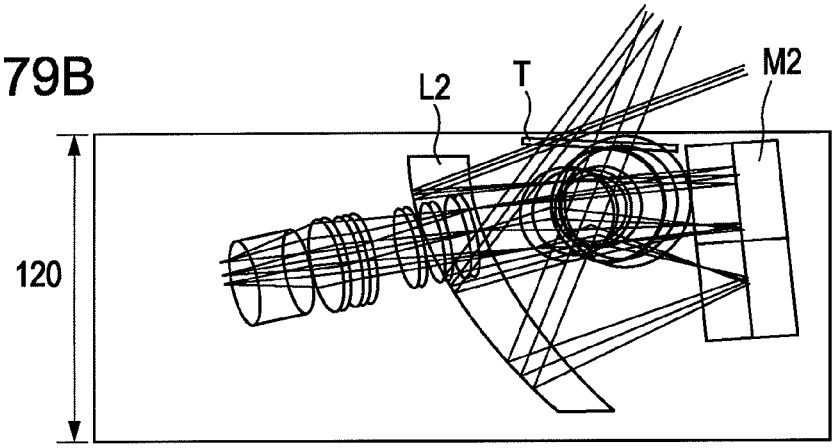
FIG. 80
| | |
|---|---|
| (8) $30 < |\beta 1| < 65$ | 53 |
| (9) $3 < \alpha 1 < 15$ | 6 |
| (10) $20 < |\beta 2| < 45$ | 28 |
| (11) $-15 < \alpha 2 < -3$ | -6 |
| (12) $-20 < \alpha 1 + \alpha 2 < 20$ | 0 |
| (13) $70 < \beta 1 + \beta 2 < 110$ | 81 |
| (14) $60 < \alpha t < 87$ | 85 |

FIG. 82A
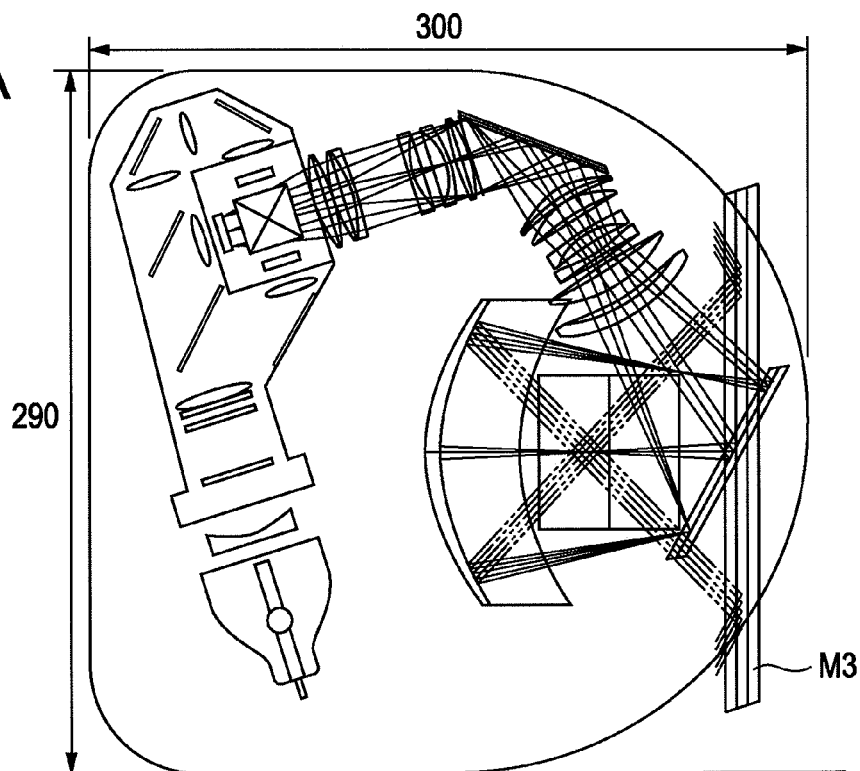
FIG. 82B
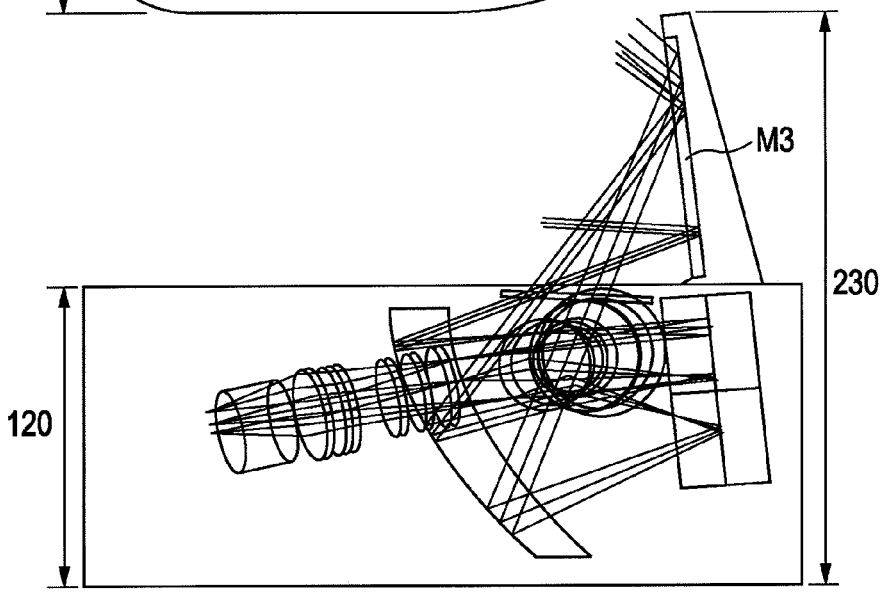
FIG. 83
| | |
|---|---|
| (8) $30 < |\beta 1| < 65$ | 53 |
| (9) $3 < \alpha 1 < 15$ | 6 |
| (10) $20 < |\beta 2| < 45$ | 28 |
| (11) $-15 < \alpha 2 < -3$ | -6 |
| (12) $-20 < \alpha 1 + \alpha 2 < 20$ | 0 |
| (13) $70 < \beta 1 + \beta 2 < 110$ | 81 |
| (14) $0 < \alpha 3 < 15$ | 7 |
| (15) $60 < \alpha t < 87$ | 85 |

FIG. 85A
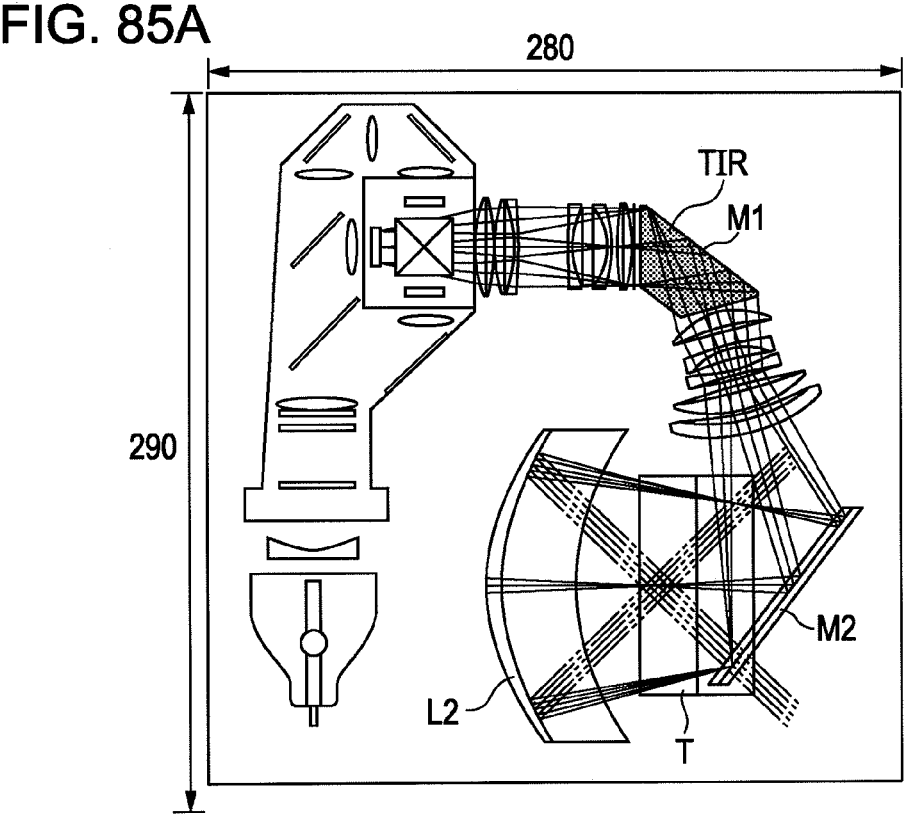
FIG. 85B
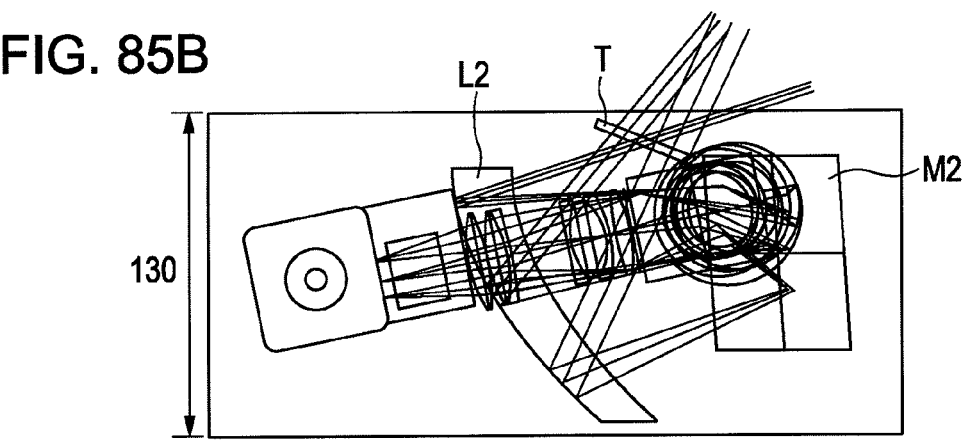
FIG. 86
| | |
|---|---|
| (8) $30<|\beta 1|<65$ | 53 |
| (9) $3<\alpha 1<15$ | 6.5 |
| (10) $20<|\beta 2|<45$ | 37 |
| (11) $-15<\alpha 2<-3$ | -6.5 |
| (12) $-20<\alpha 1+\alpha 2<20$ | 0 |
| (13) $70<\beta 1+\beta 2<110$ | 90 |
| (14) $60<\alpha t<87$ | 70 |

PROJECTION IMAGE DISPLAY DEVICE AND PROJECTION OPTICAL SYSTEM FOR PERFORMING EXTENDED PROJECTION

BACKGROUND OF THE INVENTION

1. Field of the Invention

The present invention relates to a projection image display device that displays a projection image on a screen and a projection optical system used in the projection image display device.

2. Description of the Related Art

In recent years, as a projection image display device that displays a projection image on a screen, a projector device is widely available. In particular, in recent years, there is an increasing demand for a front-projection projector device of a super-wide angle type capable of performing a displaying operation on a large screen with a small projection space. A front-projection projector device of a super-wide angle type is used because projection can be performed on a large screen in a limited space by driving it in obliquely and at a wide angle with respect to the screen.

However, if the projector device is, for example, a super-wide angle type in which a super-wide angle is approximately 70 degrees in terms of a half angle of view, an image size, an image position on the screen, etc., are greatly changed when the distance between the projector device and the screen is only slightly changed.

For example, as shown in FIG. 87, a light ray is incident upon a screen at an angle θ. If a distance measured perpendicular to an in-plane of the screen is changed by only L, a displacement amount x of a position of the light ray that is incident upon the screen is proportional to tan θ. If the projector device is not a super-wide angle type, the angle θ is approximately 20 degrees. In contrast, if the projector device is a super-wide angle type, the light ray is incident upon the screen at the angle θ of around 70 degrees. Therefore, a sensitivity ratio is approximately 7.5× (=tan 70°/tan 20°). Therefore, for the projector device of a super-wide angle type, when, in adjusting a setting position of the projector device in accordance with a projection surface, the distance between the projector device and the screen is only slightly changed, for example, the image position is greatly changed.

Such a problem in which, for example, the image position is changed may be overcome by making use of a screen shift function and a magnification changeover function in a projection optical system. That is, as shown in FIG. 88, an optical-axis position of a projection optical system PJ is moved perpendicularly to a position of an image modulating element P, to move a screen position on a screen SCR.

More specifically, a projection image display device including a relay optical system (which has a magnification changeover function) and an aspherical reflecting mirror (which performs extended projection at an image-formation screen of the relay optical system) and realizing a screen shift function by moving the entire relay optical system is proposed. (Refer to, for example, Japanese Unexamined Patent Application Publication No. 2007-11248 (Patent Document 1).)

In addition, another display device making use of an fθ optical system, including a refracting system and a plurality of free-form surfaces, including a plane reflecting surface at an exit pupil surface of the refracting system, and realizing a screen shift function by rotating the plane reflecting surface is proposed. (Refer to, for example, Japanese Patent No. 4086686 (Patent Document 2).)

Further, still another display device that achieves a screen shift function by moving an image modulating element when a screen is moved during magnification change or by inserting a parallel plate between a projection optical system and the image modulating element and tilting the parallel plate is proposed. (Refer to, for example, Japanese Unexamined Patent Application Publication No. 185709 (Patent Document 3).)

SUMMARY OF THE INVENTION

However, the above-described related arts have the following problems.

For example, in the structure shown in FIG. 7, although a screen is more flexibly shifted in terms of screen shift amounts by a screen shift function, it is necessary to move the entire projection optical system. Therefore, as a mechanism for realizing the screen shift function, it is necessary to use a large mechanism that can withstand the weight of the entire projection optical system, as a result of which costs may be considerably increased.

In the structure disclosed in Patent Document 1, since it is necessary to use a relay optical system, it is possible for the size of the entire optical system including the projection optical system to be increased, and costs to be increased.

In the structure disclosed in Patent Document 2, the refracting system is small, but it is necessary to use a plurality of free-form surfaces that are difficult to manufacture compared to rotationally symmetric aspherical surfaces. Therefore, it is difficult to, for example, secure the reflecting surfaces. As a result, costs of the optical system may be increased.

Further, as disclosed in Patent Document 3, in the structure in which the image modulating element itself is moved, although the structure can be relatively easily formed as a projection optical system, it is necessary to make large an area at which illumination is previously uniformly performed from an illumination optical system to the image modulating element itself, or to simultaneously move the image modulating element and the illumination optical system including a light source. In the former case, brightness is reduced. In the latter case, the size and costs of a mechanical portion are increased. When the parallel plate is tilted, optical performance for producing astigmatic difference is reduced.

That is, in the above-described related arts, when realizing the screen shift function, the structure of the device is increased in size or is made complicated, thereby making it possible to increase costs.

In general, in order for a super-wide angle type to obtain the same brightness as that of a related type that is not a super-wide angle type, it is necessary to provide an optical system that includes a large curved reflecting surface having a large numerical aperture (or a small F number) for achieving a bright screen. In other words, when an attempt is made to form an optical system of a super-wide angle type that provides a brightness that is equivalent to that of a type that is not a super-wide angle type, costs tend to increase compared to costs of the type that is not a super-wide angle type. Therefore, in order to realize the screen shift function, it is desirable to keep costs as low as possible.

A projector device may be set using a setting mechanism such as what is called a ceiling suspension fitting. Such a setting mechanism ordinarily has the function of adjusting a setting position.

However, most general adjusting functions are realized by structures that involve tightening with, for example, bolts. Therefore, it is difficult to perform fine adjustment in units of a few mm. Consequently, when the super-wide angle type is used, only using the aforementioned adjustment function that has difficulty in achieving the fine adjustment is not enough.

Therefore, for the super-wide angle type, a dedicated adjustment function capable of fine adjustment in units of a few mm units may be included. However, such a dedicated adjustment function is not used in cases other than the case in which the super-wide angle type is used, and is, thus, not versatile. As a result, costs are increased.

It is desirable to provide a projection image display device and a projection optical system that easily and reliably performs fine adjustment of, for example, an image position with a small and inexpensive structure even for a super-wide angle type by allowing a screen shift function to be realized by a simple structure.

According to an embodiment of the present invention, there is provided a projection image display device including a light source; an illumination optical system that uniformly irradiates a surface of an image modulating element with a light beam emitted from the light source, the surface of the image modulating element being a primary image surface; and a projection optical system that performs with respect to a screen extended projection on image information provided at the primary image surface and modulated by the image modulating element, the screen being a secondary image surface. The projection optical system includes a first optical system having a positive refractive power, and a second optical system having a concave reflecting surface. The first optical system has a common optical axis at which all optical components of the first optical system have rotationally symmetric surfaces, and a screen shift function that causes the secondary image surface to be moved by moving at least one of the optical components of the first optical system substantially perpendicularly to the optical axis.

In the projection image display device having the above-described structure, by moving at least one optical component of the first optical system substantially perpendicularly to the optical axis, the secondary image surface on the screen is moved. That is, by moving the at least one optical component of the first optical system, the screen shift function is realized. Therefore, compared to, for example, the case in which the entire projection optical system is moved or the case in which the image modulating element is moved, the number of components to be moved is reduced and the display device is smaller, so that it is possible to achieve the screen shift function with a simple structure.

According to the present invention, it is possible to realize the screen shift function with a simple structure. Therefore, even for the super-wide angle type, it is possible to easily and reliably perform fine adjustment on, for example, an image position by using the screen shift function. Moreover, even in this case, it is possible to prevent an increase in size and sophistication (both of which cause an increase in costs) of the structure for realizing the screen shift function. That is, the screen shift can be carried out with an inexpensive and small structure.

BRIEF DESCRIPTION OF THE DRAWINGS

FIGS. 4A and 4B are fourth diagrams regarding an advantage of the super-wide angle liquid crystal projector device;

FIGS. 5A and 5B are fifth diagrams regarding an advantage of the super-wide angle liquid crystal projector device;

FIG. 11 shows a specific example of lens data of the projection optical system according to the first embodiment;

FIG. 12 shows specific examples of a primary image surface side numerical aperture NA, a maximum half angle of view ω when a distance is a standard projection distance, and a maximum primary image surface height y in the projection optical system according to the first embodiment;

FIGS. 13A, 13B, and 13C show specific examples of a movement amount and a lens group having a screen shift function, and specific examples of lens intervals regarding a floating function and a magnification changeover function, in the projection optical system according to the first embodiment;

FIG. 14 shows specific examples of aspherical coefficients corresponding to the projection optical system according to the first embodiment;

FIG. 15 shows values of a specific example of an image modulating element according to the first embodiment;

FIG. 16 shows a TV distortion state when the image modulating element described with reference to FIG. 15 is subjected to extended projection at a secondary image surface using the projection optical system according to the first embodiment;

FIGS. 17A and 17B show specific examples of amounts of changes in, for example, a diagonal size and image distortion, when the image modulating element described with reference to FIG. 15 is subjected to extended projection at the secondary image surface using the projection optical system according to the first embodiment;

FIG. 18 shows specific examples of formulas on which calculations of, for example, the amounts of changes in, for example, the diagonal size and the image distortion at the secondary image surface are based;

FIG. 19 shows an example of a specific numerical value for each of Conditional Expressions (1) to (6) in the projection optical system according to the first embodiment;

FIG. 23 shows a specific example of lens data of the projection optical system according to the second embodiment;

FIG. 24 shows specific examples of a primary image surface side numerical aperture NA, a maximum half angle of view ω when a distance is a standard projection distance, and a maximum primary image surface height y in the projection optical system according to the second embodiment;

FIGS. 25A, 25B, and 25C show specific examples of a movement amount and a lens group having a screen shift function, and specific examples of lens intervals regarding a floating function and a magnification changeover function, in the projection optical system according to the second embodiment;

FIG. 26 shows specific examples of aspherical coefficients corresponding to the projection optical system according to the second embodiment;

FIG. 27 shows values of a specific example of an image modulating element according to the second embodiment;

FIG. 28 shows a TV distortion state when the image modulating element described with reference to FIG. 27 is subjected to extended projection at a secondary image surface using the projection optical system according to the second embodiment;

FIGS. 29A and 29B show specific examples of amounts of changes in, for example, a diagonal size and image distortion, when the image modulating element described with reference to FIG. 27 is subjected to extended projection at the secondary image surface using the projection optical system according to the second embodiment;

FIG. 30 shows an example of a specific numerical value for each of the Conditional Expressions (1) to (6) in the projection optical system according to the second embodiment;

FIG. 34 shows a specific example of lens data of the projection optical system according to the third embodiment;

FIG. 35 shows specific examples of a primary image surface side numerical aperture NA, a maximum half angle of view ω when a distance is a standard projection distance, and a maximum primary image surface height y in the projection optical system according to the third embodiment;

FIGS. 36A, 36B, and 36C show specific examples of a movement amount and a lens group having a screen shift function, and specific examples of lens intervals regarding a floating function and a magnification changeover function, in the projection optical system according to the third embodiment;

FIG. 37 shows specific examples of aspherical coefficients corresponding to the projection optical system according to the third embodiment;

FIG. 38 shows values of a specific example of an image modulating element according to the third embodiment;

FIG. 39 shows a TV distortion state when the image modulating element described with reference to FIG. 38 is subjected to extended projection at a secondary image surface using the projection optical system according to the third embodiment;

FIGS. 40A and 40B show specific examples of amounts of changes in, for example, a diagonal size and image distortion, when the image modulating element described with reference to FIG. 38 is subjected to extended projection at the secondary image surface using the projection optical system according to the third embodiment;

FIG. 41 shows an example of a specific numerical value for each of the Conditional Expressions (1) to (6) in the projection optical system according to the third embodiment;

FIG. 45 shows a specific example of lens data of the projection optical system according to the fourth embodiment;

FIG. 46 shows specific examples of a primary image surface side numerical aperture NA, a maximum half angle of view ω when a distance is a standard projection distance, and a maximum primary image surface height y in the projection optical system according to the fourth embodiment;

FIG. 48 shows specific examples of aspherical coefficients corresponding to the projection optical system according to the fourth embodiment;

FIG. 49 shows values of a specific example of an image modulating element according to the fourth embodiment;

FIGS. 47A, 47B, and 47C show specific examples of a movement amount and a lens group having a screen shift function, and specific examples of lens intervals regarding a floating function and a magnification changeover function, in the projection optical system according to the fourth embodiment;

FIG. 50 shows a TV distortion state when the image modulating element described with reference to FIG. 49 is subjected to extended projection at a secondary image surface using the projection optical system according to the fourth embodiment;

FIGS. 51A and 51B show specific examples of amounts of changes in, for example, a diagonal size and image distortion, when the image modulating element described with reference to FIG. 49 is subjected to extended projection at the secondary image surface using the projection optical system according to the fourth embodiment;

FIG. 52 shows an example of a specific numerical value for each of the Conditional Expressions (1) to (6) in the projection optical system according to the fourth embodiment;

FIG. 55 shows lateral aberrations caused by the projection optical system according to the fifth embodiment;

FIG. 56 shows a specific example of lens data of the projection optical system according to the fifth embodiment;

FIG. 57 shows specific examples of a primary image surface side numerical aperture NA, a maximum half angle of view ω when a distance is a standard projection distance, and a maximum primary image surface height y in the projection optical system according to the fifth embodiment;

FIG. 58 shows specific examples of a movement amount and a lens group having a screen shift function in the projection optical system according to the fifth embodiment;

FIG. 59 illustrates specific examples of lens intervals regarding a floating function and a magnification changeover function, in the projection optical system according to the fifth embodiment;

FIG. 60 shows specific examples of aspherical coefficients corresponding to the projection optical system according to the fifth embodiment;

FIG. 61 shows values of a specific example of an image modulating element according to the fifth embodiment;

FIG. 62 shows TV distortion states when the image modulating element described with reference to FIG. 61 is subjected to extended projection at a secondary image surface using the projection optical system according to the fifth embodiment;

FIGS. 63A and 63B show specific examples of amounts of changes in, for example, a diagonal size and image distortion, when the image modulating element described with reference to FIG. 61 is subjected to extended projection at the secondary image surface using the projection optical system according to the fifth embodiment;

FIG. 64 shows an example of a specific numerical value for each of the Conditional Expressions (1) to (6) in the projection optical system according to the fifth embodiment;

FIG. 68 shows a specific example of lens data of the projection optical system according to the sixth embodiment;

FIG. 69 shows specific examples of a primary image surface side numerical aperture NA, a maximum half angle of view ω when a distance is a standard projection distance, and a maximum primary image surface height y in the projection optical system according to the sixth embodiment;

FIG. 70 shows specific examples of a movement amount and a lens group having a screen shift function in the projection optical system according to the sixth embodiment;

FIG. 71 shows specific examples of lens intervals regarding a floating function and a magnification changeover function in the projection optical system according to the sixth embodiment;

FIG. 72 shows specific examples of aspherical coefficients corresponding to the projection optical system according to the sixth embodiment;

FIG. 73 shows values of a specific example of an image modulating element according to the sixth embodiment;

FIG. 74 shows TV distortion states when the image modulating element described with reference to FIG. 73 is subjected to extended projection at a secondary image surface using the projection optical system according to the sixth embodiment;

FIGS. 75A and 75B show specific examples of amounts of changes in, for example, a diagonal size and image distortion, when the image modulating element described with reference to FIG. 73 is subjected to extended projection at the secondary image surface using the projection optical system according to the sixth embodiment;

FIG. 76 shows an example of a specific numerical value for each of the Conditional Expressions (1) to (6) in the projection optical system according to the sixth embodiment;

FIGS. 77A and 77B schematically illustrate an exemplary structure of a projection optical system according to a seventh embodiment;

FIG. 78 shows an example of a specific numerical value for each of Conditional Expressions (8) to (14) in the projection optical system according to the seventh embodiment;

FIGS. 79A and 79B schematically illustrate an exemplary structure of a projection optical system according to an eighth embodiment;

FIG. 80 shows an example of a specific numerical value for each of the Conditional Expressions (8) to (14) in the projection optical system according to the eighth embodiment;

FIGS. 82A and 82B schematically illustrate an exemplary structure of a projection optical system according to a ninth embodiment;

FIG. 83 shows an example of a specific numerical value for each of the Conditional Expressions (8) to (15) in the projection optical system according to the ninth embodiment;

FIGS. 85A and 85B schematically illustrate an exemplary structure of a projection optical system according to a tenth embodiment;

FIG. 86 shows an example of a specific numerical value for each of the Conditional Expressions (8) to (14) in the projection optical system according to the tenth embodiment;

DESCRIPTION OF THE PREFERRED EMBODIMENTS

A projection image display device and a projection optical system according to embodiments of the present invention will hereunder be described with reference to the drawings.
General Description of Projection Image Display Device First, a general description of the projection image display device will simply be given using a liquid crystal projector device as an example.

The liquid crystal projector device is formed so that light emitted from a light source (such as a high-pressure mercury lamp) is modulated by a liquid crystal display element (which is an image modulating element) and is used to form an optical image in accordance with an image signal, and so that the optical image is extended and projected by a projection optical system to display the optical image on a screen. As such a liquid crystal projector device, what is called a three-plate type liquid crystal projector device is used. The three-plate type includes panel liquid crystal display elements corresponding to red (R), green (G), and blue (B). In the description below, the panel liquid crystal display elements may also be simply called the "liquid crystal panels."

In the liquid crystal projector device described here, the projection optical system is a super-wide angle type capable of achieving a super-wide angle of, for example, approximately 70 degrees in terms of a half angle of view.

Advantages of the capability of achieving a super-wide angle are, for example, as follows.

FIGS. 1A to 5B illustrate first to fifth advantages of the liquid crystal projector device of the super-wide angle type.

Figure 1A:
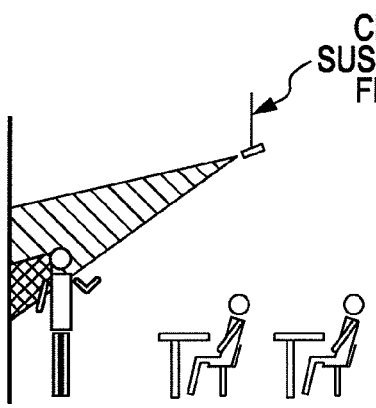
FIGS. 1A and 1B are first diagrams regarding an advantage of a super-wide angle liquid crystal projector device.
Figure 1B:
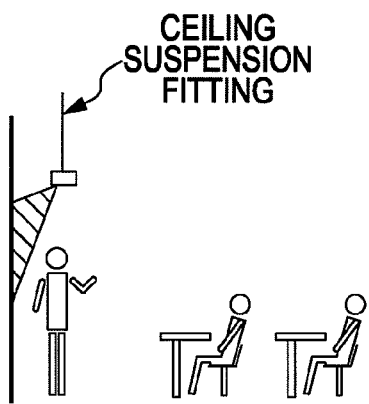
Figure 2A:
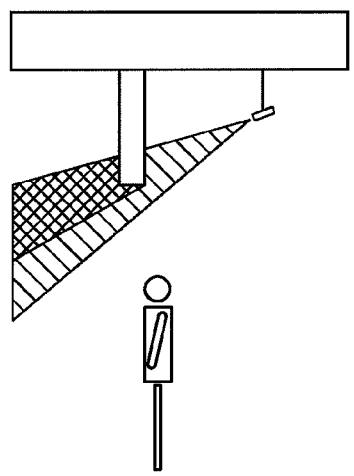
FIGS. 2A and 2B are second diagrams regarding an advantage of the super-wide angle liquid crystal projector device.
Figure 2B:
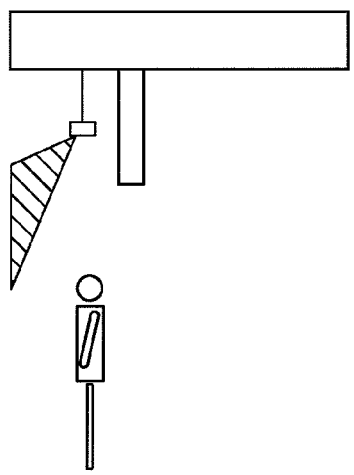
Figure 3A:
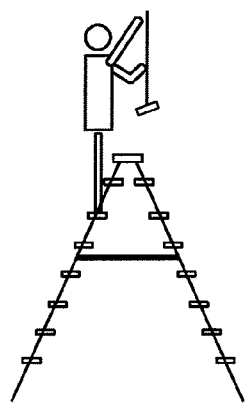
FIGS. 3A and 3B are third diagrams regarding an advantage of the super-wide angle liquid crystal projector device.
Figure 3B:
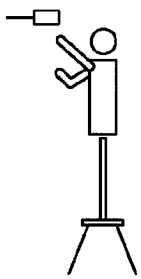

The advantages of the super-wide angle type are that:

(1) it is safe because light from the liquid crystal projector device does not directly enter the eyes of a person (see, for example, FIG. 1);

(2) it allows efficient presentation because a shadow does not appear on a screen (see, for example, FIG. 1);

(3) it can be set without bothering about obstacles on a ceiling because a setting space is narrow (see, for example, FIG. 2);

(4) it allows easy maintenance because it can be brought into contact with a wall and used for projection, and it allows easy routing of a cable because the distance between a personal computer (PC) and an image acoustic device (AV device) becomes small (see, for example, FIG. 3);

(5) it provides greater flexibility in providing meeting space or in performing setting operations in, for example, class rooms or conference rooms (see, for example, FIG. 4); and (6) it also allows projection on a table (see, for example, FIG. 5).

The wider use of interactive white boards is one factor increasing the demand for liquid crystal projector devices of a super-wide angle type. However, the use of such liquid crystal projector devices is not limited to, for example, schools and workplaces. They are also used in the field of digital sinage (electronic advertisements). The interactive white boards are manufactured in liquid crystal displays (LCDs) and plasma display panels (PDPs). Compared to these, the projector device is a system for performing extended projection on a liquid crystal panel measuring approximately one inch. Therefore, a large screen can be provided at a low cost.

Exemplary General Structure of Projection Image Display Device

Next, a general structure of the liquid crystal projector device of the super-wide angle type will be described.

Figure 6A:
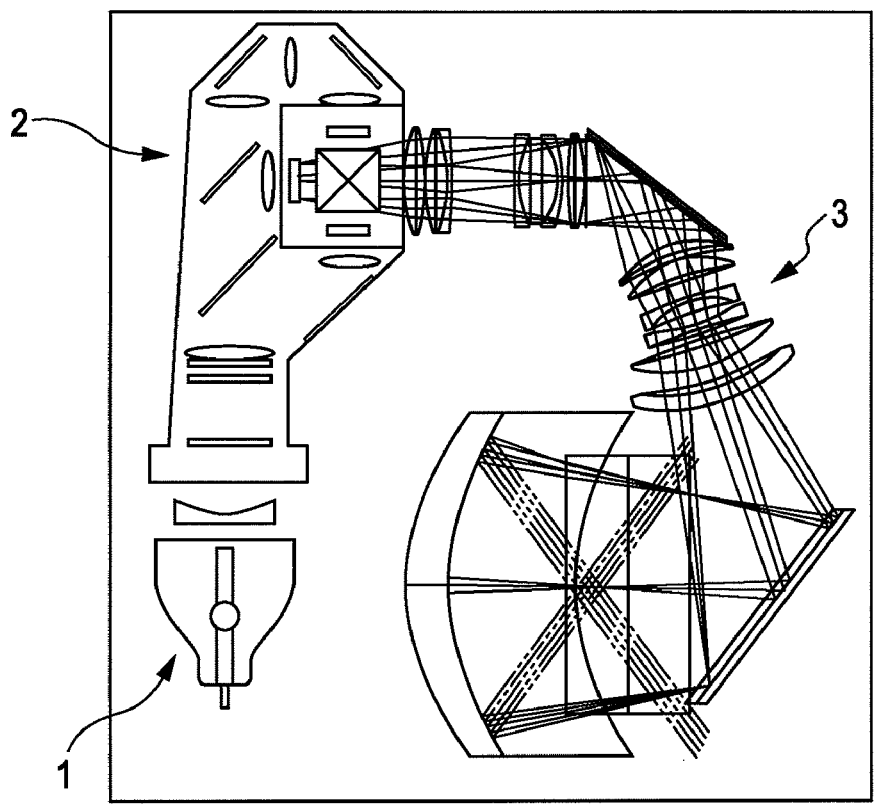
FIGS. 6A and 6B schematically illustrate an exemplary structure of the liquid crystal projector device.
Figure 6B:
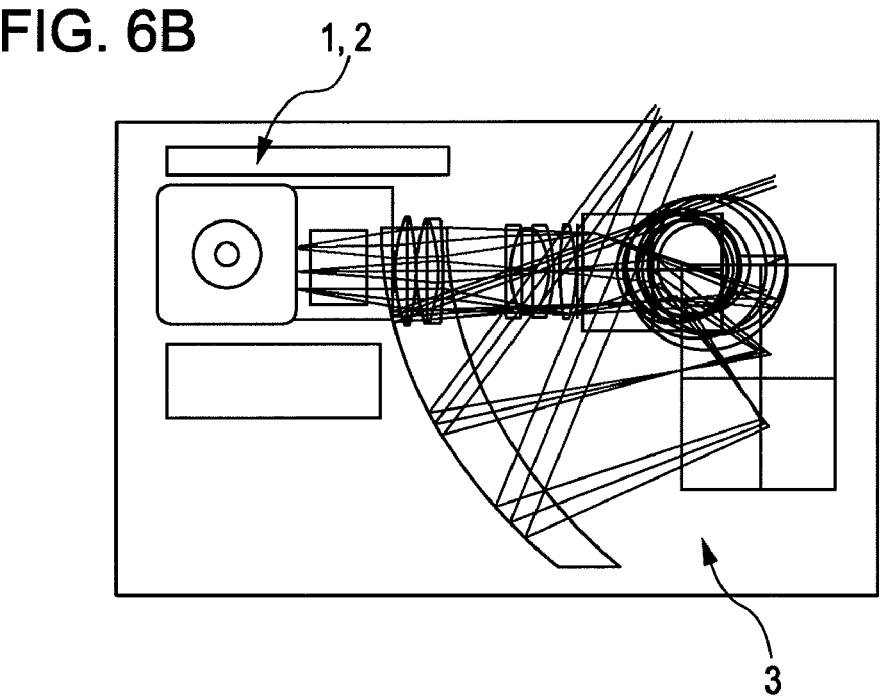

FIGS. 6A and 6B schematically illustrate an exemplary structure of the liquid crystal projector device.

As shown in FIGS. 6A and 6B, the liquid crystal projector device is formed so that a light source 1, an illumination optical system 2, and a projection optical system 3 are provided in a housing.

Figure 7:
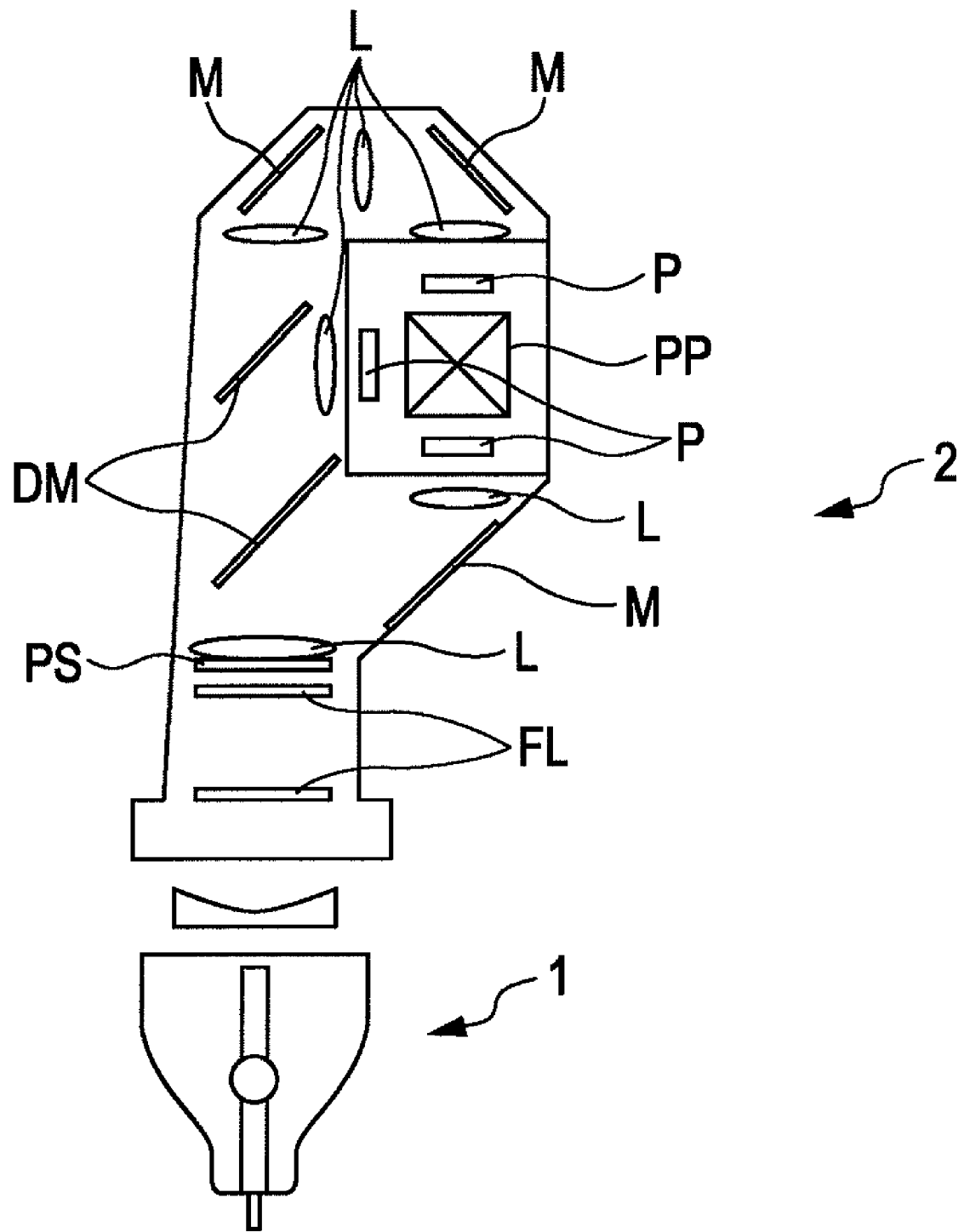
FIG. 7 schematically illustrates an exemplary structure of a light source and an illumination optical system in the liquid crystal projector device.

FIG. 7 schematically illustrates an exemplary structure of the light source 2 and the illumination optical system 2.

The light source 1 is, for example, a high-pressure mercury lamp, and emits a light beam with respect to the illumination optical system 2.

The illumination optical system 2 causes the light beam emitted from the light source 1 to uniformly illuminate a surface of an image modulating element (liquid crystal panel), which is a primary image surface. More specifically, in the illumination optical system 2, the light beam from the light source 1 passes through first and second fly eye lenses FL, a polarization conversion element PS, and a condensing lens L. Then, after passing through these, the light beam is divided into RGB color component light beams by a dichroic mirror DM that only reflects light of a particular wavelength band. The RGB color component light beams are incident upon liquid crystal panels P (provided in correspondence with the RGB colors) while making use of, for example, total internal reflection mirrors M and lenses L. Then, after light modulation corresponding to image signals are performed at the liquid crystal panels P, the color component light beams subjected to the light modulation are combined by a dichroic prism PP, so that the combined light beam exits towards the projection optical system 3.

Here, although the illumination optical system 2 is formed using transmissive liquid crystal panels, the illumination optical system 2 may also be formed using reflective liquid crystal panels. In addition, as the image modulating element, for example, a digital micromirror device (DMD) may also be used. Further, instead of the dichroic prism PP, for example, a polarization beam splitter (PBS), a color combining prism that combines image signals of the respective RBG colors, or a total internal reflection (TIR) prism may also be used.

The projection optical system 3 receives the light emitted from the illumination optical system 2 to perform with respect to a screen (which is a secondary image surface) extended projection on image information provided at a primary image surface and modulated by the liquid crystal panels P of the illumination optical system 2.

Exemplary Structure of Projection Optical System

The projection optical system 3 is characteristic of the liquid crystal projector device that is described here.

The structural features of the projection optical system 3 will hereunder be described in turn with reference to first to sixth embodiments.

First Embodiment

Figure 8:
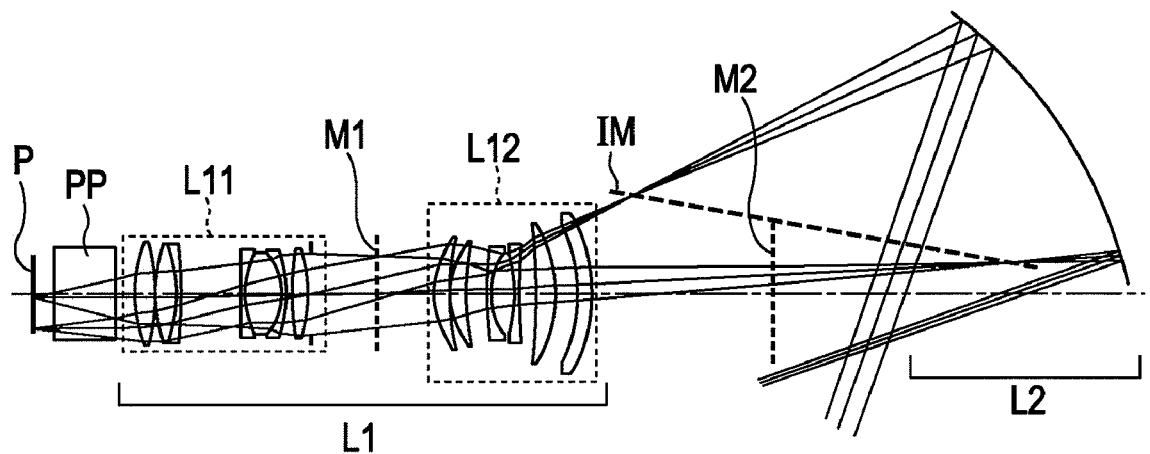
FIG. 8 is a ray diagram schematically showing an exemplary structure of a projection optical system according to a first embodiment.

FIG. 8 is a ray diagram schematically showing an exemplary structure of a projection optical system according to a first embodiment. FIG. 8 shows an optical path when a distance is a standard projection distance.

As shown in FIG. 8, the projection optical system 3 includes a first optical system L1 having a positive refractive power and a second optical system L2 having a concave reflecting surface.

The first optical system L1 has a common optical axis at which all optical components of the first optical system L1 have rotationally symmetric surfaces.

The second optical system L2 is formed by a rotationally symmetric aspherical surface, and has the optical axis in common with the first optical system L1.

By including the first optical system L1 and the second optical system L2, the projection optical system 3 is formed so as to perform extended projection from a tele-side primary image surface to a wide-side secondary image surface. That is, the image information provided at the primary image surface, modulated by the liquid crystal panels P of the illumination optical system 2, and combined by the dichroic prism PP is subjected to extension projection with respect to the screen (which is the secondary image surface).

In the projection optical system 3 having such a structure, the first optical system L1 includes, from the primary image surface side, an 11th optical system L11 having a positive refractive power and a 12th optical system L12 having a negative refractive power. After forming an intermediate image IM once between the first optical system L1 and the second optical system L2, a light beam emitted from the first optical system L1 is incident upon the second optical system L2.

Although, at M1 and M2 shown in FIG. 8, a first plane reflecting surface, a second plane reflecting surface, and a third plane reflecting surface are disposed, they are shown as dummy surfaces in FIG. 8 for convenience.

Figure 9:
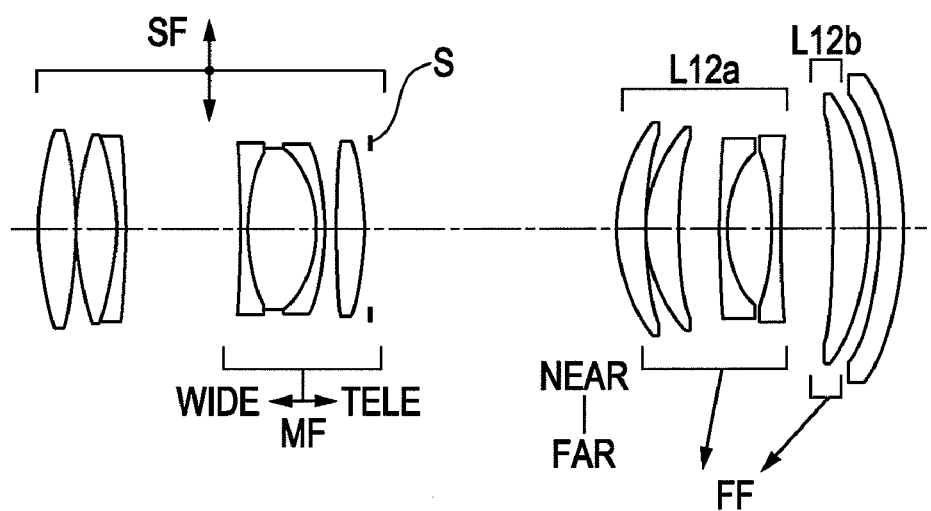
FIG. 9 illustrates an exemplary structure of the main portion of the projection optical system according to the first embodiment.

FIG. 9 illustrates an exemplary structure of the main portion of the projection optical system according to the first embodiment. FIG. 9 is a sectional view of the lenses of the first optical system L1 when short distance projection is performed.

In FIG. 9, the first optical system L1 has a screen shift function SF, a magnification changeover function MF, and a floating function FF. Reference character S shown in FIG. 9 represents a stop.

The screen shift function SF is used to move an image formation position on the screen (which is the secondary image surface). For realizing the screen shift function SF, the first optical system L1 is formed so that some optical components of the first optical system L1 move substantially perpendicularly to the optical axis of the first optical system L1. More specifically, the 11th optical system L11 corresponding to some optical components of the first optical system L1 moves substantially perpendicularly to the optical axis.

A mechanism for moving the 11th optical system L11 is not particularly limited. Any mechanism using a related technology may be used to move the 11th optical system L11.

Accordingly, by moving some optical components (that is, the 11th optical system L11) of the first optical system L1 substantially perpendicularly to the optical axis, it is possible to provide the first optical system L1 with the screen shift function SF for moving the image formation position at the secondary image surface.

In moving the 11th optical system L11 substantially perpendicularly, if the screen shift can be performed and the probability of the occurrence of decentration aberration is small, any optical component may be moved. That is, the 11th optical system L11 is not necessarily moved. The 12th optical system L12, the entire first optical system, or one optical component thereof may be moved. The appropriate group to be moved may be selected in terms of costs and the movement amount desired.

That is, the screen shift function SF is realized by moving a portion of the projection optical system excluding the second optical system that may be mechanically complicated, instead of the entire projection optical system including the second optical system. Therefore, compared to, for example, the case in which all of the optical components of the projection optical system are moved or the image modulation element P is moved, the number of components that are moved is small, the projection optical system is smaller, brightness is not reduced, etc. As a result, it is possible to realize the screen shift function SF with a simple structure while maintaining high image quality.

It is desirable that, regarding some optical components that are moved (more specifically, the 11th optical system L11) for realizing the screen shift function SF, a refractive power θs of the some of the optical components and a refractive power θ1 of the first optical system L1 during standard projection satisfy the following Conditional Expression (1):

$$0.2<|\phi s/\phi 1|<1.2 \quad (1)$$

The Conditional Expression (1) properly prescribes the refractive power of the group that is moved to realize the screen shift function SF. That is, if $|\phi s/\phi 1|$ is less than the lower limit of the Conditional Expression (1), the screen shift amount is reduced at the same time that the probability of the occurrence of decentration aberration is reduced. In contrast, if $|\phi s/\phi 1|$ exceeds the upper limit of the Conditional Expression (1), the probability of the occurrence of decentration aberration is increased by the movement of the optical parts, thereby causing deterioration of optical performance.

The magnification changeover function is used to change the magnification of an image on the screen (which is the secondary image surface). For realizing the magnification changeover function, in the first optical system L1, the 11th optical system L11 includes a plurality of lens groups, and at least one lens group having a positive refractive power moves along the optical axis of the first optical system L1. In FIG. 9, a side closest to a wide side is called "wide," and a side closest to a tele side is called "tele."

A mechanism for moving the at least one lens group having a positive refractive power is not particularly limited. Any mechanism using a related technology may be used to move the at least one lens group.

Accordingly, by moving at least one lens group having a positive refractive power among the plurality of lens groups in the 11th optical system L11 in the direction of the optical axis, it is possible to provide the first optical system L1 with the magnification changeover function MF for changing the magnification of an image at the secondary image surface.

It is desirable that, regarding the lens group that is moved for realizing the magnification changeover function MF, a refractive power φm of the lens group whose movement amount is largest and a refractive power φ1 of the first optical system L1 during standard projection satisfy the following Formula (2):

$$0.2<|\phi m/\phi 1|<0.9 \quad (2)$$

The Conditional Expression (2) properly prescribes the refractive power of the group that is moved to realize the magnification changeover function MF. That is, if $|\phi m/\phi 1|$ is less than the lower limit of the Conditional Expression (2), the movement amount is increased. In contrast, if $|\phi m/\phi 1|$ exceeds the upper limit of the Conditional Expression (2), the number of occurrences of aberrations, such as curvature of field, is increased, thereby causing deterioration of optical performance.

When the magnification changeover function MF is to provide a large magnification changeover ratio, the following may be performed. That is, the 11th optical system L11 includes four lens groups, that is, from the primary image surface side, an 11ath group having a positive refractive power, an 11bth group having a positive refractive power, an 11cth group having a negative refractive power, and an 11dth group having a positive refractive power. In addition, by moving at least two groups, that is, the 11bth group and the 11dth group, towards the primary image surface side, the magnifying ratio is increased; and by moving them towards an intermediate image side, the magnifying ratio is reduced. Here, it is effective to move the 11cth group in terms of increasing the magnification ratio. Here, the magnification ratio refers to a value obtain by dividing the focal length of the entire system that is closest to "tele" by the focal length of the entire system that is closest to "wide."

The floating function FF is used too correct optical performance regarding, for example, image-formation capability and image distortion, in performing focusing from when short distance projection is carried out to when long distance projection is carried out. To realize the floating function FF, the first optical system L1 includes a 12ath group L12a and a 12bth group L12b. In the 12ath group L12a, the surface that is closest to the primary image surface is formed as a convex surface. The entire 12ath group L12a has a negative refractive power. In contrast, the 12bth group L12b includes a positive meniscus lens having a convex surface at the intermediate image side. The 12th optical system L12 including the 12ath group L12a and the 12bth group L12b, is formed so that the 12bth group L12b is moved along the optical axis from the intermediate image side to the primary image surface side when performing focusing from when short distance projection is carried out to when long distance projection is carried out. In FIG. 9, "near" indicates the direction of movement in short distance projection, and "far" indicates the direction of movement during long distance projection.

A mechanism for moving the 12bth group L12b is not particularly limited. Any mechanism using a related technology may be used to move the 12bth group L12b.

A light beam passing through the 12th optical system L12 tends to be arbitrarily divided into light beams on the primary image surface unlike near the stop S. Therefore, by slightly changing the angle of the light beam when performing focusing from when short distance projection is carried out to when long distance projection is carried out, it is possible to realize the floating function FF that corrects optical performance related to curvature of field and distortion.

More specifically, as mentioned above, the 12ath group L12a and the 12bth group L12b are included in the 12th optical system L12 having an overall negative refractive power. When performing focusing from when short distance projection is carried out to when long distance projection is carried out, the 12bth group L12b including the positive meniscus lens is moved closer to the 12ath group L12a disposed at the primary image surface side. By this, a principal point position at the intermediate image side of the 12th optical system L12 can be moved closer to the second optical system L2. Therefore, focusing for long distance projection can be performed.

It is desirable that, regarding the 12ath group L12a and the 12bth group L12b for realizing the floating function FF, the following Conditional Expressions (3) and (4) be satisfied. That is, a refractive power ϕ12a of the 12ath group L12a, a refractive power ϕ12b of the 12bth group L12b, and a refractive power ϕ12 of the 12th optical system L12 during standard projection satisfy the following Conditional Expressions (3) and (4):

$$0.2 < |\phi 12b/\phi 12| < 3.0 \quad (3)$$

$$0.2 < |\phi 12b/\phi 12a| < 1.0 \quad (4)$$

The Conditional Expressions (3) and (4) properly prescribes the refractive powers of the 12ath group L12a and the 12bth group L12b to realize the floating function FF.

That is, if $|\phi 12b/\phi 12|$ is less than the lower limit of the Conditional Expression (3), the amount of movement during floating is increased, thereby increasing the size of the 12th optical system L12. In contrast, if $|\phi 12b/\phi 12|$ exceeds the upper limit of the Conditional Expression (3), the amount of movement is reduced, whereas the refractive power of the positive meniscus lens is increased. Therefore, the light beam angle changes considerably, thereby rapidly deteriorating the optical performance.

If $|\phi 12b/\phi 12a|$ is less than the lower limit of the Conditional Expression (4), floating is not performed in a long projection distance range. In contrast, if $|\phi 12b/\phi 12|$ exceeds the upper limit of the Conditional Expression (4), a change in the light beam angle caused by the 12ath group L12a is increased, thereby rapidly deteriorating the optical performance. Therefore, the 12th optical system L12 is not capable of handling long distance variations.

It is desirable that, regarding the 12ath group L12a and the 12bth group L12b for realizing the floating function FF, the following Conditional Expression (5) be satisfied. That is, it is desirable that a movement amount M12a during floating of the 12ath group L12a and a movement amount M12b during floating of the 12bth group L12b satisfy the following Conditional Expression (5):

$$1.5 < M12b/M12a < 7.0 \quad (5)$$

The Conditional Expression (5) properly prescribes the ratio between the movement amount of the 12ath group L12a and the movement amount of the 12bth group L12b to realize the floating function FF. That is, if M12b/M12a is less than the lower limit of the Conditional Expression (5), floating is not performed in a long projection distance range. In contrast, if M12b/M12a exceeds the upper limit of the Conditional Expression (5), a change in the light beam angle caused by the 12ath group L12a is increased, thereby rapidly deteriorating the optical performance. Therefore, if the Conditional Expression (5) is satisfied, the optical performance can be corrected in the long projection distance range.

As already described, with respect to the first optical system L1 having the above-described structure, the second optical system L2 disposed closer to the secondary image surface side than the first optical system 11 includes a rotationally symmetric aspherical surface and is provided with the optical axis in common with the first optical system L1. In other words, the concave reflecting surface of the second optical system L2 has the shape of the rotationally symmetric aspherical surface provided with the optical axis in common with the first optical system L1. Therefore, by disposing the second optical system L2, it is possible to properly correct curvature of field and distortion.

Regarding the projection optical system 3 having the above-described structure, a maximum effective diameter DM of the largest curved reflecting surface of the projection optical system 3 and a maximum height Dy of the primary image surface satisfy the following Conditional Expression (6):

$$3 < DM/Dy < 30 \quad (6)$$

The Conditional Expression (6) properly prescribes the ratio between the heightwise size of the largest curved reflecting surface of the projection optical system 3 and the heightwise size of the primary image surface. That is, if DM/Dy is less than the lower limit of the Conditional Expression (6), a screen shift function (refer to, for example, FIG. 9) that shifts the entire optical system including the mechanisms is sufficient. Therefore, the necessity of the screen shift function SF of the above-described structure is low. If DM/Dy exceeds the upper limit of the Conditional Expression (6), the entire projection optical system may become larger. Therefore, costs may be increased.

Here, the example in which each optical system of the projection optical system 3 has a concave reflecting surface and a common optical axis is given. However, if the optical system satisfies the Conditional Expression (6), the present invention is applicable to any optical system. That is, if it is a projection optical system that performs extended projection from the tele-side primary image surface to the wide-side secondary image surface, the present invention may be applied to the following optical systems. More specifically, an optical system, in which an optical component disposed closest to the secondary image surface and having a curved surface is formed by a reflecting surface, is provided with a function of screen-shifting the secondary image surface by decentering some optical components of the projection optical system substantially parallel to the primary image surface. Further, the optical system may be provided with a magnification changeover function of changing the magnification of an image at the secondary image surface by moving some optical components of the projection optical system substantially perpendicularly to the primary image surface. As long as the projection optical system having such a structure satisfies the Conditional Expression (6), it realizes the screen shift function and the magnification changeover function with a small and inexpensive structure by moving only some optical components.

Here, the projection optical system 3 having the above-described structure will hereunder be simply described with reference to specific exemplary numerical values.

Figure 10:
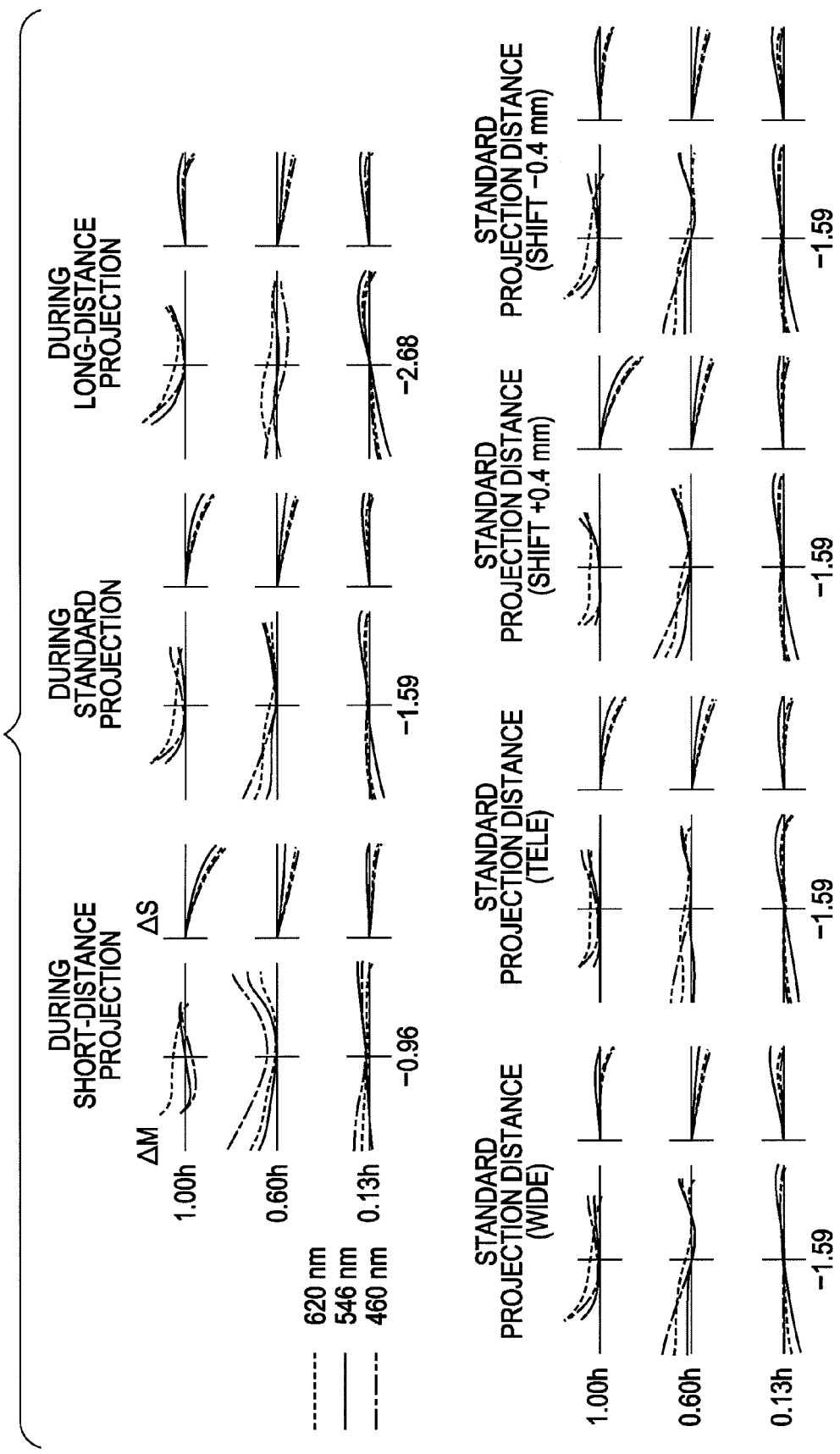
FIG. 10 shows lateral aberrations caused by the projection optical system according to the first embodiment.

FIG. 10 shows lateral aberrations caused by the projection optical system according to the first embodiment. In FIG. 10, one division mark corresponds to one dot size when extended projection for one dot size is performed with respect to a screen. A solid line indicates 546.1 nm, a dotted line indicates 620 nm, and an alternate long and short dash line indicates 460 nm. Here, although the lateral aberration graphs are those when the projection optical system is moved in a direction y, the direction of movement is obviously not limited to the direction y. As long as the direction is perpendicular to the optical axis, the direction of movement may be any direction.

FIG. 11 shows a specific example of lens data of the projection optical system according to the first embodiment.

In FIG. 11, * represents a surface having an aspherical surface, and the aspherical surface is in accordance with the following Conditional Expression (7). ○ refers to a dummy surface. A first plane reflecting surface and a second plane reflecting surface are disposed for dummy surfaces. r represents a curvature radius. d represents an interval and a lens core thickness. nd represents a refractive index at the d line (587.56 nm). vd represents an Abbe number at the same d line. The lens groups within "{" are lens groups related to the floating function FF, the magnification changeover function MF, and the screen shift function SF. di represents a lens interval that varies when the floating function FF and the magnification changeover function MF are realized.

$$Z = \frac{ch^2}{1 + \{1 - (1+K)c^2h^2\}1/2} + \sum_{i=1} A_i h^i \qquad (7)$$

FIG. 12 shows specific examples of a primary image surface side numerical aperture NA, a maximum half angle of view ω when a distance is a standard projection distance, and a maximum primary image surface height y in the projection optical system according to the first embodiment.

FIG. 13A shows specific examples of a movement amount and a lens group having the screen shift function SF in the projection optical system according to the first embodiment.

FIGS. 13B and 13C show specific examples of lens intervals regarding the floating function FF and the magnification changeover function MF, in the projection optical system according to the first embodiment. The numerical values in FIGS. 13B and 13C correspond to di in FIG. 11. Here, fl represents a focal length thereof, and β represents a magnifying ratio.

FIG. 14 shows specific examples of aspherical coefficients corresponding to the projection optical system according to the first embodiment.

FIG. 15 shows a specific example of the image modulating element according to the first embodiment. The one dot size in the lateral aberrations shown in FIG. 10 corresponds to the size indicated here.

FIG. 16 shows a TV distortion state when the image modulating element described with reference to FIG. 15 is subjected to extended projection at the secondary image surface using the projection optical system according to the first embodiment.

FIGS. 17A and 17B show specific examples of amounts of changes in, for example, a diagonal size and image distortion, when the image modulating element described with reference to FIG. 15 is subjected to extended projection at the secondary image surface using the projection optical system according to the first embodiment.

FIG. 18 shows specific examples of formulas on which calculations of, for example, the amounts of changes shown in FIG. 17 are based.

FIG. 19 shows an example of a specific numerical value for each of Conditional Expressions (1) to (6) in the projection optical system according to the first embodiment.

According to the projection optical system 3 identified by the aforementioned specific exemplary numerical values, with regard to the screen shift function SF, a screen shift of approximately ±5% is possible by moving the entire 11th optical system L11 (which is part of the first optical system L1) perpendicularly by ±0.4 mm with respect to the optical axis. With regard to the magnification changeover function MF, a magnifying ratio of approximately ±0.35% is changed by moving one group of the 11th optical system L11 along the optical axis. The projection optical system 3 has the floating function FF of moving the 12ath group L12a and the 12bth group L12b of the 12th optical system L12 from the intermediate image side towards the primary image surface side when performing focusing from 48.5" in short distance projection to 135" in long distance projection.

Second Embodiment

Figure 20:
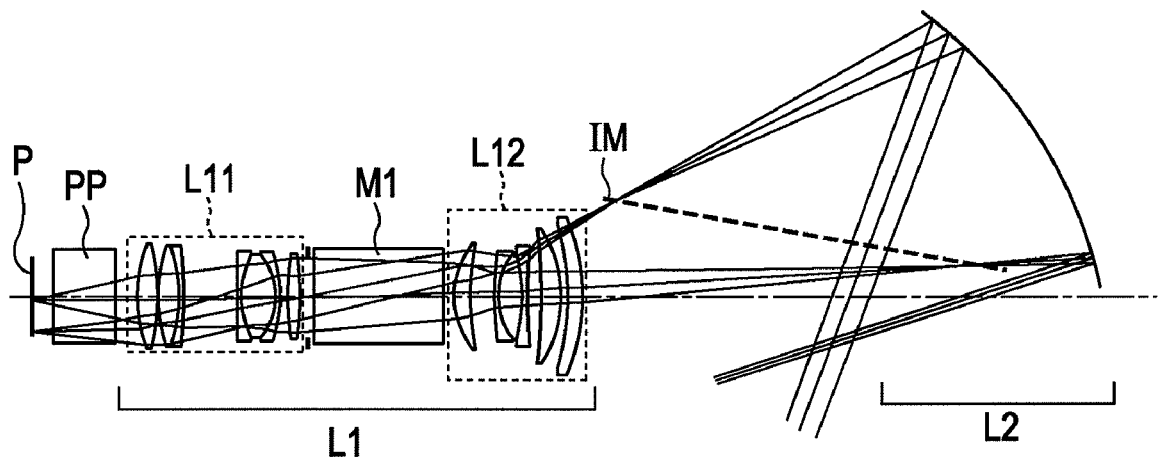
FIG. 20 schematically illustrates an exemplary structure of a projection optical system according to a second embodiment.

FIG. 20 schematically illustrates an exemplary structure of a projection optical system according to a second embodiment. In the illustration, an optical path when the distance is a standard projection distance is shown.

Figure 21:
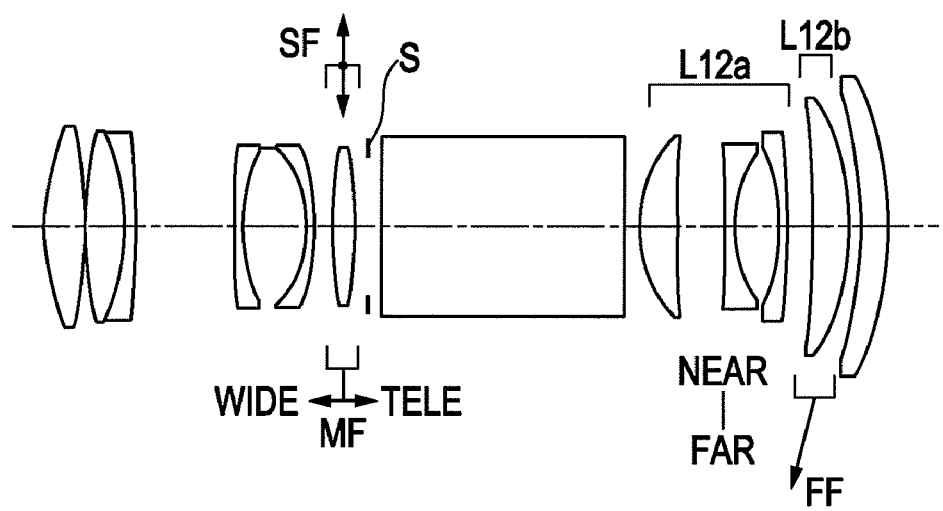
FIG. 21 illustrates an exemplary structure of the main portion of the projection optical system according to the second embodiment.

FIG. 21 illustrates an exemplary structure of the main portion of the projection optical system according to the second embodiment. In the illustration, lenses of a first optical system L1 when short distance projection is performed are shown in cross section.

As in the illustration, in a projection optical system 3 according to the second embodiment, an optical component that is moved for realizing the screen shift function SF is different from those in the first embodiment. That is, the screen shift function SF is realized by moving an optical component of an 11th optical system L11 instead of the entire 11th optical system L11.

In addition, in the projection optical system 3 according to the second embodiment, an optical component that is moved for realizing the magnification changeover function MF is different from those in the first embodiment.

The other structural features are the same as those of the first embodiment. Accordingly, they will not be described here.

Here, the projection optical system 3 according to the second embodiment will hereunder be simply described with reference to specific exemplary numerical values.

Figure 22:
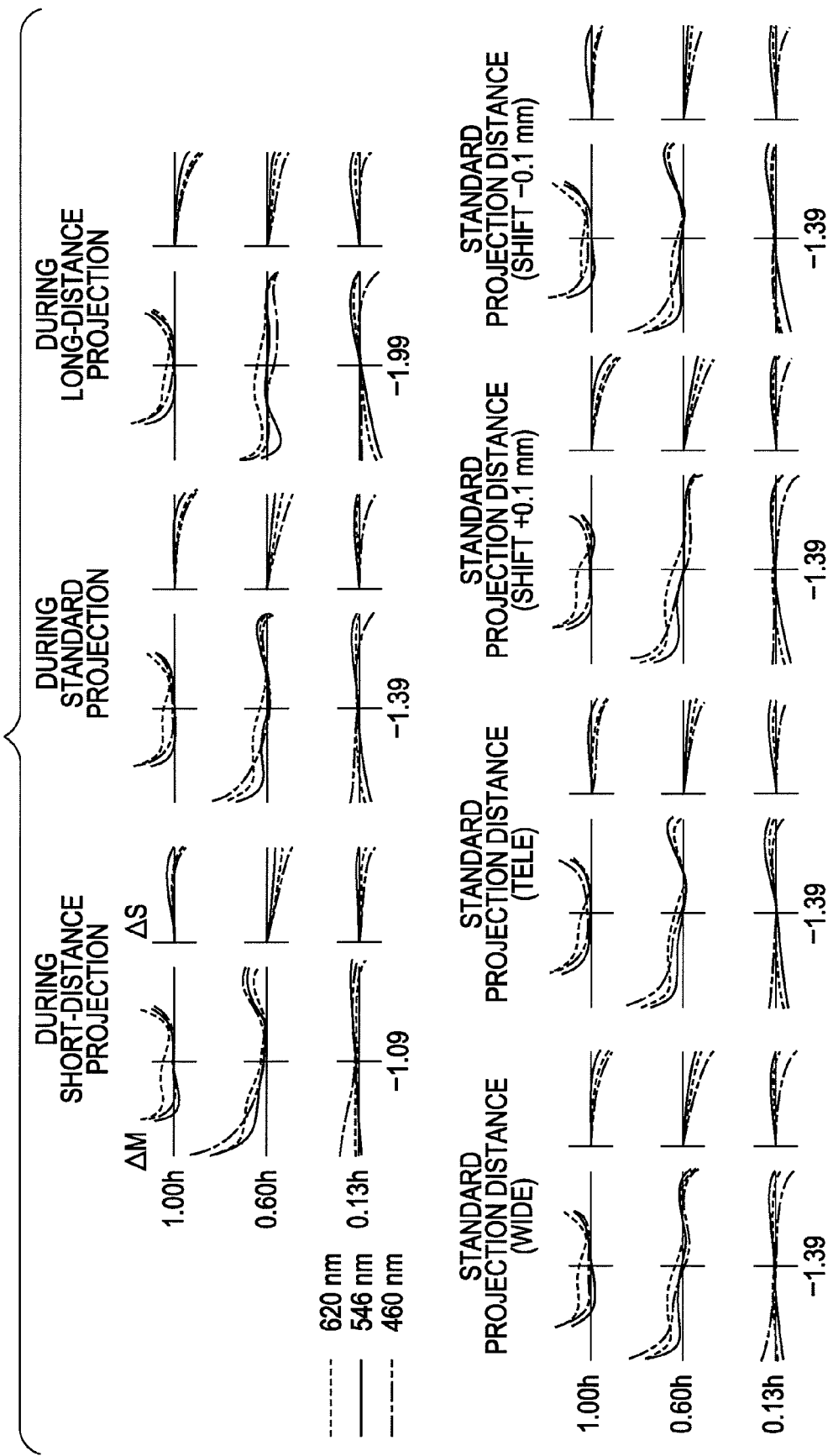
FIG. 22 shows lateral aberrations caused by the projection optical system according to the second embodiment.

FIG. 22 shows lateral aberrations caused by the projection optical system according to the second embodiment. In FIG. 22, one division mark corresponds to one dot size when extended projection for one dot size is performed with respect to a screen. A solid line indicates 546.1 nm, a dotted line indicates 620 nm, and an alternate long and short dash line indicates 460 nm. Here, although the lateral aberration graphs are those when the projection optical system is moved in the direction y, the direction of movement is obviously not limited to the direction y. As long as the direction is perpendicular to the optical axis, the direction of movement may be any direction.

FIG. 23 shows a specific example of lens data of the projection optical system according to the second embodiment. In FIG. 11, * represents a surface having an aspherical surface, and the aspherical surface is in accordance with the Conditional Expression (7). ○ refers to a dummy surface. A first plane reflecting surface and a second plane reflecting surface are disposed for dummy surfaces. represents a curvature radius. d represents an interval and a lens core thickness. nd represents a refractive index at the d line (587.56 nm). vd represents an Abbe number at the same d line. The lens groups within "{" are lens groups related to the floating function FF, the magnification changeover function MF, and the screen shift function SF. di represents a lens interval that varies when the floating function FF and the magnification changeover function MF are realized.

FIG. 24 shows specific examples of a primary image surface side numerical aperture NA, a maximum half angle of view c when a distance is a standard projection distance, and a maximum primary image surface height y in the projection optical system according to the second embodiment.

FIG. 25A shows specific examples of a movement amount and a lens group having the screen shift function SF in the projection optical system according to the second embodiment.

FIGS. 25B and 25C show specific examples of lens intervals regarding the floating function FF and the magnification changeover function MF, in the projection optical system according to the second embodiment. The numerical values in FIGS. 25B and 25C correspond to di in FIG. 23. Here, f1 represents a focal length thereof, and β represents a magnifying ratio.

FIG. 26 shows specific examples of aspherical coefficients corresponding to the projection optical system according to the second embodiment.

FIG. 27 shows values of a specific example of an image modulating element according to the second embodiment. The one dot size in the lateral aberrations shown in FIG. 22 corresponds to the size indicated here.

FIG. 28 shows a TV distortion state when the image modulating element described with reference to FIG. 27 is subjected to extended projection at the secondary image surface using the projection optical system according to the second embodiment.

FIGS. 29A and 29B show specific examples of amounts of changes in, for example, a diagonal size and image distortion, when the image modulating element described with reference to FIG. 27 is subjected to extended projection at the secondary image surface using the projection optical system according to the second embodiment. For example, the amounts of changes in the illustration are calculated on the basis of the formulas shown in FIG. 18.

FIG. 30 shows an example of a specific numerical value for each of the Conditional Expressions (1) to (6) in the projection optical system according to the second embodiment.

According to the projection optical system 3 identified by the aforementioned specific exemplary numerical values, with regard to the screen shift function SF, a screen shift of approximately ±0.7% is possible by moving one lens of the 11th optical system L11 (which is part of the first optical system L1) perpendicularly by ±0.1 mm with respect to the optical axis. With regard to the magnification changeover function MF, a magnifying ratio of approximately ±0.4% is changed by moving the lens which is the same as that moved for realizing the screen shift function SF along the optical axis. The projection optical system 3 has the floating function FF of moving a 12bth group L12b of a 12th optical system L12 from the intermediate image side towards the primary image surface side when performing focusing from 55" in short distance projection to 100" in long distance projection.

Third Embodiment

Figure 31:
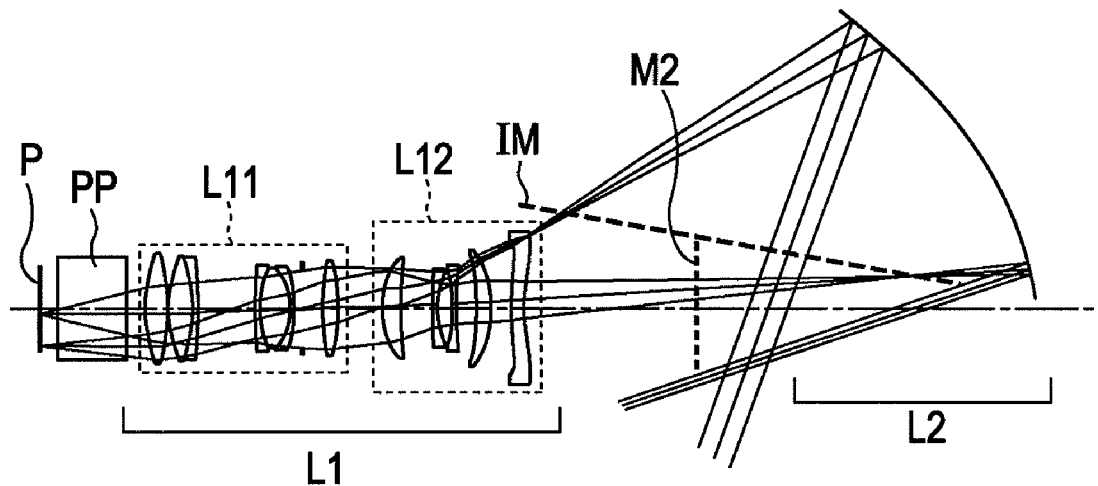
FIG. 31 schematically illustrates an exemplary structure of a projection optical system according to a third embodiment.

FIG. 31 schematically illustrates an exemplary structure of a projection optical system according to a third embodiment. In the illustration, an optical path when the distance is a standard projection distance is shown.

Figure 32:
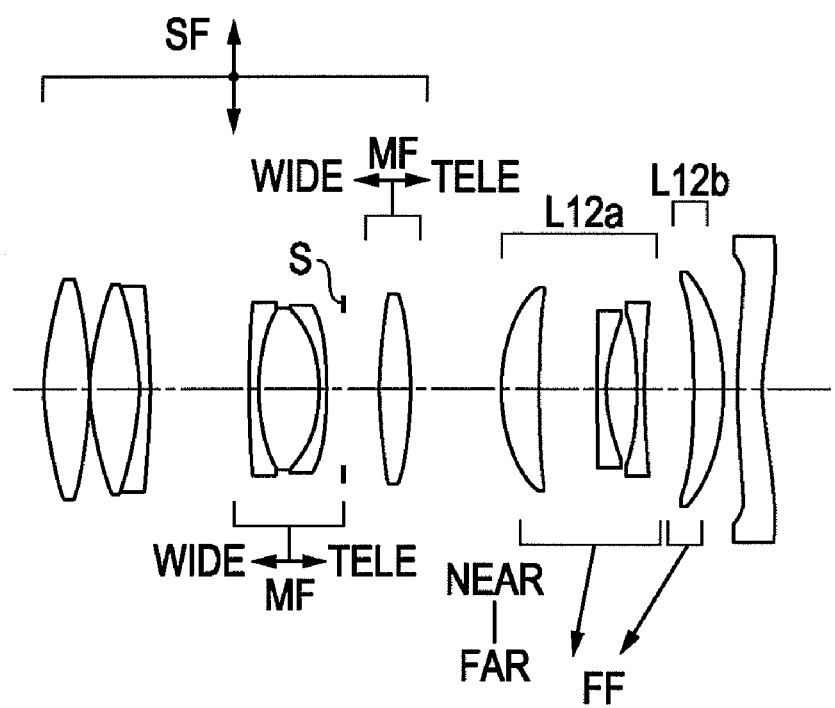
FIG. 32 illustrates an exemplary structure of the main portion of the projection optical system according to the third embodiment.

FIG. 32 illustrates an exemplary structure of the main portion of the projection optical system according to the third embodiment. In the illustration, lenses of a first optical system L1 when short distance projection is performed are shown in cross section.

As in the illustration, in a projection optical system 3 according to the third embodiment, as in the above-described first embodiment, the screen shift function SF is realized by moving the entire 11th optical system L11.

However, unlike the above-described first embodiment, the magnification changeover function MF is realized by moving two groups of the 11th optical system L11 along the optical axis.

The other structural features are the same as those of the first embodiment. Accordingly, they will not be described here.

Here, the projection optical system 3 according to the third embodiment will hereunder be simply described with reference to specific exemplary numerical values.

Figure 33:
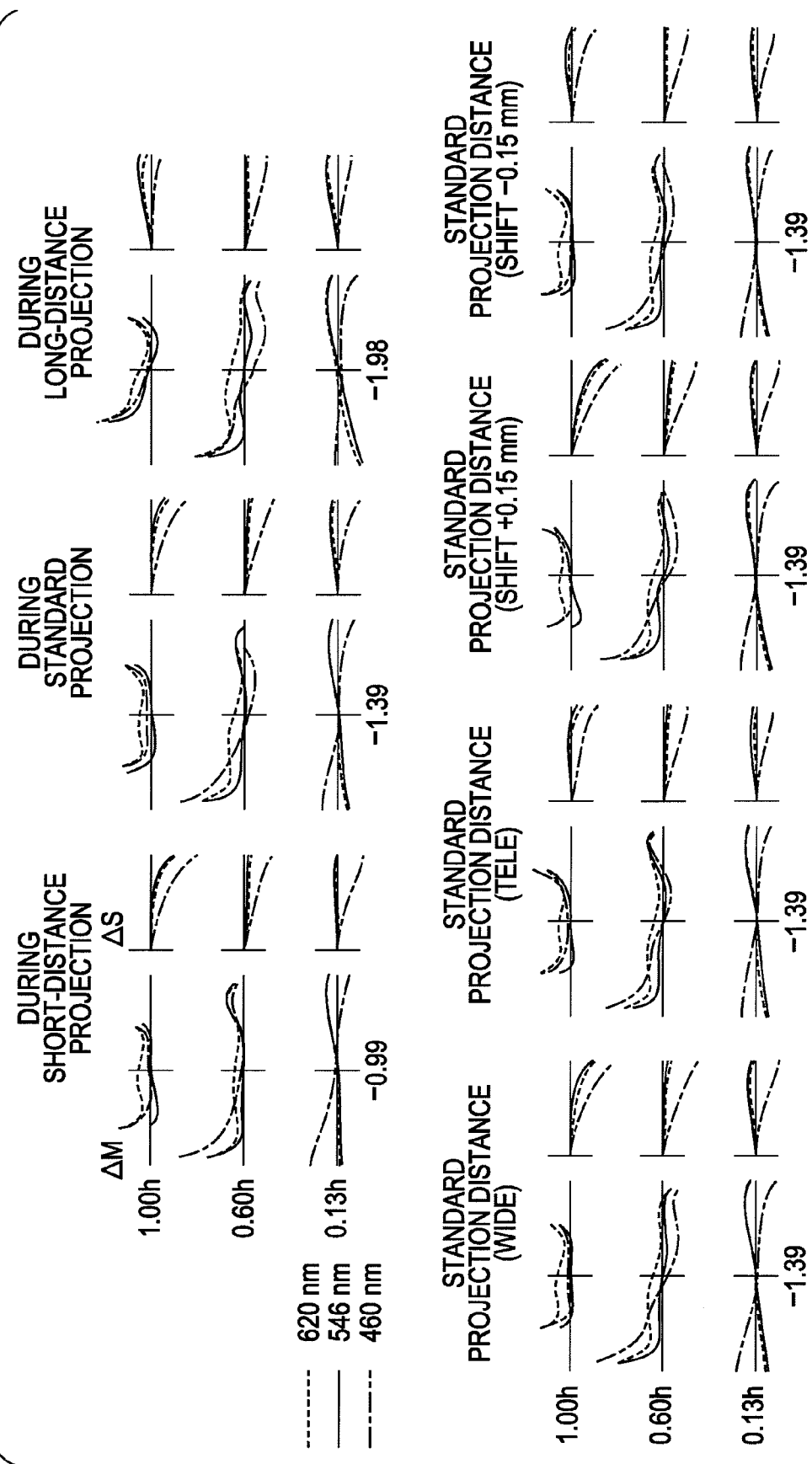
FIG. 33 shows lateral aberrations caused by the projection optical system according to the third embodiment.

FIG. 33 shows lateral aberrations caused by the projection optical system according to the third embodiment. In FIG. 33, one division mark corresponds to one dot size when extended projection for one dot size is performed with respect to a screen. A solid line indicates 546.1 nm, a dotted line indicates 620 nm, and an alternate long and short dash line indicates 460 nm. Here, although the lateral aberration graphs are those when the projection optical system is moved in the direction y, the direction of movement is obviously not limited to the direction y. As long as the direction is perpendicular to the optical axis, the direction of movement may be any direction.

FIG. 34 shows a specific example of lens data of the projection optical system according to the third embodiment. In FIG. 34, * represents a surface having an aspherical surface, and the aspherical surface is in accordance with the Conditional Expression (7). r represents a curvature radius. d represents an interval and a lens core thickness. nd represents a refractive index at the d line (587.56 nm). νd represents an Abbe number at the same d line. The lens groups within "{" are lens groups related to the floating function FF, the magnification changeover function MF, and the screen shift function SF. di represents a lens interval that varies when the floating function FF and the magnification changeover function MF are realized.

FIG. 35 shows specific examples of a primary image surface side numerical aperture NA, a maximum half angle of view ω when a distance is a standard projection distance, and a maximum primary image surface height y in the projection optical system according to the third embodiment.

FIG. 36A shows specific examples of a movement amount and a lens group having the screen shift function SF in the projection optical system according to the third embodiment.

FIGS. 36B and 36C show specific examples of lens intervals regarding the floating function FF and the magnification changeover function MF, in the projection optical system according to the third embodiment. The numerical values in FIGS. 35B and 35C correspond to di in FIG. 34. Here, f1 represents a focal length thereof, and β represents a magnifying ratio.

FIG. 37 shows specific examples of aspherical coefficients corresponding to the projection optical system according to the third embodiment.

FIG. 38 shows values of a specific example of an image modulating element according to the third embodiment. The one dot size in the lateral aberrations shown in FIG. 33 corresponds to the size indicated here.

FIG. 39 shows a TV distortion state when the image modulating element described with reference to FIG. 38 is subjected to extended projection at the secondary image surface using the projection optical system according to the third embodiment.

FIGS. 40A and 40B show specific examples of amounts of changes in, for example, a diagonal size and image distortion, when the image modulating element described with reference to FIG. 38 is subjected to extended projection at the secondary image surface using the projection optical system according to the third embodiment. For example, the amounts of changes in the illustration are calculated on the basis of the formulas shown in FIG. 18.

FIG. 41 shows an example of a specific numerical value for each of the Conditional Expressions (1) to (6) in the projection optical system according to the third embodiment.

According to the projection optical system 3 identified by the aforementioned specific exemplary numerical values, with regard to the screen shift function SF, a screen shift of approximately ±0.2% is possible by moving the entire 11th optical system L11 (which is part of the first optical system L1) perpendicularly by ±0.15 mm with respect to the optical axis. With regard to the magnification changeover function MF, a magnifying ratio of approximately ±0.7% is changed by moving two groups of the 11th optical system L11 along the optical axis. The projection optical system 3 has the floating function FF of moving a 12ath group L12a and a 12bth group L12b of a 12th optical system L12 from the intermediate image side towards the primary image surface side when performing focusing from 50" in short distance projection to 100" in long distance projection.

Fourth Embodiment

Figure 42:
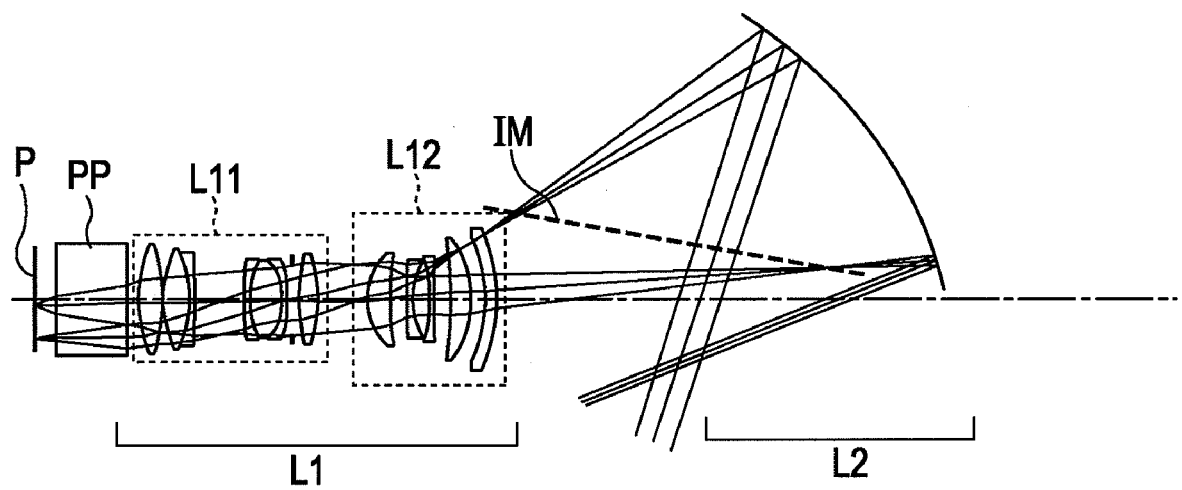
FIG. 42 schematically illustrates an exemplary structure of a projection optical system according to a fourth embodiment.

FIG. 42 schematically illustrates an exemplary structure of a projection optical system according to a fourth embodiment. In the illustration, an optical path when the distance is a standard projection distance is shown.

Figure 43:
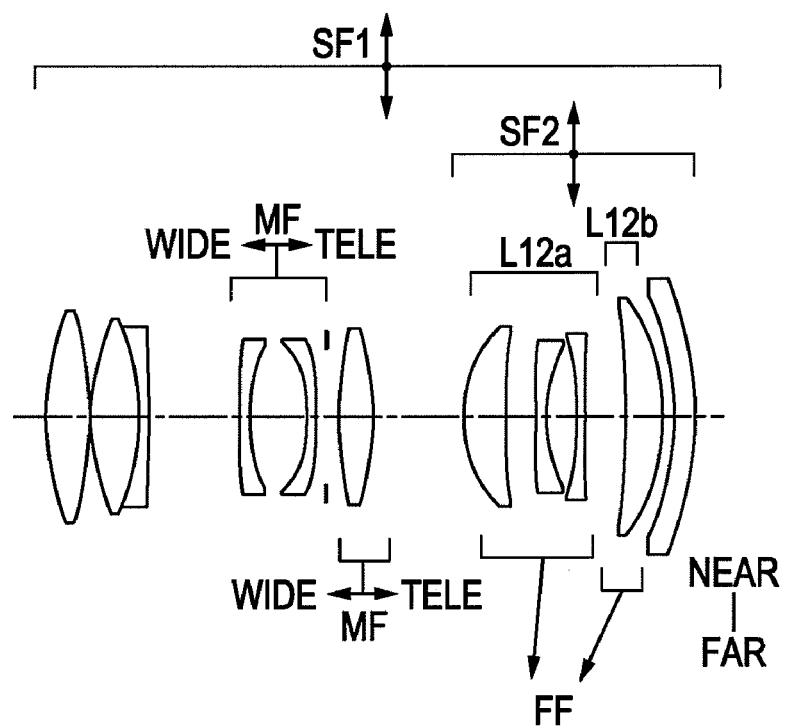
FIG. 43 illustrates an exemplary structure of the main portion of the projection optical system according to the fourth embodiment.

FIG. 43 illustrates an exemplary structure of the main portion of the projection optical system according to the fourth embodiment. In the illustration, lenses of a first optical system L1 when short distance projection is performed are shown in cross section.

As in the illustration, a projection optical system 3 according to the fourth embodiment has a screen shift function SF1 and a screen shift function SF2. The screen shift function SF1 is realized by moving the entire first optical system L1. In contrast, the screen shift function SF2 is realized by moving the entire 12th optical system L12 (which is part of the first optical system L1).

As in the above-described third embodiment, the magnification changeover function MF is realized by moving two groups of an 11th optical system L11 along the optical axis.

The other structural features are the same as those of the first embodiment. Accordingly, they will not be described here.

Here, the projection optical system 3 according to the fourth embodiment will hereunder be simply described with reference to specific exemplary numerical values.

Figure 44:
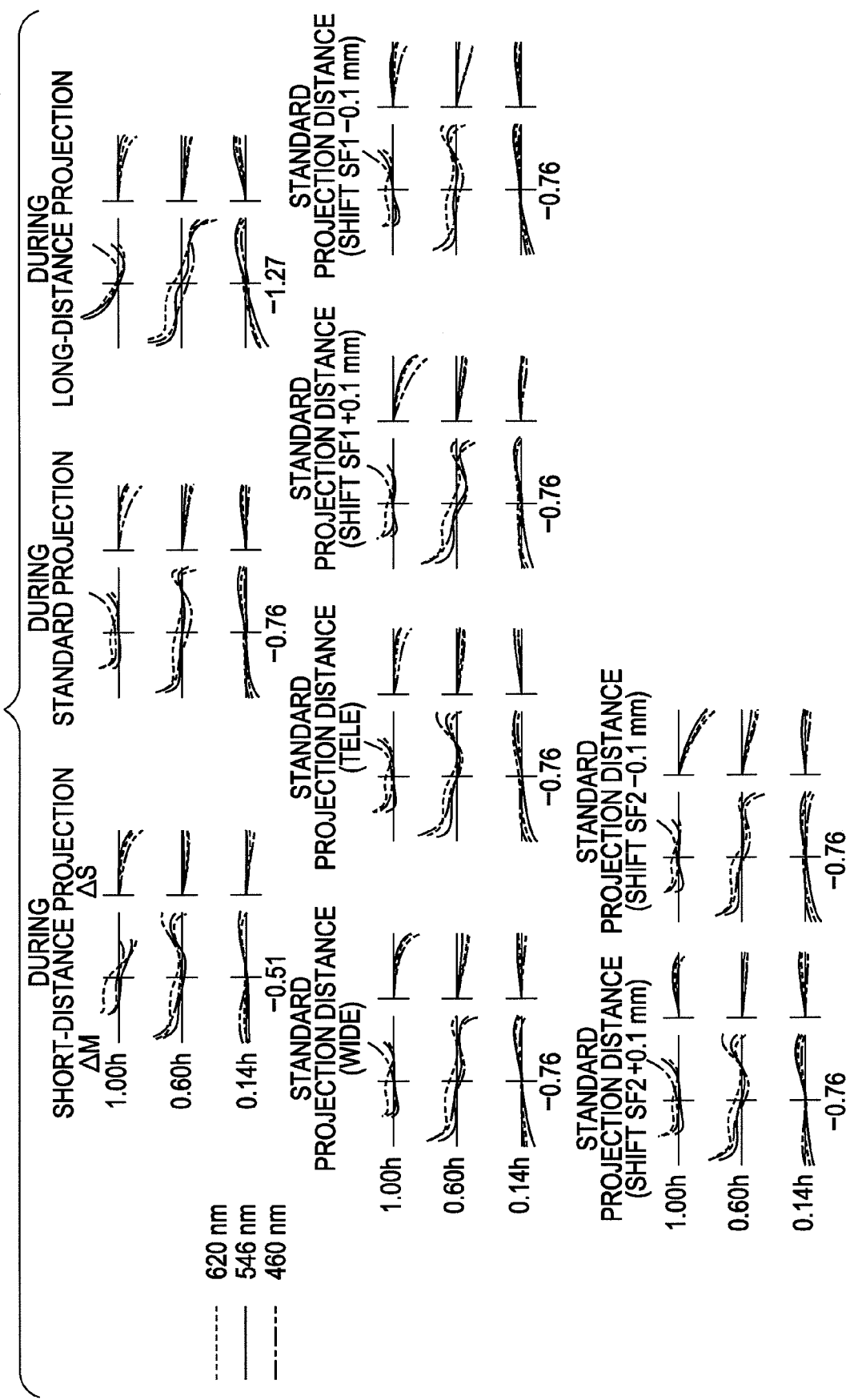
FIG. 44 shows lateral aberrations caused by the projection optical system according to the fourth embodiment.

FIG. 44 shows lateral aberrations caused by the projection optical system according to the fourth embodiment. In FIG. 44, one division mark corresponds to one dot size when extended projection for one dot size is performed with respect to a screen. A solid line indicates 546.1 nm, a dotted line indicates 620 nm, and an alternate long and short dash line indicates 460 nm. Here, although the lateral aberration graphs are those when the projection optical system is moved in the direction y, the direction of movement is obviously not limited to the direction y. As long as the direction is perpendicular to the optical axis, the direction of movement may be any direction.

FIG. 45 shows a specific example of lens data of the projection optical system according to the fourth embodiment. In FIG. 34, * represents a surface having an aspherical surface, and the aspherical surface is in accordance with the Conditional Expression (7). r represents a curvature radius. d represents an interval and a lens core thickness. nd represents a refractive index at the d line (587.56 nm). vd represents an Abbe number at the same d line. The lens groups within "{" are lens groups related to the floating function FF, the magnification changeover function MF, and the screen shift function SF. di represents a lens interval that varies when the floating function FF and the magnification changeover function MF are realized.

FIG. 46 shows specific examples of a primary image surface side numerical aperture NA, a maximum half angle of view ω when a distance is a standard projection distance, and a maximum primary image surface height y in the projection optical system according to the fourth embodiment.

FIG. 47A shows specific examples of movement amounts, a lens group having the screen shift function SF1, and a lens group having the screen shift function SF2 in the projection optical system according to the fourth embodiment.

FIGS. 47B and 47C show specific examples of lens intervals regarding the floating function FF and the magnification changeover function MF, in the projection optical system according to the fourth embodiment. The numerical values in FIGS. 47B and 47C correspond to di in FIG. 45. Here, f1 represents a focal length thereof, and β represents a magnifying ratio.

FIG. 48 shows specific examples of aspherical coefficients corresponding to the projection optical system according to the fourth embodiment. The aspherical coefficients in the illustration correspond to those obtained by the aforementioned Conditional Expression (7).

FIG. 49 shows values of a specific example of an image modulating element according to the fourth embodiment. The one dot size in the lateral aberrations shown in FIG. 44 corresponds to the size indicated here.

FIG. 50 shows a TV distortion state when the image modulating element described with reference to FIG. 49 is subjected to extended projection at the secondary image surface using the projection optical system according to the fourth embodiment.

FIGS. 51A and 51B show specific examples of amounts of changes in, for example, a diagonal size and image distortion, when the image modulating element described with reference to FIG. 49 is subjected to extended projection at the secondary image surface using the projection optical system according to the fourth embodiment. For example, the amounts of changes in the illustration are calculated on the basis of the formulas shown in FIG. 18.

FIG. 52 shows an example of a specific numerical value for each of the Conditional Expressions (1) to (6) in the projection optical system according to the fourth embodiment.

According to the projection optical system 3 identified by the aforementioned specific exemplary numerical values, with regard to the screen shift function SF1, a screen shift of approximately ±3% is possible by moving the entire first optical system L1 perpendicularly by ±0.1 mm with respect to the optical axis. With regard to the screen shift function SF2, a screen shift of approximately ±0.6% is possible by moving the entire 12th optical system L12 (which is part of the first optical system L1) perpendicularly by ±0.6 mm with respect to the optical axis. With regard to the magnification changeover function MF, a magnifying ratio of approximately ±0.3% is changed by moving two groups of the 11th optical system L11 along the optical axis. The projection optical system 3 has the floating function FF of moving the 12ath group L12a and the 12bth group L12b of the 12th optical system L12 from the intermediate image side towards the primary image surface side when performing focusing from 20" in short distance projection to 100" in long distance projection.

In the structure according to the fourth embodiment, the image modulating element is square-shaped and measures 5.6 mm×5.6 mm. Depending upon use, projection at a vertically long screen or projection at a horizontally screen can be performed. Therefore, the image modulating element is an optimal element for use in, for example, performing projection on a table as shown in FIG. 5.

Fifth Embodiment

Figure 53:
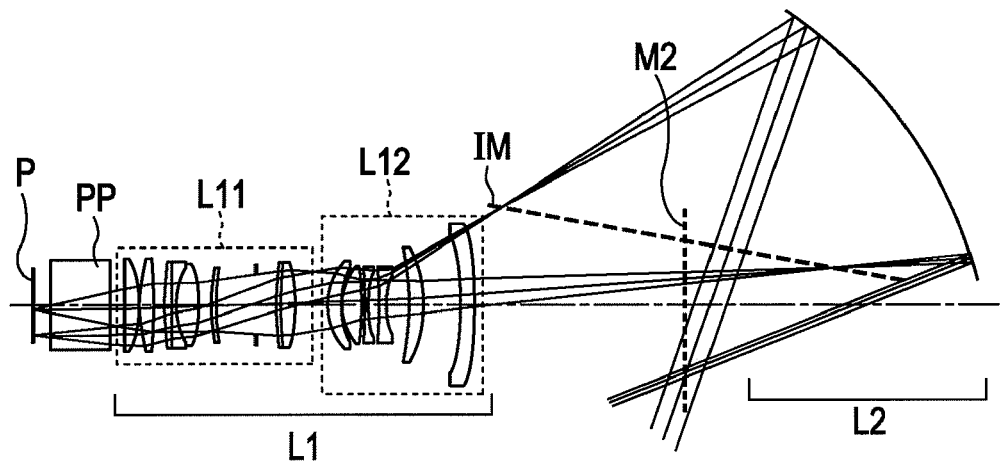
FIG. 53 schematically illustrates an exemplary structure of a projection optical system according to a fifth embodiment.

FIG. 53 schematically illustrates an exemplary structure of a projection optical system according to a fifth embodiment. In the illustration, an optical path when the distance is a standard projection distance is shown.

Figure 54:
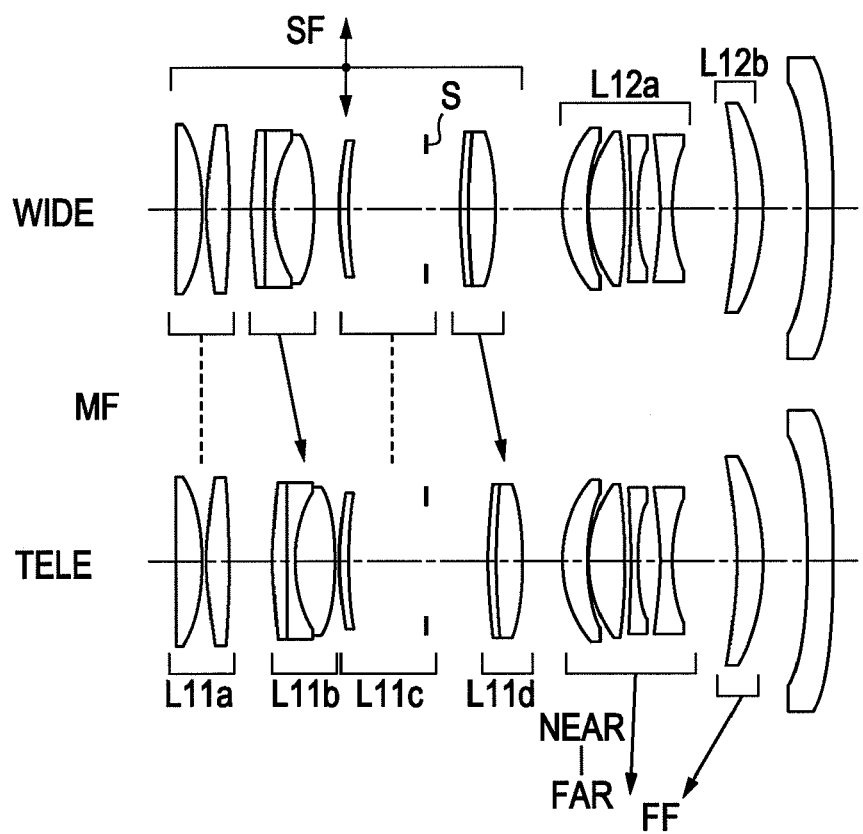
FIG. 54 illustrates an exemplary structure of the main portion of the projection optical system according to the fifth embodiment.

FIG. 54 illustrates an exemplary structure of the main portion of the projection optical system according to the fifth embodiment. In the illustration, lenses of a first optical system L1 when short distance projection is performed are shown in cross section. In FIG. 54, a side closest to a wide side is called "wide," and a side closest to a tele side is called "tele."

As in the illustration, in a projection optical system 3 according to the fifth embodiment, as in the above-described first embodiment, the screen shift function SF is realized by moving the entire 11th optical system L11.

The 11th optical system L11 includes four lens groups, that is, from the primary image surface side, an 11ath group L11a having a positive refractive power, an 11bth group L11b having a positive refractive power, an 11cth group L11c having a negative refractive power, and an 11dth group L11d having a positive refractive power. Of these lens groups, the 11bth group L11b and the 11dth group L11d are moved along the optical axis to realize the magnification changeover function MF.

The other structural features are the same as those of the first embodiment. Accordingly, they will not be described here.

Here, the projection optical system 3 according to the fifth embodiment will hereunder be simply described with reference to specific exemplary numerical values.

FIG. 55 shows lateral aberrations caused by the projection optical system according to the fifth embodiment. In FIG. 55, one division mark corresponds to one dot size when extended projection for one dot size is performed with respect to a screen. A solid line indicates 546.1 nm, a dotted line indicates 620 nm, and an alternate long and short dash line indicates 460 nm. Here, although the lateral aberration graphs are those when the projection optical system is moved in the direction y, the direction of movement is obviously not limited to the direction y. As long as the direction is perpendicular to the optical axis, the direction of movement may be any direction.

FIG. 56 shows a specific example of lens data of the projection optical system according to the fifth embodiment. In FIG. 56, * represents a surface having an aspherical surface, and the aspherical surface is in accordance with the Conditional Expression (7). r represents a curvature radius. d represents an interval and a lens core thickness. nd represents a refractive index at the d line (587.56 nm). vd represents an Abbe number at the same d line. The lens groups within "{" are lens groups related to the floating function FF, the magnification changeover function MF, and the screen shift function SF. di represents a lens interval that varies when the floating function FF and the magnification changeover function MF are realized.

FIG. 57 shows specific examples of a primary image surface side numerical aperture NA, a maximum half angle of view ω when a distance is a standard projection distance, and a maximum primary image surface height y in the projection optical system according to the fifth embodiment.

FIG. 58 shows specific examples of movement amount and a lens group having a screen shift function SF1 in the projection optical system according to the fifth embodiment.

FIG. 59 shows specific examples of lens intervals regarding the floating function FF and the magnification changeover function MF, in the projection optical system according to the fifth embodiment. The numerical values in FIG. 59 correspond to di in FIG. 56. Here, f1 represents a focal length thereof, and β represents a magnifying ratio.

FIG. 60 shows specific examples of aspherical coefficients corresponding to the projection optical system according to the fifth embodiment. The aspherical coefficients in the illustration correspond to those obtained by the aforementioned Conditional Expression (7).

FIG. 61 shows values of a specific example of an image modulating element according to the fifth embodiment. The one dot size in the lateral aberrations shown in FIG. 55 corresponds to the size indicated here.

Figure 62:
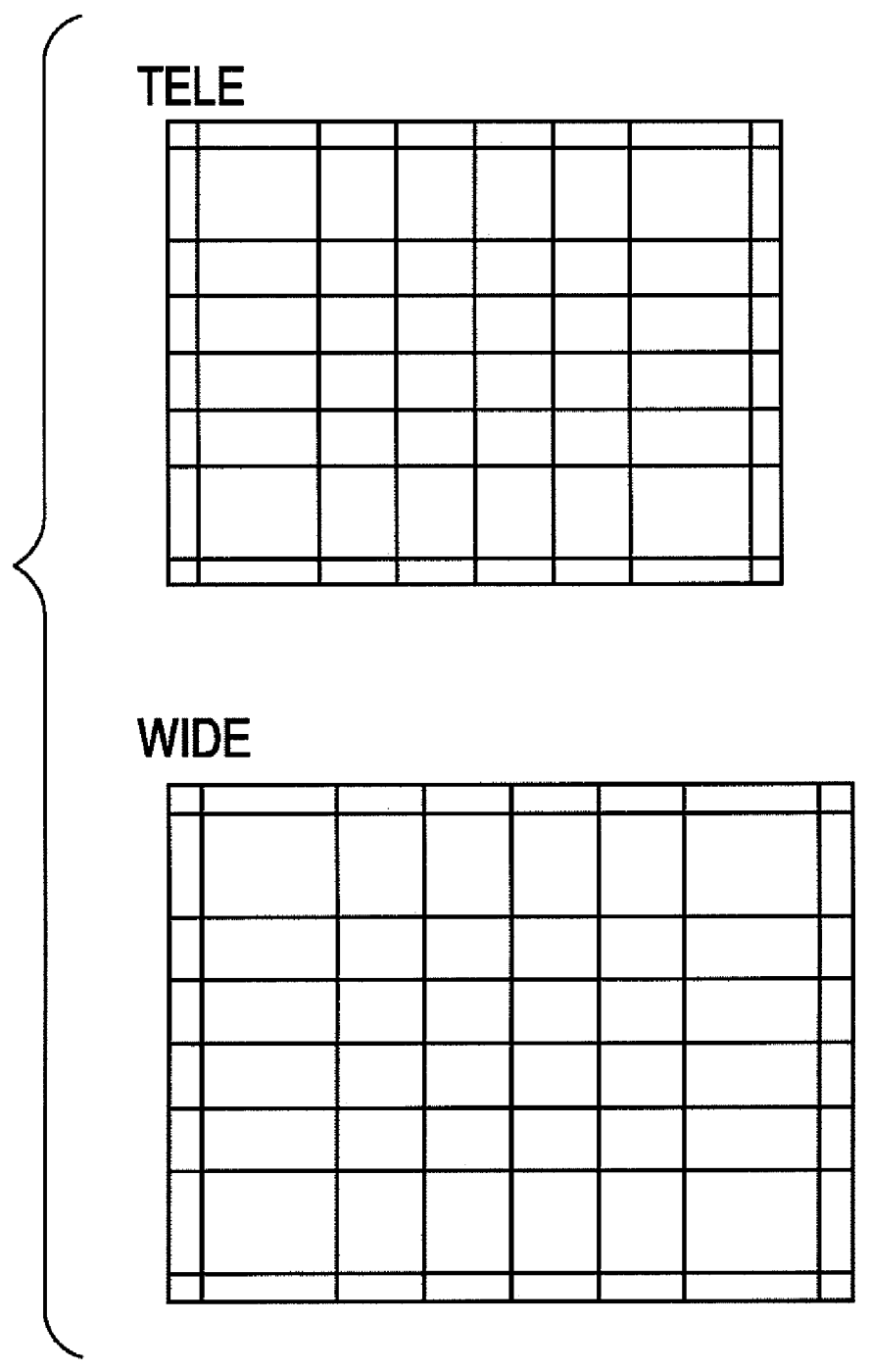

FIG. 62 shows TV distortion states when the image modulating element described with reference to FIG. 61 is subjected to extended projection at the secondary image surface using the projection optical system according to the fifth embodiment.

FIGS. 63A and 63B show specific examples of amounts of changes in, for example, a diagonal size and image distortion, when the image modulating element described with reference to FIG. 61 is subjected to extended projection at the secondary image surface using the projection optical system according to the fifth embodiment. For example, the amounts of changes in the illustration are calculated on the basis of the formulas shown in FIG. 18.

FIG. 64 shows an example of a specific numerical value for each of the Conditional Expressions (1) to (6) in the projection optical system according to the fifth embodiment.

According to the projection optical system 3 identified by the aforementioned specific exemplary numerical values, with regard to the screen shift function SF, a screen shift of approximately ±1.7% is possible by moving the entire 11th optical system L11 perpendicularly by ±0.1 mm with respect to the optical axis. With regard to the magnification changeover function MF, a magnifying ratio of approximately ±10% is changed by moving the 11bth group L11b and the 11dth group L11d of the 11th optical system L11 along the optical axis. The projection optical system 3 has the floating function FF of moving the 12ath group L12a and the 12bth group L12b of the 12th optical system L12 from the intermediate image side towards the primary image surface side when performing focusing from 60" in short distance projection to 100" in long distance projection, at, for example, the wide side. This function is similarly provided for the tele side. In this case, the focusing is performed from 54.55" to 90.91".

Sixth Embodiment

Figure 65:
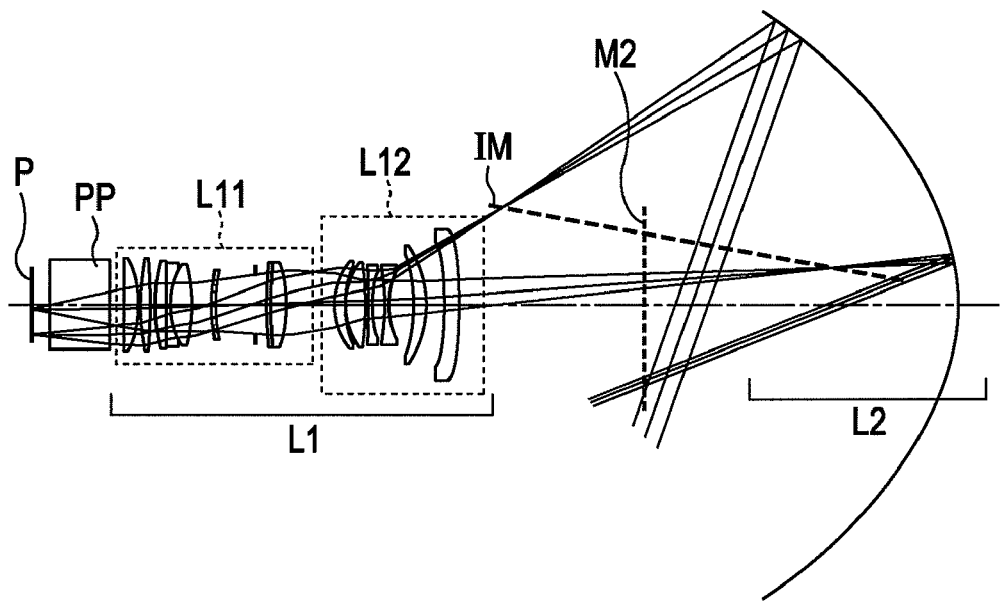
FIG. 65 schematically illustrates an exemplary structure of a projection optical system according to a sixth embodiment.

FIG. 65 schematically illustrates an exemplary structure of a projection optical system according to a sixth embodiment. In the illustration, an optical path when the distance is a standard projection distance is shown.

Figure 66:
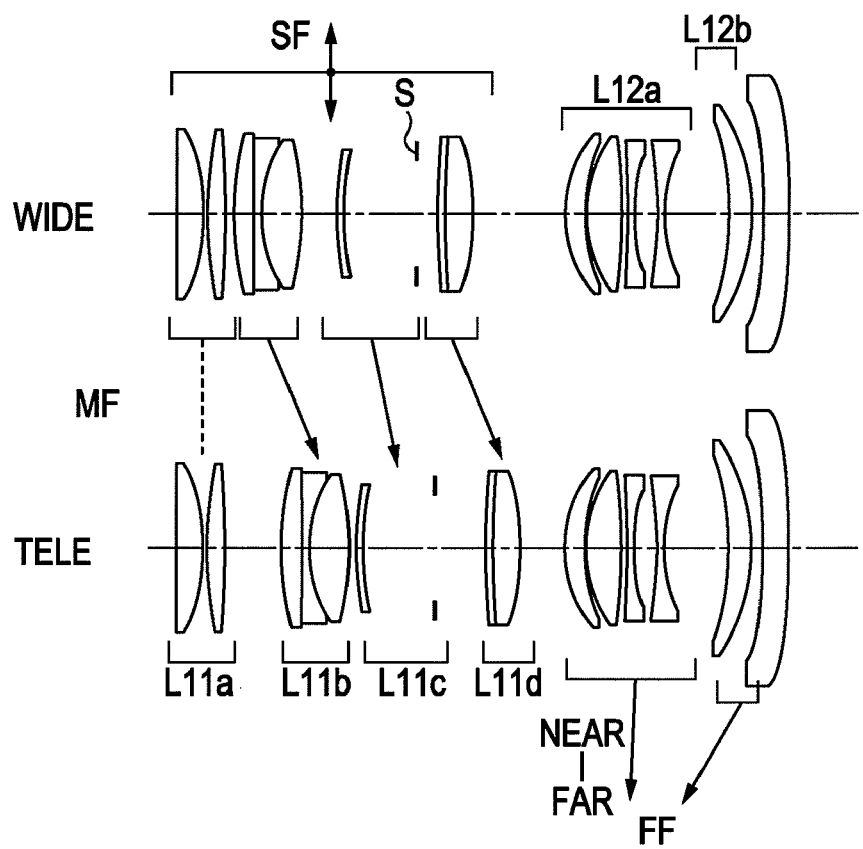
FIG. 66 illustrates an exemplary structure of the main portion of the projection optical system according to the sixth embodiment.

FIG. 66 illustrates an exemplary structure of the main portion of the projection optical system according to the sixth embodiment. In the illustration, lenses of a first optical system L1 when short distance projection is performed are shown in cross section. In FIG. 66, a side closest to a wide side is called "wide," and a side closest to a tele side is called "tele."

As in the illustration, in a projection optical system 3 according to the sixth embodiment, as in the above-described first embodiment, the screen shift function SF is realized by moving the entire 11th optical system L11.

The 11th optical system L11 includes four lens groups, that is, from the primary image surface side, an 11ath group L11a having a positive refractive power, an 11bth group L11b having a positive refractive power, an 11cth group L11c having a negative refractive power, and an 11dth group L11d having a positive refractive power. Of these lens groups, the 11bth group L11b, the 11cth group L11c, and the 11dth group L11d are moved along the optical axis to realize the magnification changeover function MF.

The other structural features are the same as those of the first embodiment. Accordingly, they will not be described here.

Here, the projection optical system 3 according to the sixth embodiment will hereunder be simply described with reference to specific exemplary numerical values.

Figure 67:
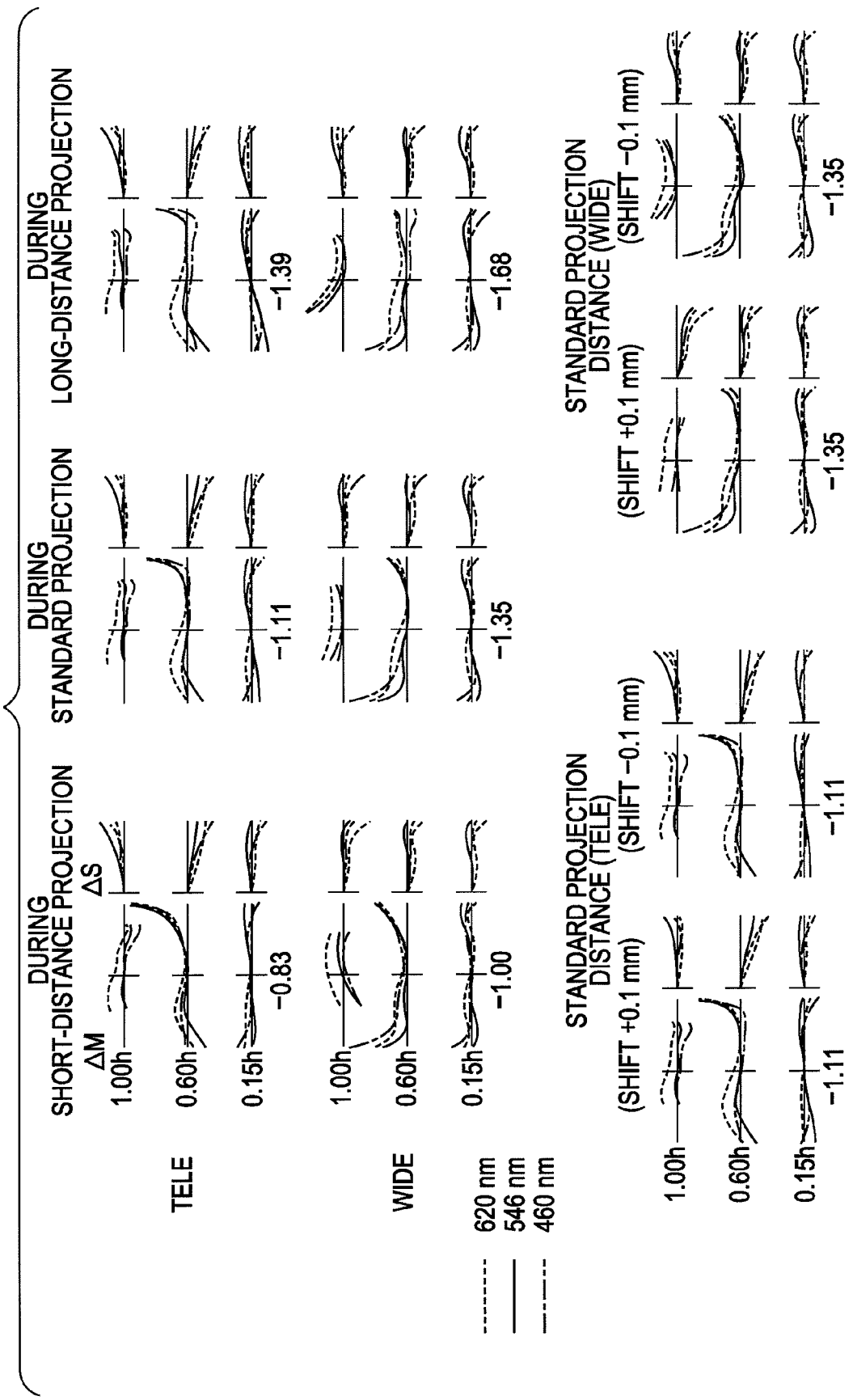
FIG. 67 shows lateral aberrations caused by the projection optical system according to the sixth embodiment.

FIG. 67 shows lateral aberrations caused by the projection optical system according to the sixth embodiment. In FIG. 67, one division mark corresponds to one dot size when extended projection for one dot size is performed with respect to a screen. A solid line indicates 546.1 nm, a dotted line indicates 620 nm, and an alternate long and short dash line indicates 460 nm. Here, although the lateral aberration graphs are those when the projection optical system is moved in the direction y, the direction of movement is obviously not limited to the direction y. As long as the direction is perpendicular to the optical axis, the direction of movement may be any direction.

FIG. 68 shows a specific example of lens data of the projection optical system according to the sixth embodiment. In FIG. 68, * represents a surface having an aspherical surface, and the aspherical surface is in accordance with the Conditional Expression (7). r represents a curvature radius. d represents an interval and a lens core thickness. nd represents a refractive index at the d line (587.56 nm). vd represents an Abbe number at the same d line. The lens groups within "{" are lens groups related to the floating function FF, the magnification changeover function MF, and the screen shift function SF. di represents a lens interval that varies when the floating function FF and the magnification changeover function MF are realized.

FIG. 69 shows specific examples of a primary image surface side numerical aperture NA, a maximum half angle of view o when a distance is a standard projection distance, and a maximum primary image surface height y in the projection optical system according to the sixth embodiment.

FIG. 70 shows specific examples of a movement amount and a lens group having a screen shift function SF1 in the projection optical system according to the sixth embodiment.

FIG. 71 shows specific examples of lens intervals regarding the floating function FF and the magnification changeover function MF, in the projection optical system according to the sixth embodiment. The numerical values in FIG. 71 correspond to di in FIG. 68. Here, f1 represents a focal length thereof, and β represents a magnifying ratio.

FIG. 72 shows specific examples of aspherical coefficients corresponding to the projection optical system according to the sixth embodiment. The aspherical coefficients in the illustration correspond to those obtained by the aforementioned Conditional Expression (7).

FIG. 73 shows values of a specific example of an image modulating element according to the sixth embodiment. The one dot size in the lateral aberrations shown in FIG. 67 corresponds to the size indicated here.

Figure 74:
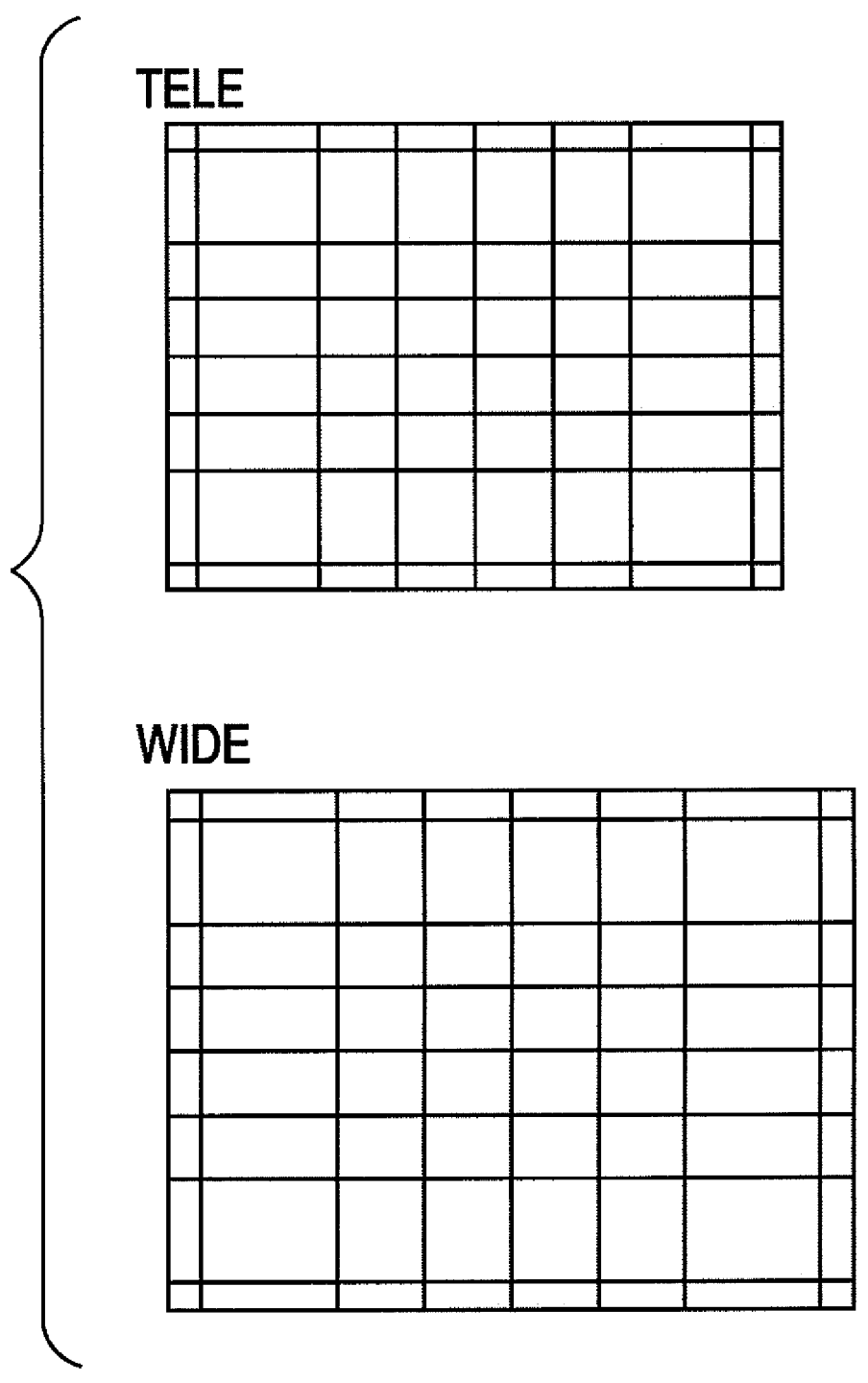

FIG. 74 shows TV distortion states when the image modulating element described with reference to FIG. 73 is subjected to extended projection at the secondary image surface using the projection optical system according to the sixth embodiment.

FIGS. 75A and 75B show specific examples of amounts of changes in, for example, a diagonal size and image distortion, when the image modulating element described with reference to FIG. 73 is subjected to extended projection at the secondary image surface using the projection optical system according to the sixth embodiment. For example, the amounts of changes in the illustration are calculated on the basis of the formulas shown in FIG. 18.

FIG. 76 shows an example of a specific numerical value for each of the Conditional Expressions (1) to (6) in the projection optical system according to the sixth embodiment.

According to the projection optical system 3 identified by the aforementioned specific exemplary numerical values, with regard to the screen shift function SF, a screen shift of approximately ±1.7% is possible by moving the entire 11th optical system L11 perpendicularly by ±0.1 mm with respect to the optical axis. With regard to the magnification changeover function MF, a magnifying ratio of approximately ±20% is changed by moving the 11bth group L11b, the 11cth group L11c, and the 11dth group L11d of the 11th optical system L11 along the optical axis. The projection optical system 3 has the floating function FF of moving the 12ath group L12a and the 12bth group L12b of the 12th optical system L12 from the intermediate image side towards the primary image surface side when performing focusing from 60" in short distance projection to 100" in long distance projection, at, for example, the wide side. This function is similarly provided for the tele side. In this case, the focusing is performed from 49.59" to 82.65".

By having the structure of any one of the above-described first to sixth embodiments, the projection optical system 3 can be provided with the screen shift function SF, the magnification changeover function MF, and the floating function FF while having a large diameter and a super-wide angle at around a numerical aperture of 0.3 and at a half angle of view of 70 degrees, a super-wide angle at around a numerical aperture of 0.3. In addition, these functions can be realized with a small structure and at a low cost.

When the projection optical system 3 provides a super-wide angle and has a large diameter, the liquid crystal projector device including the projection optical system 3 becomes very sensitive to a setting environment. That is, it is possible for this liquid crystal projector device to react to vibration (which one does not have to worry about in a related liquid crystal projector device that is not, for example, a super-wide angle type) and to cause a screen on which projection is performed to swing.

Therefore, the liquid crystal projector device including the projection optical system 3 may have the following structure. That is, it may have a structure that detects the amplitude of the screen with an infrared sensor or that causes the device itself to detect vibration. Amplitude or vibration information is in synchronism with a mechanism that moves some optical components (which are part of the first optical system L1) substantially perpendicularly to the optical axis. This makes it possible to correct the vibration of the screen. For example, the infrared sensor, the detection structure, and synchronizing unit used here may be realized using a related technology, so that they will not be described in detail below.

Another Exemplary Structure of Projection Optical System

Next, another exemplary structure of the projection optical system 3 will be described.

For the projection optical system 3 using a large curved reflecting surface, when the entire structure of the liquid crystal projector device including, for example, a cooling mechanism and a substrate for driving the image modulating element is considered, its height tends to be high. Therefore, the projection optical system 3 used in the liquid crystal projector device may have the following structures.

The structures of the projection optical system 3 will be described below in turns with reference to seventh to tenth embodiments.

Seventh Embodiment

FIGS. 77A and 77B schematically illustrate an exemplary structure of a projection optical system according to the seventh embodiment.

As in the illustration, as with the projection optical system 3 according to the first embodiment, the projection optical system 3 according to the seventh embodiment includes a first optical system L1 and a second optical system L2. The first optical system L1 is formed so as to include an 11th optical system L11 and a 12th optical system L12 from the first primary image surface side.

However, unlike the projection optical system 3 according to the first embodiment, the projection optical system 3 according to the seventh embodiment has a first plane reflecting surface Mi disposed between the 11th optical system L11 and the 12th optical system L12. In addition, a second plane reflecting surface M2 is disposed between the first optical system L1 and the second optical system L2. Further, a parallel plate T having a refractive index n and being transparent is disposed between the second optical system L2 and a secondary image surface.

The other structural features are the same as those of the above-described first embodiment. Therefore, they will not be described here. In addition, specific structures (including materials, etc.) of the first plane reflecting surface M1, the second plane reflecting surface M2, and the parallel plate T may be realized using related technologies. Therefore, they will not be described here.

The first plane reflecting surface M1 is disposed so that a y-axis rotational angle $\beta 1$ of the first plane reflecting surface M1 and an x-axis rotational angle $\alpha 1$ of the first plane reflecting surface M1 satisfy the following Conditional Expressions (8) and (9), respectively. Here, the y-axis rotational angle refers to the rotational angle around the y axis. In addition, the x-axis rotational angle refers to the rotational angle around the x axis. The y axis and the x axis are reference axes in an xy plane corresponding to a setting plane of the liquid crystal projector device.

$$30° < |\beta 1| < 65° \quad (8)$$

$$3° < \alpha 1 < 15° \quad (9)$$

The Conditional Expressions (8) and (9) are provided for reducing the height (in a z-axis direction orthogonal to the xy plane) of the liquid crystal projector device. That is, if $|\beta 1|$ is less than the lower limit of the Conditional Expression (8), the 11th optical system L11 and the 12th optical system L12 may interfere with each other. In contrast, if $|\beta 1|$ exceeds the upper limit, the first plane reflecting surface M1 and the 11th optical system L11 or the 12th optical system L12 may interfere with each other. If $\alpha 1$ is less than the lower limit of the Conditional Expression (9), a light source is protruded by a large amount with respect to the height direction of a concave reflecting surface. Therefore, the height of the device is increased. In contrast, if $\alpha 1$ exceeds the upper limit, a substrate for driving an image modulating element or components for cooling the image modulating element are protruded with respect to the height direction of the concave reflecting surface. Therefore, the height of the device is increased.

That is, as prescribed in the Conditional Expressions (8) and (9), the first plane reflecting surface M1 has rotational angles around both the y axis and the x axis. Therefore, compared to the case in which the first plane reflecting surface has a rotational angle around either one of the y axis and the x axis, the size in the z-axis direction perpendicular to the xy plane, that is, the height of the liquid crystal projector device is reduced.

The first plane reflecting surface M1 may be formed so as to satisfy the conditions of total internal reflection. Such a structure is effective in realizing a bright optical system.

The second plane reflecting surface M2 is disposed so that a y-axis rotational angle $\beta 2$ of the second plane reflecting surface M2 and an x-axis rotational angle $\alpha 2$ of the second plane reflecting surface M2 satisfy the following Conditional Expressions (10) and (11), respectively:

$$20° < |\beta 2| < 45° \quad (10)$$

$$3° < \alpha 2 < 15° \quad (11)$$

The Conditional Expressions (10) and (11) are provided for reducing the height (in the z-axis direction orthogonal to the xy plane) of the liquid crystal projector device. That is, if $|\beta 2|$ is less than the lower limit of the Conditional Expression (10), the 11th optical system L11 and the 12th optical system L12 may interfere with each other. In contrast, if $|\beta 2|$ exceeds the upper limit, the distance between the second optical system L2 and the image modulating element is increased, thereby increasing the size of the entire device. If $\alpha 2$ exceeds the upper limit of the Conditional Expression (11), the light source is protruded by a large amount with respect to the height direction of the concave reflecting surface. Therefore, the height of the device is increased. In contrast, if $\alpha 2$ is less than the lower limit, the substrate for driving the image modulating element or the components for cooling the image modulating element are protruded with respect to the height direction of the concave reflecting surface. Therefore, the height of the device is increased.

It is desirable that the first plane reflecting surface M1 and the second plane reflecting surface M2 be disposed so as to satisfy the following Conditional Expressions (12) and (13):

$$-20° < \alpha 1 + \alpha 2 < 20° \quad (12)$$

$$70° < \beta 1 + \beta 2 < 110° \quad (13)$$

The Conditional Expressions (12) and (13) are, in particular, effective when using a mercury lamp as the light source. That is, the Conditional Expressions (12) and (13) are conditions for disposing an arc portion of the light source substantially horizontally. When the upper and lower limits are passed, the life of the light source may be abruptly reduced.

The condition prescribed in the Conditional Expression (12) is effective when a surface perpendicular to an area, such as a wall or an interactive white board, is a projection surface (see, for example, FIG. 1). The condition prescribed in the Conditional Expression (13) is effective when performing projection on a table (see, for example, FIG. 5).

If the Conditional Expressions (12) and (13) are satisfied, the structure is a type allowing all forms of projections. That is, in this case, the light source is disposed at the back surface of the concave reflecting surface.

The parallel plate T is disposed so that an x-axis rotational angle $\alpha t$ of the parallel plate satisfies the following Conditional Expression (14):

$$60° < \alpha t < 87° \quad (14)$$

For dust control, it is effective to insert the parallel plate T between the second optical system L2 and the secondary image surface. However, when, for example, the parallel plate T is disposed substantially parallel to the optical axis, a portion of a light beam incident upon the secondary image surface is incident upon the parallel plate T at a very shallow angle. Therefore, the reflectivity of the light beam is increased on a reflection prevention film for increasing transmittance. As a result, for example, brightness is reduced and ghosts are produced.

Therefore, it is effective to tilt the parallel plate T in the range prescribed by the Conditional Expression (14). That is, if the parallel plate T is disposed at an angle that is less than the lower limit of the Conditional Expression (14), the reflectivity can be reduced. In contrast, if the upper limit is exceeded, the height of the entire device including the parallel plate T and the secondary optical system L2 is increased.

A light-shielding plate that can completely shield image information from the image modulating element may be disposed at a position where light exits from the parallel plate T, that is, a position that is closer to the secondary image surface than the parallel plate T, and the light-shielding plate may be formed so as to be openable and closable. By virtue of such a structure, it is possible to switch an on/off state of the image information depending upon the condition of use without turning off the light source.

Specific exemplary numerical values of the projection optical system 3 according to the seventh embodiment will be given here.

FIG. 78 shows an example of a specific numerical value for each of the Conditional Expressions (8) to (14) in the projection optical system according to the seventh embodiment.

According to the projection optical system 3 that is identified by the aforementioned specific exemplary numerical values, when the liquid crystal projector device is formed so as to be provided with the angles α1 and α2, the height of the liquid crystal projector device is reduced to, for example, approximately 130 mm (see, for example, FIG. 77B).

Eighth Embodiment

FIGS. 79A and 79B schematically illustrate an exemplary structure of a projection optical system according to the eighth embodiment.

As in the illustration, as with the projection optical system 3 according to the seventh embodiment, the projection optical system 3 according to the eighth embodiment includes a first plane reflecting surface M1, a second plane reflecting surface M2, and a parallel plate T.

Specific exemplary numerical values of the projection optical system 3 according to the eighth embodiment will be given here.

FIG. 80 shows an example of a specific numerical value for each of the Conditional Expressions (8) to (14) in the projection optical system according to the eighth embodiment.

According to the projection optical system 3 that is identified by the aforementioned specific exemplary numerical values, when the liquid crystal projector device is formed so that the parallel plate T is tilted by 85°, the height of the liquid crystal projector device is reduced to, for example, approximately 120 mm (see, for example, FIG. 79B).

Figure 81:
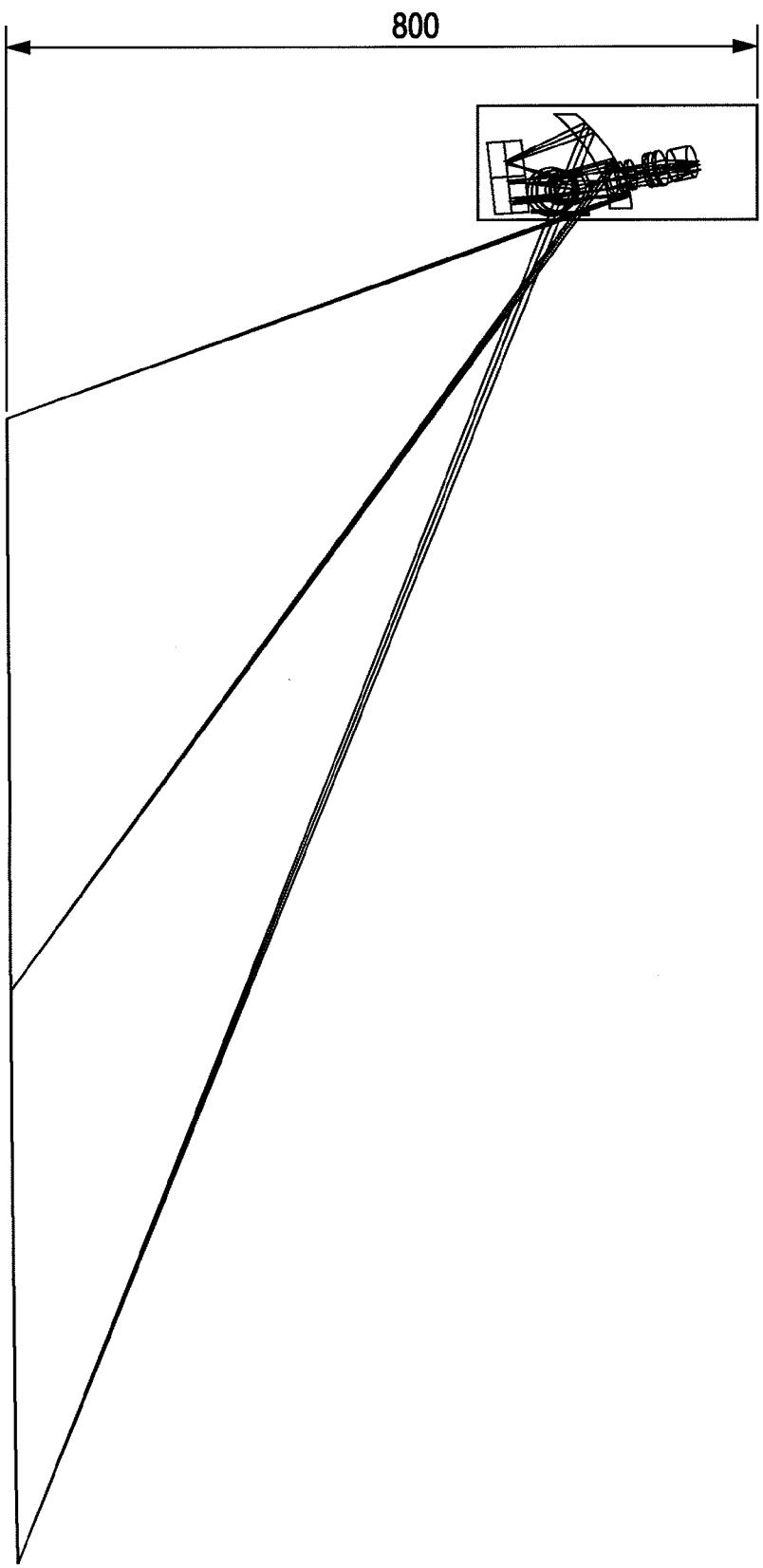
FIG. 81 is a exemplary ray diagram including a secondary image surface when a liquid crystal projector device is formed using the projection optical system according to the eighth embodiment.

FIG. 81 is an exemplary ray diagram including a secondary image surface when this liquid crystal projector device is used. The illustration is a ray diagram when the distance is a standard projection distance, in which projection is performed at 80".

Ninth Embodiment

FIGS. 82A and 82B schematically illustrate an exemplary structure of a projection optical system according to a ninth embodiment.

As in the illustration, a projection optical system 3 according to the ninth embodiment includes the component parts of the structure according to the eighth embodiment and a third plane reflecting surface M3 disposed at an optical path extending from a second optical system L2 to a secondary image surface and having one reflecting surface.

Specific structures (including materials, etc.) of the third plane reflecting surface M3 may be realized using related technologies. Therefore, they will not be described here. In addition, a mechanism that causes the third plane reflecting surface M3 to be removable is not particularly limited. For the mechanism, related technologies may be used.

The third plane reflecting surface M3 is disposed so that an x-axis rotational angle α3 of the third plane reflecting surface M3 satisfies the following Conditional Expression (15):

$$-15°<α3<0° \quad (15)$$

The Conditional Expression (15) is for reducing the size of a projection space of the liquid crystal projector device. That is, by disposing the third plane reflecting surface M3 so that α3 falls within the range prescribed by the Conditional Expression (15), it is possible to reduce the size of the projection space without increasing the size of the third plane reflecting surface M3. More specifically, if α3 is less than the lower limit of the Conditional Expression (15), a light beam moving from the third plane reflecting surface M3 towards the secondary image surface interferes with the projection optical system 3. In contrast, if α3 exceeds the upper limit, the size of the third plane reflecting surface M3 is increased.

By providing the third plane reflecting surface M3 with a mechanism that allows it to be removed, it is possible to vary the projection space in accordance with use. Further, when a light beam is reflected by the back surface of the third plane reflecting surface M3, a user no longer directly touches an evaporated film, thereby facilitating the handling of the third plane reflecting surface M3.

Here, specific exemplary numerical values of the projection optical system 3 according to the ninth embodiment will be given here.

FIG. 83 shows an example of a specific numerical value for each of the Conditional Expressions (8) to (15) in the projection optical system according to the ninth embodiment.

In this way, according to the projection optical system 3 according to the ninth embodiment, when all of the Conditional Expressions (8) to (15) are satisfied, it is possible to provide a small liquid crystal projector device having a narrow projection space.

Figure 84:
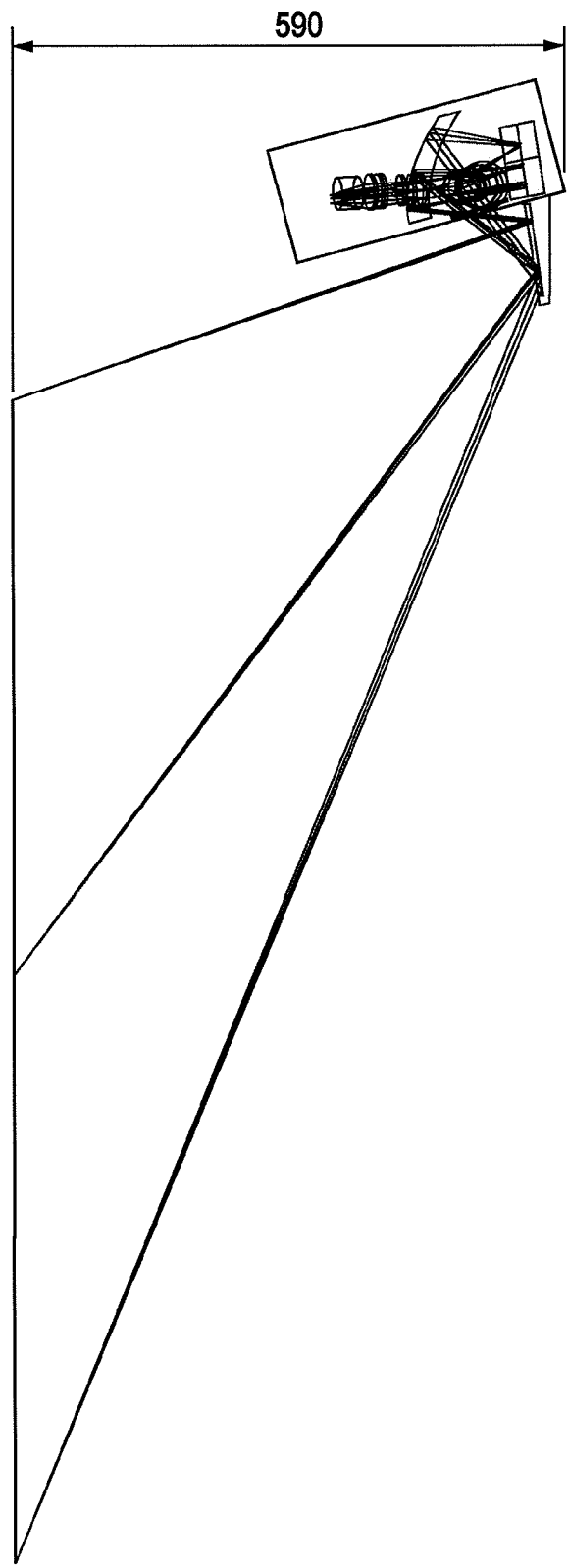
FIG. 84 is an exemplary ray diagram including a secondary image surface when a liquid crystal projector device is formed using the projection optical system according to the ninth embodiment.
Figure 87:
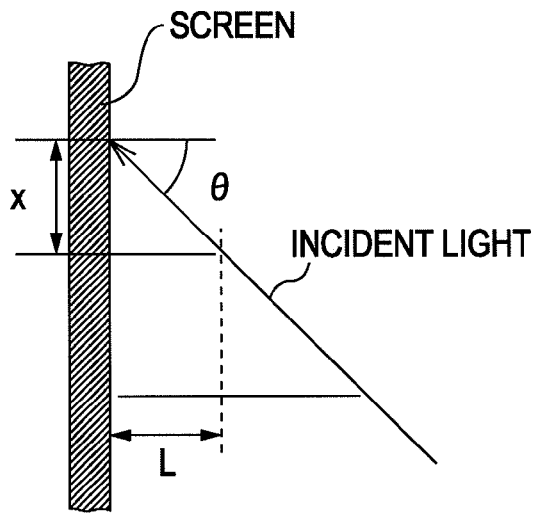
FIG. 87 illustrates an incident angle θ with respect to a screen.
Figure 88A:
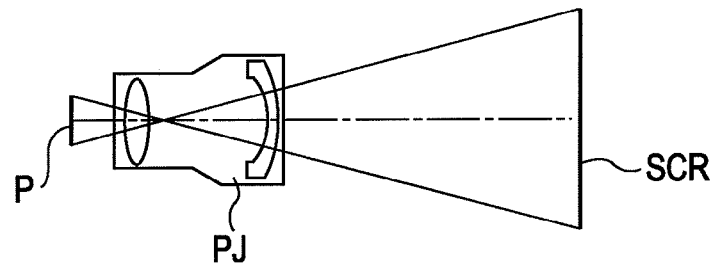
FIG. 88 illustrates a specific example of a screen shift function used in a related liquid crystal projector device.
Figure 88B:
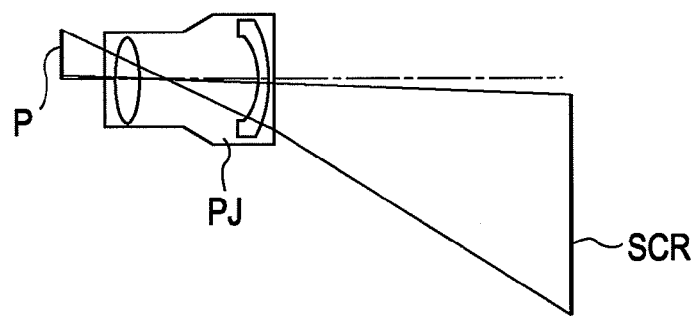

FIG. 84 is an exemplary ray diagram including the secondary image surface when the liquid crystal projector device is formed using the projection optical system according to the ninth embodiment. The illustration is a ray diagram when the distance is a standard projection distance, in which projection is performed at 80".

As in the illustration, the size of the projection space when the liquid crystal projector device is formed by setting the third plane reflecting surface M3 can be considerably reduced from 800 mm to 590 mm as in the eighth embodiment (see FIG. 81).

When the third plane reflecting surface M3 is set, it is possible to form the third plane reflecting surface M3 using a parallel plate, and to form the projection optical system so that two transmissions and one reflection are repeated in the optical path extending from the second optical system L2 to the secondary image surface.

Tenth Embodiment

FIGS. 85A and 85B schematically illustrate an exemplary structure of a projection optical system according to the tenth embodiment.

As in the illustration, the structure of a projection optical system 3 according to the tenth embodiment is substantially the same as that of the seventh embodiment. The difference is that a total internal reflection prism TIR is used as a first plane reflecting surface M1. The other structural features are the same as those of the seventh embodiment. Accordingly, they will not be described here. Since the total internal reflection prism TIR can be realized using related technologies, it will not be described here.

Here, the projection optical system 3 according to the tenth embodiment will be described with reference to specific exemplary numerical values.

FIG. 86 shows an example of a specific numerical value for each of the Conditional Expressions (8) to (14) in the projection optical system according to the tenth embodiment.

According to the projection optical system 3 that is identified by the aforementioned specific exemplary numerical values, when the liquid crystal projector device is formed so as to be provided with the angles α1 and α2, the height of the liquid crystal projector device is reduced to, for example, approximately 130 mm (see, for example, FIG. 85B).

The present application contains subject matter related to that disclosed in Japanese Priority Patent Application JP 2008-297721 filed in the Japan Patent Office on Nov. 21, 2008, the entire content of which is hereby incorporated by reference.

Although, in the preferred embodiments, preferred practical forms of the present invention are described, the present invention is not limited the content thereof.

The specific forms and numerical values of the component parts exemplified in the first to tenth embodiments are only some specific forms and numerical values for carrying out the invention. The specific forms and numerical values are not to be understood as limiting the technical scope of the present invention.

For example, although in each of the above-described embodiments, a liquid crystal projector device is exemplified as a projector image display device, other types of projection image display devices may be used, that is, a component other than a liquid crystal panel may be used as the image modulating element. Even in such a case, the present invention is applicable in exactly the same way.

Further, for example, although in each of the above-described embodiments, a preferred projection optical system is described as an optical system of the projection image display device, it is obvious that the preferred optical system may be used as an optical system for an image pickup device (such as a digital camera, a monitoring camera, or a document camera.

Accordingly, the present invention is not limited to the content of the embodiments. Modifications may be suitably made without departing from the gist of the present invention.

What is claimed is:

1. A projection image display device comprising:
a light source;
an illumination optical system that uniformly irradiates a surface of an image modulating element with a light beam emitted from the light source, the surface of the image modulating element being a primary image surface; and
a projection optical system that performs extended projection at a secondary image surface on image information provided at the primary image surface and modulated by the image modulating element,
wherein the projection optical system includes
a first optical system having a positive refractive power, and
a second optical system having a concave reflecting surface, and
wherein the first optical system has
a common optical axis at which all optical components of the first optical system have rotationally symmetric surfaces, and
a screen shift function that causes the secondary image surface to be moved by moving at least one of the optical components of the first optical system substantially perpendicularly to the optical axis,
wherein a refractive power $\Phi s$ of the at least one of the optical components and a refractive power $\Phi 1$ of the first optical system during standard projection satisfy Conditional Expression (1):

$$0.2 < |\phi s/\phi 1| < 1.2 \qquad (1).$$

2. The projection image display device according to claim 1, wherein the first optical system includes, from a side of the primary image surface, an 11th optical system having a positive refractive power and a 12th optical system having a negative refractive power, the first optical system foiling an intermediate image between the first optical system and the second optical system,
wherein the 11th optical system includes a plurality of lens groups and has a magnification changeover function that causes a magnification of an image at the secondary image surface to be changed by moving at least one lens group having a positive refractive power among the plurality of lens groups in a direction of the optical axis, and
wherein a refractive power $\Phi m$ of the lens group whose movement amount is largest among the at least one lens group used for realizing the magnification changeover function and a refractive power $\Phi 1$ of the first optical system in standard projection satisfy Conditional Expression (2):

$$0.2 < |\Phi m/\Phi 1| < 0.9 \qquad (2).$$

3. The projection image display device according to claim 2, wherein the 11th optical system includes four lens groups, an 11ath group having a positive refractive power, an 11bth group having a positive refractive power, an 11cth group having a negative refractive power, and an 11dth group having a positive refractive power from the side of the primary image surface, and
wherein the magnification changeover function is such that, by moving at least two lens groups, the 11bth group and the 11dth group, along the optical axis towards the side of the primary image surface, a magnifying ratio is increased, and is such that, by moving at least the 11bth group and the 11dth group towards a side of the intermediate image, the magnifying ratio is reduced.

4. The projection image display device according to claim 1, wherein the first optical system includes, from a side of the primary image surface, an 11th optical system having a positive refractive power and a 12th optical system having a negative refractive power, the first optical system forming an intermediate image between the first optical system and the second optical system,
wherein the 12th optical system includes a 12ath group having an overall negative power and a 12bth group, and has a floating function, a surface of the 12ath group that is closest to the primary image surface being a convex surface, the 12bth group including a positive meniscus lens having a convex surface at a side of the intermediate image, the floating function causing the 12bth group to be moved along the optical axis from the side of the intermediate image to the side of the primary image surface when performing focusing from when short distance projection is carried out to when long distance projection is carried out, and
wherein a refractive power $\Phi 12a$ of the 12ath group, a refractive power $\Phi 12b$ of the 12bth group, and a refractive power Φ12 of the 12th optical system in standard projection satisfy Conditional Expressions (3) and (4):

$$0.2<|\Phi 12b/\Phi 12|<3.0 \quad (3)$$

$$0.2<|\Phi 12b/\Phi 12a|<1.0 \quad (4).$$

5. The projection image display device according to claim 4, wherein a movement amount M12a during floating of the 12ath group and a movement amount M12b during floating of the 12bth group satisfy Conditional Expression (5):

$$1.5<M12b/M12a<7.0 \quad (5).$$

6. The projection image display device according to claim 1, wherein the second optical system includes a rotationally symmetric aspherical surface, and has the optical axis in common with the first optical system.

7. A projection image display device comprising:
a light source;
an illumination optical system that uniformly irradiates a surface of an image modulating element with a light beam emitted from the light source, the surface of the image modulating element being a primary image surface; and
a projection optical system that performs extended projection at a secondary image surface on image information provided at the primary image surface and modulated by the image modulating element,
wherein the projection optical system is such that an optical component among a plurality of optical components disposed closest to a side of the secondary image surface and having a curved surface is formed by a reflecting surface,
wherein the projection optical system is provided with a screen shift function that causes the secondary image surface to be moved by decentering at least one of the optical components of the projection optical system substantially parallel to the primary image surface,
wherein the projection optical system is provided with a magnification changeover function that causes a magnification of an image at the secondary image surface to be changed by moving at least one of the optical components of the projection optical system substantially perpendicularly to the primary image surface, and
wherein a maximum effective diameter DM of a largest curved reflecting surface of the projection optical system and a maximum height Dy of the primary image surface satisfy Conditional Expression (6)

$$3<DM/Dy<30 \quad (6).$$

8. A projection optical system comprising:
a first optical system having a positive refractive power; and
a second optical system having a concave reflecting surface,
wherein the projection optical system is formed so that extended projection is performed from a tele-side primary image surface towards a wide-side secondary image surface,
wherein the first optical system has
a common optical axis at which all optical components of the first optical system have rotationally symmetric surfaces, and
a screen shift function that causes the secondary image surface to be moved by moving at least one of the optical components of the first optical system substantially perpendicularly to the optical axis,
wherein a refractive power Φs of the at east one of the optical components and a refractive power Φ1 of the first optical system during standard projection satisfy Conditional Expression (1):

$$0.2<|\phi s/\phi 1|<1.2 \quad (1).$$

* * * * *